United States Patent
Rinearson et al.

(10) Patent No.: US 9,588,970 B2
(45) Date of Patent: *Mar. 7, 2017

(54) SYSTEMS AND METHODS FOR COLLABORATIVE STORYTELLING IN A VIRTUAL SPACE

(71) Applicant: III Holdings 2, LLC, Wilmington, DE (US)

(72) Inventors: Peter Rinearson, Vashon, WA (US); James Strange, Bellevue, WA (US); Karan Strange, Bellevue, WA (US)

(73) Assignee: III HOLDINGS 2, LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/056,881

(22) Filed: Oct. 17, 2013

(65) Prior Publication Data

US 2014/0046973 A1    Feb. 13, 2014

Related U.S. Application Data

(63) Continuation of application No. 13/542,531, filed on Jul. 5, 2012, which is a continuation-in-part of application No. 13/114,959, filed on May 24, 2011.
(Continued)

(51) Int. Cl.
*G06F 17/30* (2006.01)
*G06Q 30/02* (2012.01)
*G06Q 10/10* (2012.01)

(52) U.S. Cl.
CPC .. *G06F 17/30011* (2013.01); *G06F 17/30908* (2013.01); *G06Q 10/101* (2013.01);
(Continued)

(58) Field of Classification Search
CPC ......... G06F 17/30011; G06F 17/30023; G06F 17/3005; G06F 17/30828; G06F 17/30867;
(Continued)

(56) References Cited

U.S. PATENT DOCUMENTS 5,644,576 A * 7/1997 Bauchot ............... H04W 74/02
                                                        370/337
5,671,342 A * 9/1997 Millier ................. G09B 29/106
                                                        345/418
(Continued)

FOREIGN PATENT DOCUMENTS

CA            2498376 A1 * 9/2005 ............. G06F 17/30

OTHER PUBLICATIONS

Balog et al., Personal Name Resolution of Web People Search. http://citeseerx.ist.psu.edu/viewdoc/summary?doi=1   0.1.1.145.7979. Apr. 22, 2008.
(Continued)

*Primary Examiner* — Frantz Coby
(74) *Attorney, Agent, or Firm* — Knobbe Martens Olson & Bear LLP

(57) ABSTRACT

User-submitted content (e.g., stories) may be associated with descriptive metadata (intersection metadata), such as a timeframe, location, tags, and so on. Story content is presented in a virtual space, such as a forum, chatroom, or the like. Users submit collaborative content as the story is presented in the virtual space. The collaborative content is synchronized to presentation of the story. An author may replay the presentation and synchronized collaborative content and/or select portions of the collaborative content for inclusion in the story.

21 Claims, 46 Drawing Sheets

Related U.S. Application Data

(60) Provisional application No. 61/347,815, filed on May 24, 2010, provisional application No. 61/504,648, filed on Jul. 5, 2011.

(52) U.S. Cl.
CPC ....... *G06Q 30/02* (2013.01); *G06F 17/30044* (2013.01); *G06F 17/30828* (2013.01); *G06F 17/30867* (2013.01)

(58) Field of Classification Search
CPC ........... G06F 17/30044; G06F 17/3087; G06F 17/30908; G06F 17/30244
USPC ................................ 707/706–709, 769, 770
See application file for complete search history.

(56) References Cited

U.S. PATENT DOCUMENTS

| | | | |
|---|---|---|---|
| 6,360,215 | B1 | 3/2002 | Judd et al. |
| 6,397,219 | B2 | 5/2002 | Mills |
| 6,405,226 | B1 | 6/2002 | Alpert et al. |
| 6,658,377 | B1 | 12/2003 | Anward et al. |
| 6,746,333 | B1* | 6/2004 | Onda .................... A63F 13/12 463/42 |
| 6,823,333 | B2 | 11/2004 | McGreevy |
| 6,961,724 | B1 | 11/2005 | Kindo et al. |
| 7,032,178 | B1 | 4/2006 | McKnight et al. |
| 7,143,084 | B1 | 11/2006 | Rinearson et al. |
| 7,548,914 | B2 | 6/2009 | Bell et al. |
| 7,620,549 | B2* | 11/2009 | Di Cristo et al. ............ 704/257 |
| 7,668,857 | B2 | 2/2010 | Cook et al. |
| 7,716,489 | B1* | 5/2010 | Brandt .................. G06F 21/335 713/180 |
| 7,802,205 | B2* | 9/2010 | Bedingfield .......... G06Q 30/02 715/760 |
| 7,856,620 | B1* | 12/2010 | Fleischer et al. ............ 717/109 |
| 8,099,679 | B2* | 1/2012 | Yee .................. G06F 17/30265 715/811 |
| 8,499,152 | B1* | 7/2013 | Chen ..................... H04L 63/102 713/155 |
| 8,566,348 | B2* | 10/2013 | Rinearson et al. ........... 707/769 |
| 8,682,889 | B2* | 3/2014 | Zheng ............... G06F 17/30041 706/12 |
| 8,799,068 | B2* | 8/2014 | Kendall ........................ 705/14.4 |
| 8,990,585 | B2* | 3/2015 | Grube ................ G06F 11/1076 707/687 |
| 9,098,165 | B2* | 8/2015 | Schoen ................. G06Q 10/10 |
| 2001/0044758 | A1 | 11/2001 | Talib et al. |
| 2002/0035432 | A1 | 3/2002 | Kubica et al. |
| 2002/0052674 | A1 | 5/2002 | Chang et al. |
| 2002/0068585 | A1 | 6/2002 | Chan et al. |
| 2002/0073079 | A1 | 6/2002 | Terheggen |
| 2002/0161756 | A1 | 10/2002 | Fesq et al. |
| 2002/0186818 | A1 | 12/2002 | Arnaud et al. |
| 2003/0004829 | A1 | 1/2003 | Torres et al. |
| 2003/0006999 | A1 | 1/2003 | Carlson et al. |
| 2003/0036848 | A1 | 2/2003 | Sheha et al. |
| 2003/0061211 | A1 | 3/2003 | Shultz et al. |
| 2003/0115065 | A1* | 6/2003 | Kakivaya .......... G06F 17/30427 704/270.1 |
| 2003/0122839 | A1 | 7/2003 | Matraszek |
| 2004/0006740 | A1 | 1/2004 | Krohn et al. |
| 2005/0028194 | A1* | 2/2005 | Elenbaas ........... G06F 17/30787 725/32 |
| 2005/0033657 | A1 | 2/2005 | Herrington et al. |
| 2005/0240608 | A1 | 10/2005 | Jones |
| 2005/0256842 | A1* | 11/2005 | Marcjan .............. G06F 21/6218 |
| 2005/0256867 | A1 | 11/2005 | Walther et al. |
| 2005/0288920 | A1 | 12/2005 | Green et al. |
| 2006/0095331 | A1 | 5/2006 | O'Malley et al. |
| 2006/0107297 | A1 | 5/2006 | Toyama |
| 2006/0167896 | A1 | 7/2006 | Kapur et al. |
| 2006/0173617 | A1 | 8/2006 | Sladky et al. |
| 2006/0173821 | A1 | 8/2006 | Hennum et al. |
| 2006/0239469 | A1 | 10/2006 | Gil et al. |
| 2006/0242661 | A1 | 10/2006 | Bodlaender |
| 2006/0256382 | A1 | 11/2006 | Matraszek |
| 2006/0271524 | A1 | 11/2006 | Tanne |
| 2006/0288041 | A1 | 12/2006 | Plastina |
| 2006/0294086 | A1 | 12/2006 | Rose et al. |
| 2007/0100898 | A1 | 5/2007 | Petras et al. |
| 2007/0118512 | A1 | 5/2007 | Riley et al. |
| 2007/0204227 | A1 | 8/2007 | Kretz |
| 2007/0239687 | A1 | 10/2007 | Seymour |
| 2008/0010253 | A1 | 1/2008 | Sidhu et al. |
| 2008/0065995 | A1 | 3/2008 | Bell et al. |
| 2008/0091549 | A1 | 4/2008 | Chang et al. |
| 2008/0091713 | A1* | 4/2008 | Candelore ............. H04N 7/163 |
| 2008/0097966 | A1 | 4/2008 | Choi et al. |
| 2008/0133479 | A1 | 6/2008 | Zelevinsky et al. |
| 2008/0140616 | A1 | 6/2008 | Encina et al. |
| 2008/0155465 | A1 | 6/2008 | Fu et al. |
| 2008/0177706 | A1 | 7/2008 | Yuen |
| 2008/0243611 | A1 | 10/2008 | Delli Santi et al. |
| 2008/0288536 | A1 | 11/2008 | Pfeiffer et al. |
| 2008/0293020 | A1 | 11/2008 | Jang |
| 2008/0313130 | A1* | 12/2008 | Hammond ........ G06F 17/30864 |
| 2009/0005968 | A1 | 1/2009 | Vengroff et al. |
| 2009/0089047 | A1 | 4/2009 | Pell et al. |
| 2009/0094257 | A1 | 4/2009 | Nissen |
| 2009/0172571 | A1 | 7/2009 | Vasilache et al. |
| 2009/0204880 | A1* | 8/2009 | Ko ........................ G09B 5/062 715/202 |
| 2009/0241155 | A1 | 9/2009 | Narasimhan et al. |
| 2009/0265328 | A1* | 10/2009 | Parekh ............. G06F 17/30864 |
| 2009/0265369 | A1 | 10/2009 | Hyman et al. |
| 2010/0042615 | A1 | 2/2010 | Rinearson |
| 2010/0042616 | A1 | 2/2010 | Rinearson |
| 2010/0042660 | A1 | 2/2010 | Rinearson et al. |
| 2010/0042928 | A1 | 2/2010 | Rinearson |
| 2010/0082653 | A1 | 4/2010 | Nair |
| 2010/0082712 | A1 | 4/2010 | Pratt et al. |
| 2012/0005209 | A1 | 1/2012 | Rinearson et al. |
| 2013/0061154 | A1 | 3/2013 | Bennett |
| 2013/0173531 | A1 | 7/2013 | Rinearson et al. |
| 2014/0022789 | A1* | 1/2014 | Lin ........................ F21K 9/135 362/249.02 |

OTHER PUBLICATIONS

Terdiman, Daniel, "Amazon tries its hand at tagging," C|Net News Blog, Nov. 15, 2005, C|Net news.com, http://news.com/8301-10784_3-5953622-7.html, Jan. 3, 2008.

Weiss-Lijn, Mischa and McDonell, Janet T., "A Best Case' Evaluation of a Novel Information Retrieval Application," Eighth European Conference on Information Technology Evaluation, A Brown D Remenyi, Academic Conferences Limited, 2001, pp. 89-97.

Arrington, Michael, "Amazon Tags," TechCrunch, Nov. 14, 2005, TechCrunch.com, http://www.techcrunch.com/2005/11/14/amazon-tags/, Jan. 4, 2008.

Macmanus, Richard, "Amazon Does Tagging," Read Write Web, Nov. 14, 2005, ReadWriteWeb.com, http://www.readwriteweb.com/archives/amazon_does_tag.php, Jan. 4, 2008.

* cited by examiner

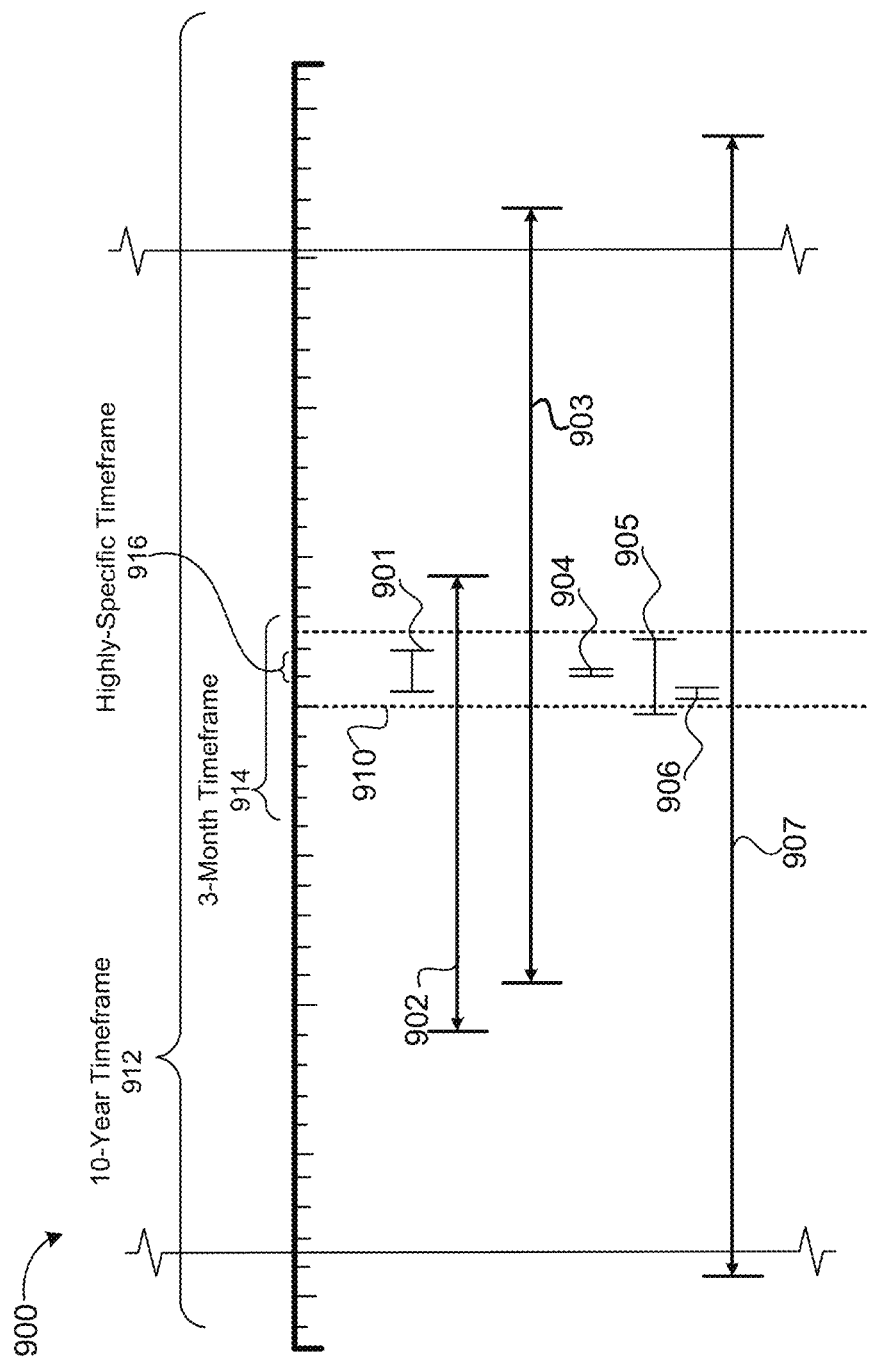

2801

SYSTEMS AND METHODS FOR COLLABORATIVE STORYTELLING IN A VIRTUAL SPACE

CROSS-REFERENCE TO RELATED APPLICATIONS

This application claims the benefit of U.S. patent application Ser. No. 13/542,531, entitled "SYSTEMS AND METHODS FOR COLLABORATIVE STORYTELLING IN A VIRTUAL SPACE," filed Jul. 5, 2012 for Peter Rinearson, which claims priority to U.S. Provisional Application No. 61/504,648 entitled "SYSTEMS AND METHODS FOR COLLABORATIVE STORYTELLING IN A VIRTUAL SPACE," filed Jul. 5, 2011, for Peter Rinearson, and which is a continuation in part of U.S. patent application Ser. No. 13/114,959, entitled "SYSTEMS AND METHODS FOR IDENTIFYING INTERSECTIONS USING CONTENT METADATA," filed May 24, 2011, and which claims priority to U.S. Provisional Application No. 61/347,815, entitled "INTERSECT," filed May 24, 2010 for Peter Rinearson, each of which are fully incorporated herein by reference.

TECHNICAL FIELD

This disclosure relates to user-submitted content and, in particular, to maintaining associations between user-submitted story content and commentary.

BRIEF DESCRIPTION OF THE DRAWINGS

FIG. 9A depicts examples of item chronology;

DETAILED DESCRIPTION

Figure 1A:
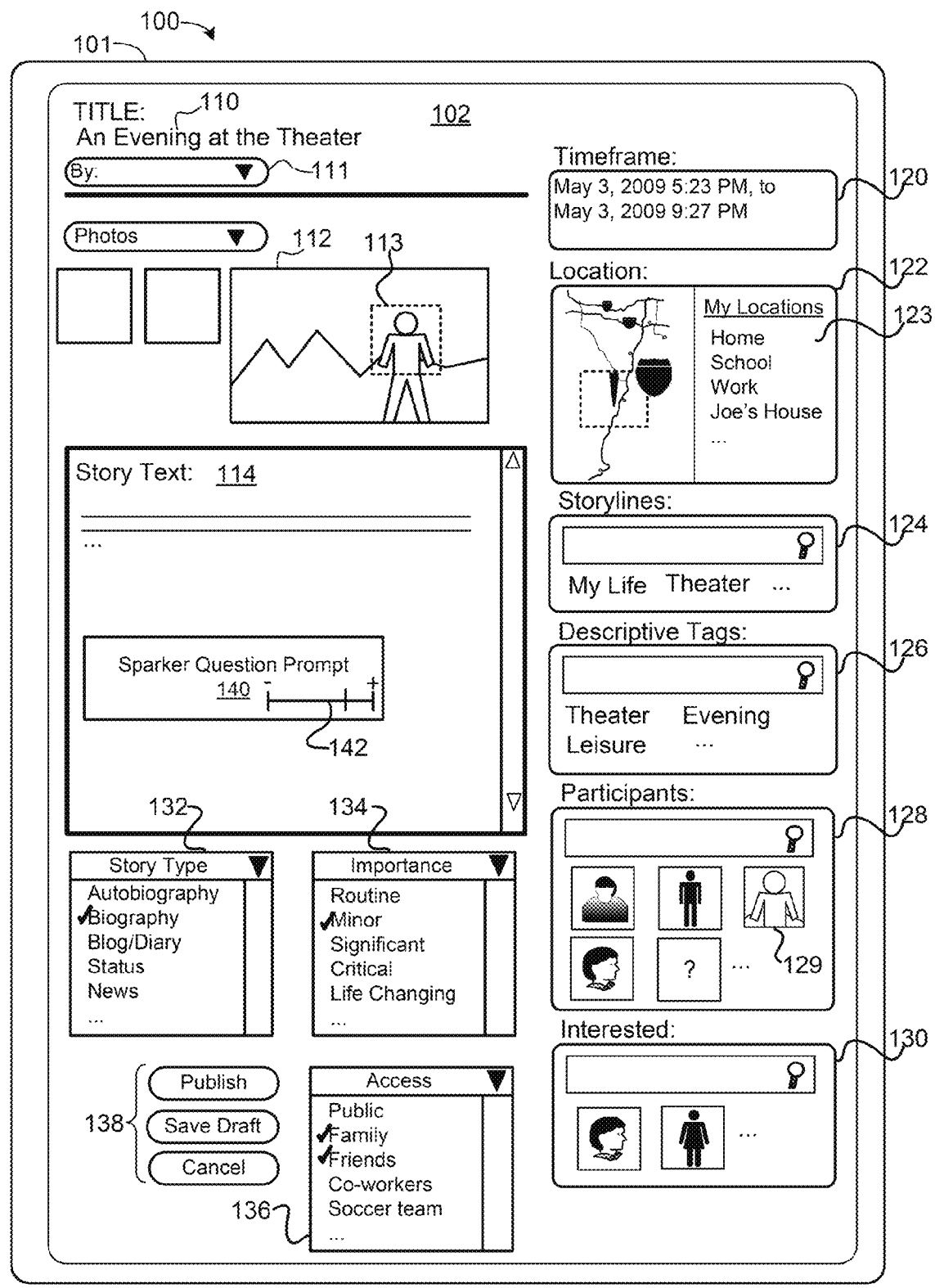
FIG. 1A depicts one embodiment of a story contribution interface.

Websites and/or web services featuring user-submitted content are becoming increasingly popular and are among the most heavily trafficked websites on the Internet. Content submitted to such websites is often transient and can be lost or removed over time. Moreover, given the high volume of user-submitted content, it may be difficult to find content of interest to particular users.

As will be described below, the value of user-submitted content may be increased by associating the content with descriptive metadata (including, but not limited to intersection metadata, such as timeframe and location). As used herein "content," "user-submitted content," and/or a "content item" may refer to any content or content item known in the art including, but not limited to: text, images, video, audio, executable code, markup language, attachments, or the like. In some embodiments, the intersection metadata may include a timeframe and/or location (among other things). The timeframe and location metadata may be used to group the content of a particular user into a "chronology," identify "intersections" between an intersection criteria (e.g., timeframe and/or location) and content, provide for convenient browsing and/or searching within dynamic "intersection spaces," and so on.

The teachings of the disclosure may be implemented using a generalized network-accessible service, which may be configured to allow users to: author, contribute, upload, and/or publish user-submitted content; manage content collections (e.g., storylines); present content including user-submitted content; search or browse user-submitted content; manage user profile or account information; maintain user privacy settings; manage access control preferences; and so on, as disclosed herein. Accordingly, the network-accessible service may comprise one or more computing devices, datastores (e.g., databases, computer-readable storage media, directories, and the like), communications interfaces, and other hardware and/or software components.

Users may access the network-accessible service using a computing device, such as a personal computer, a Personal Digital Assistant (PDA), a kiosk, a cellular phone, a Smartphone, a handheld computer, a notebook computer, a netbook, a tablet computer, or the like. User access may be provided via any communication mechanisms known in the art including, but not limited to: a Transmission Control Protocol/Internet Protocol (TCP/IP) network (e.g., the Internet), a Local Area Network (LAN), a Wide Area Network (WAN), a Virtual Private Network (VPN), a Public Switched Telephone Network (PSTN), a wireless network (e.g., radio, IEEE 802.11), a combination of networks, and so on.

In some embodiments, the network-accessible service may provide various user interfaces adapted for display on the various types of computing devices described above. The interfaces may be implemented using any user-interface mechanism known in the art. The interfaces may be provided as: Hyper Text Markup Language (HTML) interfaces, Virtual Reality Modeling Language (VRML) interfaces, text interfaces (e.g., TELNET), audio interfaces, Accessibility interfaces (e.g., a11y interfaces), and so on. Alternatively, or in addition, the network-accessible service may be configured to interact with one or more dedicated, client application(s), which may be special purpose applications installed on a user computing device and/or operating as plug-ins to other applications (e.g., operating as a browser application plug-in, an applet (or "app"), or the like).

In some embodiments, a network-accessible service may be implemented as a website (a computing system comprising one or more server computing devices). The website may be configured to provide interfaces and/or interface components in a browser-renderable format, such as HTML. However, as discussed above, the disclosure is not limited in this regard and could be implemented using any interaction technique known in the art.

A contributor may submit a "story" to a network-accessible service (e.g., website). As used herein, a story may comprise content (one or more content items) and associated descriptive metadata (including intersection metadata). A story may contain one or more content items, which, as described above, may include, but are not limited to: images, video, text, audio, executable code, and the like. Accordingly, as used herein, a "story" refers to a single content item (e.g., a single picture), a collection of content items (or the same of different types, e.g., photos with accompanying text), multi-media content, metadata, external content (e.g., linked, imported, or referenced content), or the like. For example, a story may consist of metadata that is not linked to any particular content item, but which conveys that a person was present or interested in a particular time, location, and/or subject matter represented by the metadata (regardless of the story content, if any); story metadata may determine the timeframe and/or location of the story in the absence of any story content. A story may consist of metadata that is linked to, or otherwise references, external content, such as content that is not stored on and/or maintained by the network-accessible service. For example, a story may consist of a link or reference to a blog post or article on an online newspaper, plus metadata (potentially including time and/or location) about the post or article. Story content (e.g., story content items) may comprise user-submitted content, user-authored content, linked content (e.g., content submitted by other users and/or available at network-accessible locations, such as other websites or services), or the like, as described above. A story may be associated with metadata, such as a timeframe, location information, people identified as story participants, people identified as finding the story of interest, identification of the story contributor, descriptive tags, rating information, and so on. The timeframe and location metadata of a story may be used as "intersection metadata," in that they determine an intersection of time and place.

Timeframe metadata may specify the "prevailing time" of a story. In some embodiments, the timeframe may indicate the timeframe during which the events described in a story took place. The story timeframe may be determined by the story contributor. For example, the timeframe of a story about a sporting event (e.g., football game) may comprise the time from the kickoff to the end of the game, a story about a particular play may be assigned a different timeframe (e.g., the last thirty seconds of the game), and the timeframe of a story about a fan's experience at the game may start when the fan arrives at the parking lot to tailgate and end in the middle of the first half when the fan becomes sick and has to leave. Alternatively, or in addition, timeframe metadata may be used to indicate a time period during which the story is "relevant," and, in some cases, may be open ended. For instance, the timeframe of a story about the contributor's life in a particular town may begin at the time the contributor moves to the town and may not be assigned an ending point until the contributor moves away.

In some embodiments, the timeframe may be expressed using an alias. For example, a contributor may not want to let other users know his/her true age. Therefore, in a story describing the contributor's high school graduation, the timeframe may be specified as simply "graduation day" or "senior year." The timeframe alias may be associated with an actual timeframe. However, access to the actual timeframe may be limited to certain trusted users (e.g., the contributor's family and friends). As will be discussed below, the use of an alias to specify story metadata (contributor, timeframe, location, or the like) may determine how other users can find the story. For example, a user may not be able to find the story based on timeframe, unless the user has access to the "actual time" of the story.

Story location metadata may indicate the "prevailing location" of a story. In some examples, the location may identify where the events described in the story took place. For example, a story about a sporting event may specify the location of the stadium. The location may be specified at varying levels of detail or granularity. For instance, the location metadata of a sporting event story may indicate the section and/or row where the contributor was sitting. Alternatively, the location may be specified more broadly to include a "region" around the events (e.g., the entire stadium, the city in which the game was played, and so on). Location metadata may describe where an event or other story took place, or alternatively it may describe the vantage from which the event was observed or the story told. For example, when Central Park in New York City is observed and photographed from the Empire State Building, the location metadata may describe either or both of the subject (Central Park) or vantage (Empire State Building). Location metadata may be used to indicate that the story took place at multiple locations. For instance, a story about a marathon may include location metadata that encompasses the race course. In some embodiments, the location may be tied to the timeframe information (e.g., to allow the metadata to reflect the contributor's progress through the race course over time). As will be discussed below, the location of a story and, in particular, the granularity of a story's location information, may determine, inter alia, how the story is presented to users on network-accessible service (e.g., website) and/or included in intersection spaces.

Although in some cases the location of a story may be a "real-world" location, such as an address or set of coordinates, the disclosure is not limited in this regard. A story may be associated with a "virtual" location in place of and/or in addition to a "real-world" location. A virtual location may or may not exist in the real world. In some cases, a virtual location may provide a more accurate description of a story location than any physical location could. A virtual location may identify a particular chatroom, a fictional location (e.g., Narnia), a location within a virtual world, such as the Playstation Home® network or Second Life, or the like. For instance, a story pertaining to a battle in a Massively Multiplayer Online Game (MMOG) may be associated with the game location where the battle took place (e.g., the dungeon of Thor) in place of (or in addition to) the player's home address. Similarly, a story about a conversation in a chatroom or other virtual space (e.g., Second Life, chatroom, Skype® call, etc.) may be associated with virtual location (e.g., in the "namespace" of the virtual space, such as a name of the chatroom, an "address" in Second Life, or the like).

In some embodiments, users collaborate on story content in a virtual space, such an online forum, Skype® conversation, instant messenger, etc. Story content, is presented in the virtual space, and contributors submit collaborative content (e.g., commentary and/or annotations), which is synchronized to the presentation and/or to story content itself. An author may selectively incorporate the collaborative content into the story, which is associated with intersection metadata and consumed by the network-accessible system disclosed herein. The intersection metadata of the story may comprise a "real-world" time and/or location associated with the story, as well as intersection criteria identifying the virtual space. For example, intersection metadata of a video chatroom conversation between participants in New York, California, and Nevada may identify the physical locations of the participants, may identify the "virtual space" in which the collaboration took place (e.g., the URL of the chatroom, etc.), and/or identify the location of events pertaining to the story content itself.

In some cases, stories occurring in the "real-world" may be assigned a virtual location identifier or alias. The location of a story describing a trans-Atlantic flight may be assigned a virtual location identifying the particular flight (e.g., Delta flight 2548) as opposed to the geographical area traversed thereby. Similarly, stories relating to experiences while at sea during a cruise may be assigned a virtual location identifying the cruise ship (e.g., the Celebrity Infinity) rather than and/or in addition to the geographical location of the cruise ship. In some cases, an authority may define and/or maintain a namespace of virtual addresses (e.g., in a similar way a map maker defines the "namespace" for physical locations). For instance, an airline or cruise ship operator may maintain an address namespace to identify particular flights and/or cruises. Similar namespaces may be developed for "virtual worlds," such as MMOG worlds, chatrooms, or the like.

Like the timeframe aliases discussed above, location aliases may be used to control access to private, sensitive, or not-fully public information. For example, a user may define a "home" alias to refer to his/her home address. When contributing stories pertinent to the "home" location, the contributor may identify the location using the "home" alias, as opposed to providing his/her actual address. The contributor may determine who may have access to his/her actual address information.

Users that the contributor trusts may be allowed to access the actual address of the home alias. Other users, who the contributor may not trust, may only have access to the "home" alias. As will be described below, access to the "actual" location of a story may determine whether the story appears in a particular "intersection space." For instance, a user who has access to the contributor's actual home address (not just the alias "home") will be able to find the story by its actual location (by specifying a particular location of interest that includes the contributor's home address). Other users, who do not have access to the contributor's home address, will not be able to find the story by location in this way.

Participant metadata may be used to identify persons pertinent to the story, such as those persons present and/or involved in the events described in the story. Similarly, interested persons' metadata may identify the people (e.g., users) who have indicated an interest in the story, or whom the contributor believes will be interested in the story, such as persons who were in a location pertaining to the story during a timeframe of the story as indicated by story metadata. Contributor metadata may identify the user who contributed the story and/or who participated in or provided assets used in the story. Descriptive tags may provide a concise set of descriptor for the story.

As discussed above, in some embodiments, a story location may refer to the location where the events described in the story took place. In some cases, the story location may be different than the contributor's location. For example, the contributor may contribute a story describing an event he/she did not attend (e.g., a story about watching a "LiveAid" concert the contributor watched from at home). The location of the story may be the location of the LiveAid concert and not the contributor's home. Alternatively, the story may be associated with multiple locations. For example, the contributor's story may describe a LiveAid concert party; the story may, therefore, be associated with both the location of the party as well as the location of the LiveAid concert. In another example, the location(s) associated with the story may be a combination of "real" and "virtual" locations. For example, a contributor may host a LAN party at his home to play a MMOG; the location of a story describing the LAN party may include the host's home as well as various virtual location(s) within the MMOG.

In some embodiments, a user may select descriptive tags from a tag library of commonly used tags, each of which may have an establishing meaning. Alternatively, or in addition, the user may define his/own descriptive tags, which may be any word (or nonsense term) that is useful to the user. In some embodiments, the contributor may ascribe a meaning to the user-defined tag by associating it with tags that have a well-defined meaning. For example, a user-defined tag "foo fighter" may be associated with tags, "grunge," "rock," "rowdy," and the like. The tags associated with the user-defined tags may be used when, as discussed below, story content is identified and/or filtered using descriptive tag metadata. For example, the "foo fighter" tag may "match" with one or more of the associated tags, such that a search for content marked as "grunge" will find the story and, conversely, when the user searches for items marked with "foo fighter," stories tagged with "grunge," "rock," and/or "rowdy" may be identified.

A story may be associated with one or more contributors. The story contributor(s) may identify the one or more users who contributed to the story. The contributors may be identified individually and/or as members of a group, and such a group may in some instances be associated with a specific storyline. In some embodiments, when a story is displayed by the network-accessible service (e.g., website), the display may include an indicator of the story contributor(s). The display may comprise a byline, a photo of the contributor, a link to the contributor's profile, or the like. Various examples of a story display interface comprising an indicator of the story contributor are described below in conjunction with FIG. 5C.

A contributor may contribute a story under an alias or pseudonym. The contributor may use the alias to publish a story without exposing his/her identity. A contributor may, however, make his/her true identity known to certain, selected circles. For example, a contributor may wish to publish a story on an embarrassing or sensitive topic with which the user may not want to be associated. In this case, the contributor may use an alias to which no other user has access. In another example, a contributor may publically publish a story pertaining to a controversial political issue. The contributor may want to hide his/her true identify from the general public, but may allow his/her "political friends" circle to access his/her identity behind the alias. Accordingly, a user may specify multiple aliases, each of which may be available within different circles (or completely private).

As will be discussed below, users may be allowed to comment on and/or rate user-submitted content. These ratings may be aggregated to form a "user reputation" or contributor rating. Examples of systems and methods for establishing and/or displaying a contributor rating are provided in U.S. patent application Ser. No. 12/540,171, entitled "Systems and Methods for Calculating and Presenting a User-Contributor Rating Index," and filed Aug. 12, 2009, which is hereby incorporated by reference in its entirety.

When a contributor applies an alias to a story, story ratings may accrue to the alias and/or the contributor himself. As such, the alias may have its own user alias-specific contributor rating, which may be accessible independently. Alternatively, or in addition, ratings on stories submitted under a contributor's alias may flow to the contributor himself. Accordingly, ratings for stories submitted by the contributor under an alias may be used to determine the contributor's overall rating. However, the source of the ratings that "flow through" from an alias may be hidden from those users who are not authorized to access the alias.

FIG. 1A depicts one example of an interface 100 for contributing a story according to the teachings of the disclosure. The interface 100 (and the other interfaces disclosed herein) may be configured to be displayed on a computing device, such as a personal computer, handheld device, or the like (e.g., laptop computer, smart phone, tablet computer, etc.); the interfaces may be displayed in a stand-alone application, within a browser application, or the like. In some embodiments, the interface 100 (and/or other interfaces disclosed herein) may be provided by a network-accessible storage location in an application-renderable format, such as Hypertext Markup Language (HTML) or the like. Accordingly, the interface 100 may be displayed within a window 102 of a browser application 101.

The interface 100 may include one or more inputs adapted to allow users to enter and/or edit user-contributed content, such as a title 110, contributor indicator 111, images 112 (and/or other media types, such as video, audio, etc.), text 114, metadata (described below), and so on. As would be appreciated by one of skill in the art, the interface 100 could be adapted to include any type of input adapted to receive and/or edit any type of content; as such, the interface 100 should not be read as limited in this regard.

The title input 110 may be used to provide a title to the story. As will be described below, in some embodiments, suggestions for a title may be derived from story text, story intersection metadata (location, time, descriptive tags, etc.).

The interface may include a contributor indicator input 111, which may be used to identify the story contributor, and, as such, may be pre-populated with the "user name" (or other identifier) of the story contributor. The contributor may modify the contents of the input 111 to display a "contributor alias," which may be used to hide the identity of the contributor to other users (and/or selectively expose the contributor's identity within certain circles according to contributor-defined access controls and/or allow the story to be visible on one or more storylines that have different names/identities). Accordingly, the input 111 may include a selection control (e.g., a drop down box, listing, or other interface) comprising contributor-defined aliases which may set as the story byline via input 111. In some embodiments, when the contributor enters text (other than his/her user-name) into the input 111, a new contributor alias may be created for use with the story.

The image input 112 may allow a user to upload and/or edit story images. The input 112 may include scaling, cropping, and/or other image editing features. Alternatively, or in addition, the input 112 (and/or the other inputs of the interface 100) may link to other assets hosted on other network-accessible storage locations. For example, images may be hosted at an image hosting website, video hosted on a video hosting website, and so on. Such assets may be "linked" and/or embedded into the story and/or may be imported and stored with other story content by the network-accessible service (e.g., website).

Although the interface 100 is depicted as including a particular set of content inputs arranged as depicted in FIG. 1A (e.g., title 110, byline 111, images 112, text 114, and so on), the disclosure is not limited in this regard. The interface 100 (or other interfaces) may be adapted to include any number of story content inputs and/or editing interfaces including, but not limited: to inputs configured to receive and/or edit: video, audio, interactive content (e.g., Flash video), applications, and so on, in any layout or ordering.

The interface 100 may include inputs adapted to receive story metadata, such as a timeframe input 120 and a location input 122. The timeframe input 120 may be capable of receiving an indication of a timeframe of the story, the timeframe may specify a story starting time and/or an ending time (or may be open ended). The story timeframe may indicate the timeframe during which the story occurred; indicate when the story was relevant or valid (e.g., I lived in Seattle from 1980 to 1992); or the like. In some embodiments, the start and/or end time of a story may not be determined at the time the story is contributed. As such, the input 120 may be configured to accept open-ended timeframe information (e.g., accept timeframes that lack a start time and/or an end time). Timeframe information may be specified at a later time via a story editing interface, which may be similar to the interface 100.

The location input 122 may be configured to receive location information as a particular address, region, set of coordinates, or the like (via a text input, not shown). In some embodiments, a story location may be specified using a map interface as shown in FIG. 1A. The map may be a "virtual map" or index into a set of virtual locations, as described above. The location input 122 may include a set of location "bookmarks" 123, which may keep a record of user-defined story locations. In some embodiments, the bookmarks 123 may correspond to location aliases, for which the contributor may specify access controls (discussed below). Virtual locations may be defined within a particular namespace. Accordingly, in some embodiments, the location input 122 may include additional map-like interfaces or inputs (not shown) configured to allow users to specify a virtual address in an appropriate namespace.

In some embodiments, the timeframe and/or location information may be obtained from content uploaded as part of the story. For example, an image received via the input 112 may include timestamp and/or location information as Exchangeable Image File Format (EXIF) data. The embedded timestamp and/or location information may be used to "seed" the timeframe and/or location inputs 120 and/or 122. Alternatively or in addition, seed timestamp and/or location information may be extracted from other story content, such as video content, text content or the like. For example, natural language processing (or other suitable text processing techniques) may be used to extract time and/or location information from story text, which is used to seed the timeframe and/or location inputs 120 and/or 122.

In some embodiments, the interface 100 may include a storyline input 124. As will be discussed below, storylines may be used to determine how particular stories appear or are arranged within the network-accessible service (e.g., whether the stories are associated with a contributor "lifeline" and/or whether the stories are included under other storylines). A storyline may be specified via a text input and/or a lookup mechanism through which previously used and/or defined storylines may be selected. In some embodiments, a story may be included in multiple storylines; in the FIG. 1A example, the story is included in the contributor's "life" storyline ("My Life") and a "Theater" storyline, which may be a contributor-defined storyline describing the contributor's experiences at the theater.

In some embodiments, the interface 100 may include a descriptive tag input 126 to associate descriptive tags with the story. For example, the contributor may tag a story about a youth soccer game with "soccer," "sports," and "youth," tags, a theater story with "Theater," "Evening," and "Leisure," and so on. The descriptive tags may be user-defined and/or selected from a tag library (e.g., using a search or lookup function of the input 126), as described above. As will be discussed below, the descriptive tags may be used within the network-accessible service (e.g., website) to provide for browsing and/or searching within story content. For example, stories within a particular intersection space may be identified (and/or filtered) according to their respective descriptive tags.

In some embodiments, the story title 110 may be automatically determined from the story tags (and/or other story metadata). For example, the title 110 of a story tagged with "soccer" and "game," and having a location of "Smith Park," may be titled "Smith Park Soccer Game." The contributor may edit the story title 110 as he/she sees fit. After receiving title text via the input 110, changes and/or additions to the descriptive tags 126 (and/or other story content) may not change the title 110.

The interface 100 may include a "participants" input 128 through which the contributor may identify one or more people who are pertinent to the story (e.g., persons who participated in the events described in the story). For example, in a story describing a dinner party, the participants input 128 may be used to identify the people (or a subset of the people) who attended the party. Story participants may be specified using a text entry field of the input 128 and/or using a lookup control, which may allow the contributor to search through a set of users he/she has identified in the past, may comprise a directory of registered users, or the like. In some cases, a story participant may not have an account with the network-accessible service (e.g., website). In some embodiments, an unregistered user may be represented as a "semblance." As will be discussed below, a semblance may be a contributor-defined representation of another person who may (or may not) be a registered user of the service. In some embodiments, when a previously unregistered user who was previously represented as a contributor-defined semblance registers a user profile, participant metadata (and/or other metadata) previously associated with the contributor-defined semblance may be reassigned so that it is associated with the registered user profile. In some embodiments, this is achieved by merging the semblance with the profile of the registered user; in another embodiment, it is achieved by merging the semblance with a different semblance of the referenced individual, and in yet another embodiment the semblance is maintained but its subject is identified unambiguously by being linked with the profile of the registered user.

In some embodiments, the contributor may identify story participants in other ways. For example, a story participant may have been captured in one of the story images 112. The contributor may identify the participant in the photograph 112, using a region selection 113. The contributor may associate the selected region 113 with a user (or semblance as discussed above), to include the person as a story participant. In some embodiments, image 112 or region 113 may be used to represent the participant in the story participant metadata 128 (e.g., as in participant indicator 129). As will be described below, users of the network-accessible service (e.g., website) may establish a profile, which may include one or more graphical depictions of the user (e.g., user avatars). In some embodiments, participants who have been identified (e.g., tagged) in a story image may use the image (or image region) as his/her profile avatar. If the participant is not associated with a registered user (e.g., is a semblance), the image may be stored to identify the semblance in the story and/or in other contexts (e.g., when the semblance is identified as a participant in other stories, etc.).

In some embodiments, the interface 100 may include an "interested persons" input 130, which may be used to identify users who may be interested in the story, but may not be story participants. For example, the contributor may contribute a story regarding a news event, a link, or other item of general interest. Accordingly, neither the contributor, nor anyone the contributor knows, may be properly identified as participants in the story. Instead, the contributor may identify persons that may be interested in the event (and/or the contributor's story about the event). Potentially interested people may be identified as described above (e.g., using a text input, a lookup or directory, and so on). Similarly, the contributor may contribute a story about an event in which other persons, who did not attend the event, may be interested. For example the contributor may contribute a story about his child's recital (including audio and/or video of the event); the child's grandparents may be identified as potentially interested persons, since they may be interested in the story, but did not attend the event (e.g., are not proper story "participants"). In another example, a contributor may write a story (including a story that refers to an address on the Web that contains third-party content) that reflects interests rather than activities, and identify other individuals who may hold a similar interest. In one embodiment, a user may designate potentially interested persons for a story they did not contribute, by tagging the individual much as they would tag an individual they identified as being a participant in a story that the user did not contribute.

The interface 100 may be configured to prompt the contributor to indicate whether he/she is a story participant and/or interested person. Based upon the response, the contributor (or alias thereof) may be added as a participant and/or interested person.

The interface may include a story type input 132, which may allow the contributor to select from various different "story types." Selection of a story type may determine the default layout and/or input options in the interface 100. For example, a "status" story may be automatically tagged with a "status" descriptive tag (in the input 126), and may include a shorter text entry area 114. The selection of a "biography" story type, for example, may cause the interface 100 to display a more complete set of input options, such as multiple photograph upload locations, multiple text inputs 114 (e.g., for title, summary, etc.), "sparker question" prompt(s) 140 (discussed below), and so on. In some embodiments, different story types may be associated with different interfaces or templates. For example, the "biography" story type may include an interface adapted to facilitate authoring biographical stories. The biography story interface may include a "wizard" type interface configured to guide the contributor through the authoring process (e.g., including appropriately selected sparker question prompts 140).

A rating story type may include rating inputs (e.g., sliders, drop down boxes, etc.), which may be used to rate the subject of the story (or content items thereof). For example, a story that reviews a restaurant could contain a review of the restaurant or of elements described in the story, such as the food or service of the restaurant. This type of story might include a control that allows a rating to be assigned and optionally displayed; for example, the rating might be expressed as a series of stars. The rating may pertain to the object of the story (e.g., the restaurant) as opposed to the story itself. Story types may further be divided into those that have the storyteller primarily as a participant in an activity and those that have the storyteller primarily as a party interested in a topic. The status of a story as a participant story or interested story could be expressed in various ways, including but not limited to: an explicit label, a logo or other graphical treatment, or the inclusion of the storyteller in a list of one or more individuals who are participants or interested with respect to the story.

Other story types, such as the "news" story type, may have certain security and/or access control implications. As will be discussed below, users who have been "tagged" as participants in a story may request to be removed therefrom. For example, a user may not want others to know that he/she was at a particular event, or the user may have been misidentified (maliciously or by mistake). If the story is a "non-news" story, and in some embodiments and/or circumstances even if it is a news story, the request for removal may be granted automatically. However, in some embodiments if the story is identified as "news," it is treated by rules that tend to preserve the rights of the storyteller because the subject of the story is presumed to be a public figure or the events and circumstances described in the story are assumed as public or newsworthy. When a story is tagged as news, participants (especially participants who are not minors) may not be given the absolute right to be removed. Instead, assuming the "news" tag is not withdrawn or removed, a participant might only be able to have himself or herself removed if it is determined that the participant was misidentified and/or there are other extenuating circumstances. Users who are tagged as participants in a story may be given the right to submit comments on the story (may have the "right to comment"). In some embodiments, participant comments may only be removed if the corresponding participant is "untagged" or "de-identified" as a story participant. User ratings of a story that a contributor designates as "news" may be evaluated in part as to whether the "news" designation is warranted, or instead whether the designation is perceived as a ploy to tag individuals who are not rightly the subject of news coverage and who choose to be untagged if the story were not labeled as news. It is anticipated that a contributor who is perceived as abusing the right to label a story as "news" will see their reputation decline, and with it their power to effectively abuse others. In some embodiments, the disapproval of members of the public regarding the nature of the contributor's tagging practices will be expressed with the story.

An importance input 134 may allow the user to provide an indication of the relative importance of the story from the user's perspective. As will be discussed below, some stories may be identified as life-changing "marker events." These types of stories may be prominently displayed in the life of the contributor. Other events may be displayed less prominently. Accordingly, the input 134 may allow a user to specify how important the story is in his/her opinion; the input may comprise a continuum (e.g., from 1 to 10) or a set of tags (e.g., "inconsequential," "routine," "minor," "significant," "critical," "life changing (marker)," and so on). Alternatively or in addition, an input may allow the user to provide an indication of the duration of the importance or relevance of the event. This can be thought of as the "zoom level" or "highlight level" of a story. A particular story about a bowling party might only be a highlight of a day or week, but a story about a wedding reception might be a highlight of a year, decade, or lifetime; the story about the bowling party might not appear in a storyline that was zoomed out to show a year or longer, but the story of a wedding reception might appear even on a storyline that covers decades.

The contributor may apply access privileges to the story using the input 136. In some embodiments, access to story content and/or access to private story information, such as location and/or timeframe information, may be predicated upon "circle" membership. Selection of a "public" publication may make the story available to all users of the network-accessible service (e.g., website). Alternatively, the contributor may specify that the story is only to be available to a certain "circle" of users, or that one or more elements of a story—such as its exact location, the presentation of certain photographs, or the ability to see the tags and/or captions of photographs—may be limited to people belonging to one or more circles of users. A circle may comprise a group of one or more users that the contributor "trusts" to some degree, or the people associated with a storyline. Circles may also be used to group users by the type of content they should receive (e.g., "friends" as opposed to "family"). For example, a "family" circle may comprise the contributor's family members, a "work" circle may comprise the contributor's co-workers, a "friends" circle may comprise the contributor's friends, and so on. The contributor may define the circles and determine circle membership, when using his or her own circles. In some embodiments, the user may be granted permission to use the circle of a different person or organization. The contributor may define any number of different circles corresponding to any number of different sets of relationship or intended audiences. The contributor may add/remove circle users at any time, or change the number and identity of the circles that have permission to consume a story. A user may be included in more than one circle (e.g., a co-worker may also be a friend). In one embodiment, circles may be public (which means that anybody looking at a user's profile can see the name of the public circle or circles and the person or people in those circles), private (which means that only the contributor who owns the circle can see who is in it), or restricted (which means that only the owner/contributor and certain other people, such as the other people in the circle, can see who is in the circle). Using the input 136, the contributor may select which circles should have access to the story. In one embodiment, the contributor may select not only from among his or her own circles, but also from among the public or restricted circles of others (to the extent the contributor is a member of the restricted circles of others).

The interface 100 may include a set of control inputs 138, including a "publish" input which, when selected, may cause the story content and associated metadata to be made available to other users via a network in accordance with the access controls specified via the input 136. The interface may also include a "save draft" input which may save the story to be edited and/or published later, and/or a "cancel" input to cancel the story (discard the story content and/or story metadata).

As discussed above, in some embodiments, the interface 100 (or other interface(s)) may include prompts configured to inspire the contributor. The prompts (referred to as "sparker questions") may be configured to "spark" the contributor's memory to inspire user-submitted content. Therefore, rather than simply placing the would-be-author before a blank page (or interface 100) waiting for a memory to present itself, the contributor may come into the interface 100 with an idea of what to contribute. The interface 100 includes an exemplary sparker question prompt 140 which, as discussed below, may be selected according to contributor profile and/or other user-contributed content (e.g., intersection metadata, other user-contributed stories, etc.) and/or information about the user obtained from other sources (such as from FACEBOOK® or other social networking service). In some embodiments a sparker question is presented as part of the contribution interface 100; in some embodiments a sparker question is presented elsewhere (outside the interface 100) and leads the user to a contribution interface, and in some embodiments a sparker question is placed both elsewhere and in the interface 100 (e.g., placed in a image input 112 to suggest a photo, or the like).

Some sparker question prompts may generally apply to all types of users (e.g., "did you ever get caught in the rain?" "when was your first kiss?" and so on). Other sparker questions may be selected according to the contributor's profile information. As will be discussed below, users may be associated with a profile, which may indicate the user's age, marital status, familial status, education level, employment status, interests, hobbies, and so on. The profile information may include information imported from other social media. The profile information may indicate which type of "life milestones" or "life experiences" the user is likely to experience at his/her particular stage in life. Accordingly, the profile may be used to determine the "stage of life" of the contributor. For example, the profile of a user may indicate that she is a 23-year-old divorced female with two kids. This user may be likely to have experiences related to raising children as a single mother (e.g., school experiences, play dates for the children, daycare experiences, and so on), which may be significantly different than the experiences of other users (e.g., a 70-year-old retiree). Accordingly, the "sparker questions" for the 23-year-old female user may be significantly different than the questions posed to the 70-year-old retiree. For that matter, the sparker questions for a 23-year-old divorced female with two children may differ from the questions for a 23-year-old married female with two children, a 23-year-old married female without children, or a 47-year-old divorced female with two children, and so on.

Changes to user profile information may prompt sparker questions. For example, a change to the user's familial status (e.g., a new child on the way), may prompt sparker questions regarding plans for the new child, experiences during pregnancy, and so on. As will be discussed below, in some embodiments, a user's profile information may be tied to a relevant timeframe. For example, a user's favorite song may be different in 2005 than it was in 2003. The user profile may include all of the user's "favorite song preferences," each associated with the timeframe during which the particular preference was valid (e.g., from 1999-2001 the user's favorite song was "A," from 2002-2005 the user's favorite song was "B," and so on). Sparker questions may be derived from the "history" of changes in the user's profile (e.g., why did your favorite song change from "A" to "B" in 2002?).

Other sparker questions may be prompted by content submitted by the user. For example, the user may contribute a story describing a funeral, which may prompt sparker questions related to the user's experiences with the deceased (e.g., "what do you wish you had learned from your grandfather before he died?"). The content used to identify sparker questions may be selected from the descriptive tags applied to the story (and/or provided via descriptive tag input 126). In some embodiments, as descriptive tags are applied via the input 126, relevant sparker questions may be presented "in-line" as the user authors portions of the story in the interface 100. Other story metadata, such as timeframe and/or location may be used to identify relevant sparker questions. For example, a story taking place far from the contributor's home may prompt sparker questions configured to elicit writing about the contributor's experiences traveling to the location, and so on. In another example, a record of interaction with one or more people, whether on Intersect or other social media, may prompt questions about those people.

In some embodiments, the sparker question prompt 140 includes a rating input 142, through which the user provides feedback regarding sparker questions. The rating feedback may be used to select relevant sparker questions for the user and/or select relevant sparker questions for other users in a similar stage of life.

Figure 2:
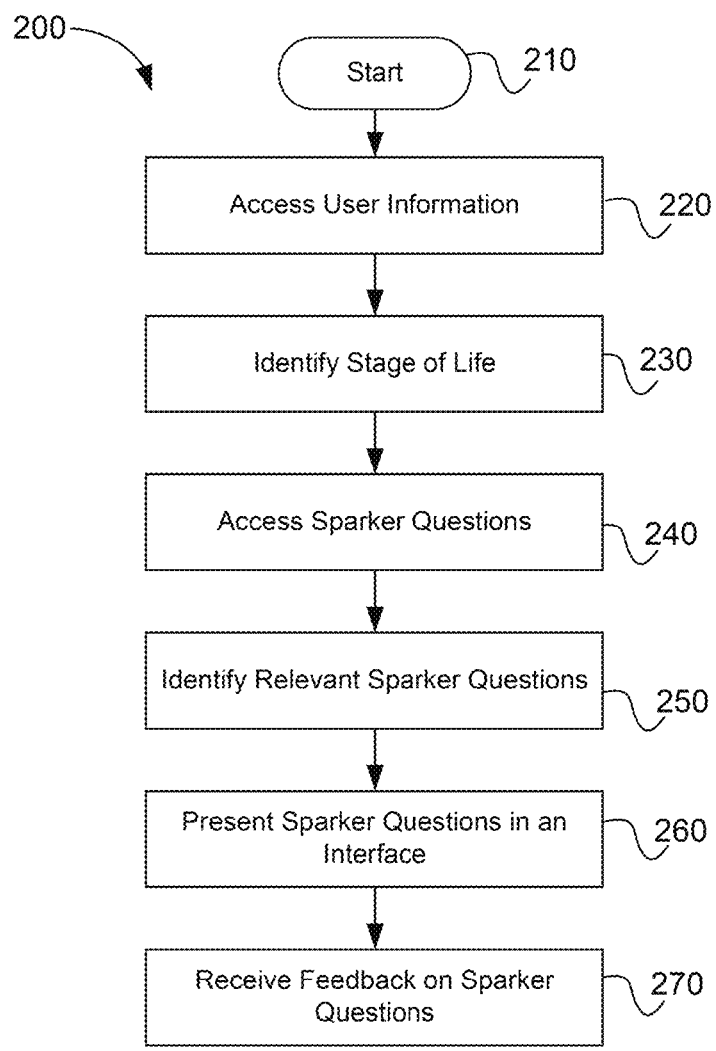
FIG. 2 is a flow diagram of one embodiment of a method for identifying sparker questions.

FIG. 2 is a flow diagram of one embodiment of a method for identifying sparker questions for a contributor. At step 210, the method 200 may be initialized, which may comprise allocating resources for the method 200, such as processing resources, memory, communications interfaces, and the like. Step 210 may further comprise loading one or more instructions from a computer-readable storage medium. The instructions may be configured to cause the computing device to perform the steps of method 200 and, as such, may be tied to particular components of the computing device.

At step 220, information about the contributor may be accessed. The information may comprise user profile information, content submitted by the contributor, content harvested from one or more third-party sources (e.g., FACEBOOK®, TWITTER®, etc.), and the like. As discussed above, the user profile may comprise information describing the contributor. Entries in the user profile may be associated with a relevant timeframe, which may reflect the changes to the user profile over time. Contributed content may include stories and associated metadata submitted by the contributor.

At step 230, the information described above may be analyzed to identify a "stage of life" of the contributor. A stage of life may be assigned based on the age of the individual. A number of different stage life states may be identified, potentially including, but not limited to: "Caterpillar" Early Child (age 0-5); "Socializer" Child (age 5-12); "Shapeshifter" Early Adolescent (age 13-14); "Tester" Adolescent (age 15-18); "Parachuter" Incoming Early Adult (age 18-23); "Explorer" Early Adult (age 23-28); "Homesteader;" "Navigator" Independent Adult, Part 1 (age 33-36); "Strider" Independent Adult, Part 2 (age 36-40); "Seeker" Incoming Midlife Adult (age 40-45); "Mediator" Midlife Adult, Part I (age 45-50); "Mentor" Midlife Adult, Part II (age 50-60); "Discoverer" Mature Adult (age 60-70); "Generator" Senior Adult (age 70-80); and "Celebrator" Elderly Adult (age 80+).

The stage of life may provide some indication of the types of sparker questions that are likely to be relevant and/or helpful to the user. In addition, information regarding the user's "place in life" (e.g., collection of life experiences, which may include stage of life) may be used in the selection of the sparker questions. For example, in some cases, two people may be of a similar age, but be in very different "places in life" due to having different life-changing "marker events." For example, a 23-year old divorced single mother is in a very different "place in life" than a single 23-year old post-graduate student; the "place in life" information of the user may be evaluated to select appropriate sparker questions for each user.

As will be discussed below, the life experiences indicative of a user's "place in life" may be identified to the network-accessible service by marking certain events as life-changing, "marker events" or "milestones" (and/or by examining other user-submitted content and/or metadata). For instance, in the interface 100 disclosed above, a contributor may indicate his/her opinion of the importance of a story (e.g., "life changing"), which may be used to identify a marker event. Alternatively, or in addition, marker events may be determined from the user profile information as discussed above (e.g., marital status, education level, etc).

As will be discussed below, identifying a user's "stage" and/or "place in life" may be used to identify user affinities (e.g., users in the same "stage" and/or "place" may have a lot in common and, as such, may be introduced to one another through the service).

In some embodiments, user "disposition" information (discussed below) may be used to select sparker questions. Some of the disposition indicators may apply for a limited period of time. For example, a "bereaved" disposition may be identified for a contributor who has recently indicated (through a profile update or contributed content) that a close relative has died, and may be removed after a certain time (e.g., six months). The stage of life, place in life, and/or disposition information discussed above may be identified for the contributor and used (at steps 240 and 250) to select appropriate sparker questions for the contributor.

At step 240, a datastore comprising a set of sparker questions may be accessed. The sparker questions may each be associated with a particular set of one or more "stage of life" indicators, which may specify which "stage of life" is likely to benefit from the question. Accordingly, a sparker question regarding experiences raising children may be associated with "mother" and/or "father" indicators, a "dating" question may be associated with "single" and/or "divorced" indicators, and so on.

At step 250, a plurality of candidate sparker questions may be identified by matching the stage of life, place in life, and/or disposition information of the contributor determined at step 230 to the stage of life indicators of the sparker questions accessed at step 240. The matching may comprise ranking the sparker questions according to a degree of correlation between the contributor's stage of life and the sparker question indicators. In some embodiments, the matching of step 250 may be configured to prevent the same sparker questions from being constantly repeated. For example, when a particular sparker question is presented, the contributor may indicate whether the sparker question was helpful and/or whether the contributor would like to see similar questions. In some embodiments, the matching of step 250 may further comprise a feedback component (discussed below), in which the contributor provides feedback regarding which sparker questions were helpful, and which were not. The feedback information may be used to match other sparker questions and/or to exclude certain unhelpful sparker questions in the future. The feedback may be used to remove a "stage of life," "place in life," or other classification(s) from the contributor (a never-remarried divorced contributor may not be interested in ever writing about "dating" experiences). Sparker questions similar to those identified as "helpful" may be used in further iterations of the method 200.

At step 260, one or more of the identified sparker questions may be presented to the contributor in an interface, such as the contribution interface 100. In other embodiments, a sparker question (or a group of sparker questions) may be formed into a "story template" or story outline which the user may be prompted to complete. The outline may be presented in an interface (such as the interface 100), in which certain fields are pre-populated and/or the sparker questions are pre-populated in the text entry field 114.

At step 270, the user may provide feedback regarding a sparker question(s) presented at step 260. The feedback may indicate whether the sparker question was attractive and/or effective at promoting the contributor to author content. The feedback may further indicate whether the contributor would like to see the question (or similar questions) in the future. The feedback may be stored in a datastore in association with the sparker questions and/or the contributor's profile. As discussed above, the feedback may be used when a next set of sparker questions are selected from the contributor.

Referring back to FIG. 1A, the text entry field 114 may include a sparker question prompt 140. The sparker question prompt 140 may include the text of a sparker question ("describe your first kiss") as well as a feedback input 132. The contributor may author a response to the sparker question "in-line" with the prompt 140. In some embodiments, the prompt 140 may act as an interface element (e.g., "text box") to encapsulate the text related to the prompt to allow the contributor to keep track of which text was added in response to which sparker question(s). In addition, the text included in the prompt 140 interface element may be used, along with the feedback input 132, to evaluate the efficacy of the prompt 140. In other embodiments, the prompt 130 may be removed if/when the user enters text in the text field 114 or selects other components on the interface 100.

Although the sparker question prompt 140 is shown on the contribution interface 100, the disclosure is not limited in this regard. Sparker question prompts could be displayed on any number and/or types of different interfaces. For example, a sparker question prompt may be displayed while the user views a story submitted by another contributor, or while the user views content from, or the identity of, a user of a social media site such as FACEBOOK®. In this case, the sparker question prompt may ask whether the user has had an experience similar to the viewed story (in the same timeframe and/or location). The sparker question prompt may link the user to an interface (e.g., interface 100), which may be pre-populated with a relevant set of content (e.g., timeframe, location, descriptive tags, prompt 140, and so on).

Figure 1B:
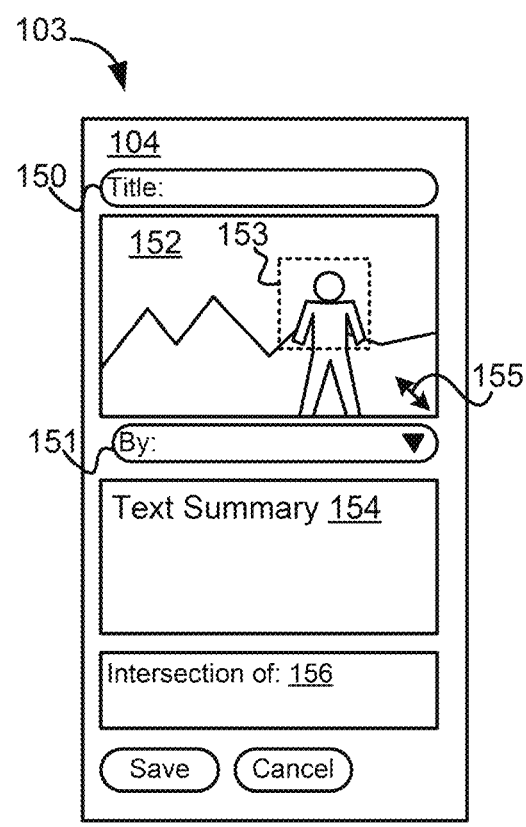
FIG. 1B depicts one embodiment of a link badge authoring interface.

As will be described below, in some embodiments, an interface may display a plurality of stories. The stories may be displayed in various different formats including a "link badge" format. Examples of a link badge display format are described below in conjunction with FIGS. 5A and 5B. A link badge format may include a photograph thumbnail (if available) taken from the story, a story title, a byline, a text excerpt from the story, an abbreviated list of story participants, story intersection identifiers, and so on. In some embodiments, the content included in a story link badge may be automatically selected from the story. For example, the first image in the story (or a first frame of a story video) may be selected for the thumbnail, the first portion of the story title may be selected for the link badge title, the first paragraph may be used as the excerpt, and so on. Alternatively, or in addition, the contributor may explicitly author the link badge and/or portions of the link badge. FIG. 1B depicts one example of an interface 103 for authoring a link badge. The interface 103 may be displayed in connection with the contribution interface 100 described above. For example, the link badge authoring interface 104 may be displayed along the sidebar of the interface 100 (with other inputs of the interface 100). Alternatively, the interface window 104 may be displayed "on top" of the interface 100 (e.g., as a selectively displayed overlay window 104).

In some embodiments, the interface 103 may include a title input 150, which may be used to specify a title for the link badge. The title input 150 may be pre-populated with the contents of the title input 110 of the underlying story (or a portion of the contents of the title input 110 of FIG. 1A). The title input 150 may change as the contributor edits the title of the story (via input 110). The contributor may edit link badge title input 150 to change the way the title is displayed in the link badge (e.g., to be more concise in accordance with the smaller display format of the link badge). In some embodiments, once the contributor explicitly edits the title input 150, it may no longer be "tied" to the underlying story (e.g., may no longer update responsive to changes to the story title).

The interface 103 may include a link badge image input 152, which may be used to select an image (if any) or image region 153 to display in connection with the story link badge. The image may be selected from the underlying story or from some other source. In some embodiments, the input 152 may be pre-populated with the first or primary image of the story (if any). As the primary story image changes (e.g., as story images are added/removed in the interface 100), the image input 152 may be updated accordingly. In some embodiments, however, once the contributor explicitly selects the link badge image via the input 152, changes to the story may no longer be reflected in the input 152. The link badge image input 152 may include a scaling control 155, which may be used to scale and/or crop the image (or image region) in the link badge.

In some embodiments, the interface 103 may include a byline input 151, which may be provided to allow the contributor to modify the contributor indicator of the story (as displayed in the link badge). The byline input 151 may be used to specify a "contributor alias" to hide the contributor's true identify from other users in the link badge as discussed above and/or to remove the byline from the story link badge. In other embodiments, the story byline may not be modifiable. The byline input 151 may be pre-populated and/or be updated according to the contributor indicator information provided via the contribution interface 100 (via input 111). Once the contributor explicitly selects a byline via the input 151, however, the input 151 may no longer update in response to changes in the underlying story.

The interface 103 may include a text summary input 154 to specify the "primary text" (if any) to be displayed in the link badge. The text input 152 may be pre-populated with a portion of the story text (e.g., the first paragraph of the text input 114). The text input 154 may be tied to the underlying story text until the contributor explicitly edits the text in the input 154.

In some embodiments, the interface 103 may include an intersection display input 156, which may be used to specify how various "intersection criteria" of the story are displayed in the link badge. As will be discussed below, intersection criteria may comprise story metadata, such as story location, timeframe, contributor, descriptive tags, and the like. For example, a particular intersection identifier may read, "intersection of Smith Park" and "5:50 PM to 7:20 PM, Jan. 4, 2009," or "soccer at Smith Park . . . ," and so on. The intersection identifier input 156 may be tied to the underlying story metadata until the contributor explicitly edits the identifier (or elects to remove the identifier from the link badge). In some embodiments, the intersection identifier may not be modifiable. When displayed (in link badge format and/or in a story display, such as the display 504 of FIG. 5C), the story indicator may link to an interface configured to display other stories that intersect with the story (e.g., stories in the "intersection space" of the story).

In some embodiments, the interface 103 may include additional inputs, to modify other story elements and/or metadata for display in link badge format including, but not limited to: story participants, interested people, descriptive tags, storyline, story type, importance, and so on.

In some embodiments, the network-accessible service (e.g., website) may provide search and/or browse features (discussed below), to allow users to find story content using the metadata associated therewith, such as the story timeframe and/or location. These features may allow users to identify "intersections" between stories and particular timeframes and locations, including the current time and location, (or other criteria). As used herein, a time and location intersection (referred to generally as an "intersection") refers to a similarity or "overlap" between the timeframe and location of a story a timeframe and/or location of interest (referred to generally as "intersection criteria"). For example, intersection criteria may define a timeframe and/or location of interest to a particular user, such as the then-current time and place (the "here and now") or the time and place a youth sporting event took place. The intersection criteria may be provided by a user via a search or browsing interface, such as the interfaces described below in conjunction with FIGS. 5A and 5B. Alternatively, the intersection criteria may be derived from another story (e.g., the intersection criteria may be derived from the intersection metadata of the story). In other examples, intersection criteria may be derived from a current location of the user and/or the current time (as indicated by a computing device of the user, such as a mobile phone, portable computer, tablet, or the like).

In response to the intersection criteria, components of the network-accessible service (e.g., website) may be configured to identify one or more "intersecting" stories, which are stories having metadata that "intersects" with the intersection criteria. For example, the intersecting stories may include stories that have time and location metadata that "overlaps" with the time and location of the intersection criteria. The stories may be presented to the user in an interface and may be ordered based on a relevance metric (discussed below). For example, when a long timeframe is used and the content is ordered based on relevance or ratings, the resulting intersection space may include "best of" stories for the specified location, such as the most highly-regarded reviews of a restaurant over a long time period.

Figure 3:
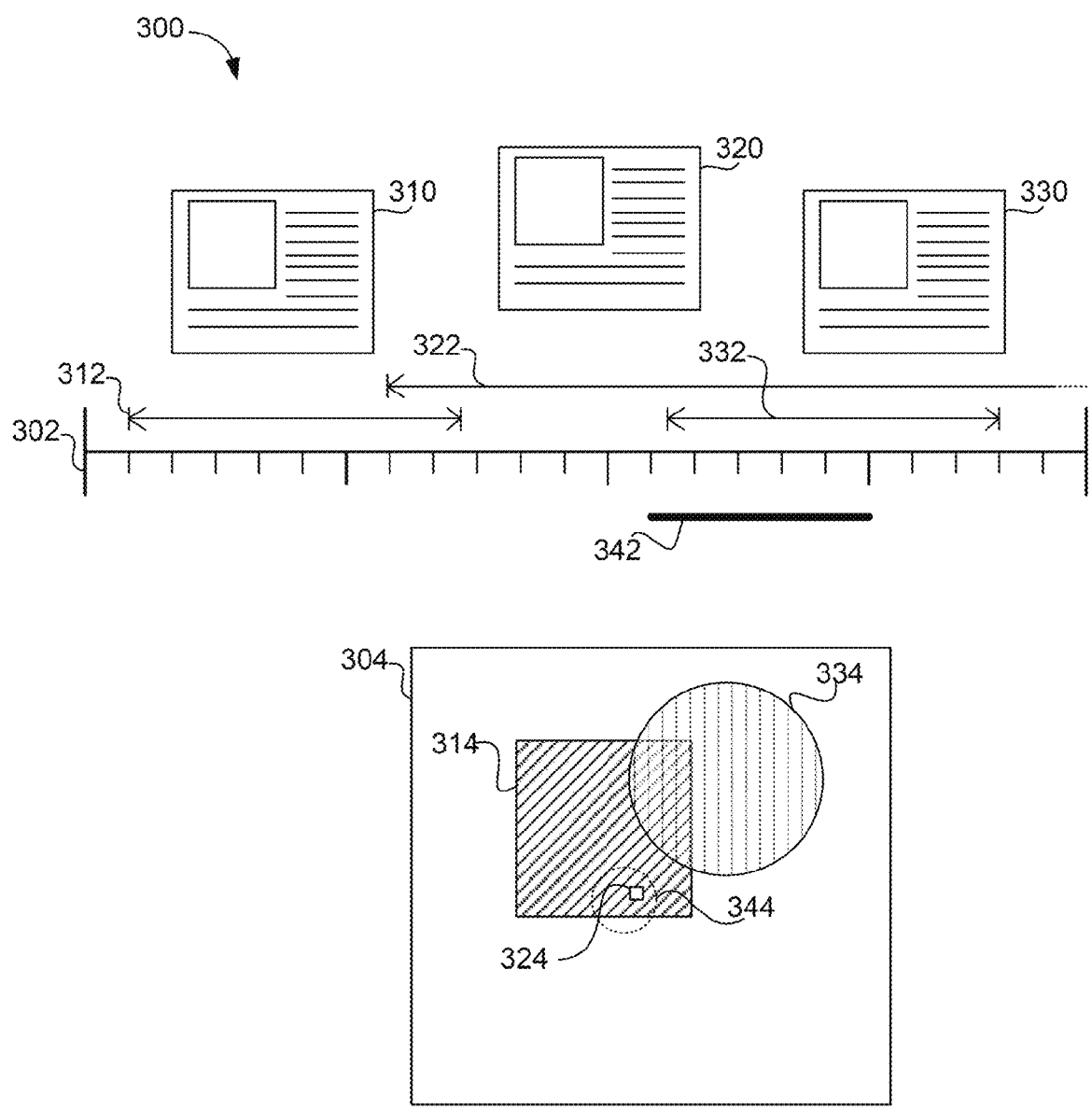
FIG. 3 depicts exemplary intersections.

FIG. 3 depicts one example of a timeframe and location intersection. Metadata associated with the stories 310, 320, and 330 are depicted on an exemplary chronology 302 and location map 304. A first story 310 is associated with a first timeframe 312 and a first location 314, a second story 320 is associated with a second timeframe 322 and a second location 324, and a third story 330 is associated with a third timeframe 332 and third location 334. The timeframe 320 is open ended (has not been assigned an end point). The location metadata of the stories may be defined at different granularities; for instance, the location 324 of the story 320 may be defined relatively specifically (e.g., as a particular address), whereas the locations 314 and 334 may include broader regions (e.g., a block, subdivision, city, etc.).

The intersection criteria may be expressed as a timeframe 342 and location 344. Like the locations 314, 324, and/or 334, the location intersection criteria 344 may be specified with varying specificity; the criteria 344 may be expressed as a location "point" (e.g., an address or location coordinate) or as a larger region. Stories having metadata that overlaps the intersection criteria 342 and 344 may be identified as "intersecting" stories.

In the FIG. 3 example, the story 320 may be identified as an "intersecting" story. The timeframes 322 and 332 intersect with the timeframe intersection criteria 342, and the locations 314 and 324 intersect with the location intersection criteria 344; only story 320 intersects with respect to both time 342 and location 344.

In some embodiments, the intersection criteria 342 and 344 may be dynamically modified by the user. For instance, a user may expand or shift the timeframe 342 of the intersection criteria to overlap the timeframe 312, which may cause the story 310 to intersect with the modified intersection criteria 342 and 344. Similarly, the user may expand or shift the location portion 344 of the intersection criteria to overlap the location 334, which may cause the story 330 to intersect with the modified intersection criteria 342 and 344.

In some embodiments, the timeframe and/or location (or other metadata) of a particular story (e.g., story 310) may be used to identify other intersecting stories. In the FIG. 3 example, the stories 310 and 320 may intersect with one another with respect to time and location, since their timeframe 312, 322 and location 314, 324 metadata overlap. Intersections between stories may be identified by deriving intersection criteria from a first story (e.g., story 310), and using the derived intersection criteria to identify other, intersecting stories (e.g., story 320). As will be discussed below, story-to-story intersections may be used to identify shared interests between users and/or to aggregate stories related to similar events.

Although FIG. 3 describes intersection criteria based on a timeframe and location ("TL intersection criteria"), the disclosure is not limited in this regard. For example, TL intersection criteria may be combined with other metadata criteria to "filter" the intersecting stories. The criteria may be based on any type of story metadata including, but not limited to: story participant(s), story contributor(s), descriptive tags, interested person(s), story type, importance, relevance to intersection criteria, story ratings (a metric quantifying a "quality" of the story or contributor), and so on. For instance, TL intersection criteria may be combined with descriptive tag criteria to identify a subset of the intersecting stories that relate to a particular event (e.g., are tagged with a particular descriptive tag). For example, TL intersection criteria may be combined with a "soccer" tag to identify stories related to soccer games that took place at a particular time and location.

Other types of intersection criteria may be predicated upon other types of metadata. For example, timeframe and contributor intersection criteria ("TC intersection criteria") may be used to identify the stories contributed and/or "borrowed" by a particular user during a particular timeframe (story borrowing discussed below). In another example, timeframe and participant intersection criteria ("TP intersection criteria") may be used to identify stories in which a particular user was a participant during a particular timeframe. As could be appreciated by one of skill in the art, the teachings of the disclosure could be adapted to use virtually any combination of metadata to identify and/or filter intersecting stories.

Figure 4:
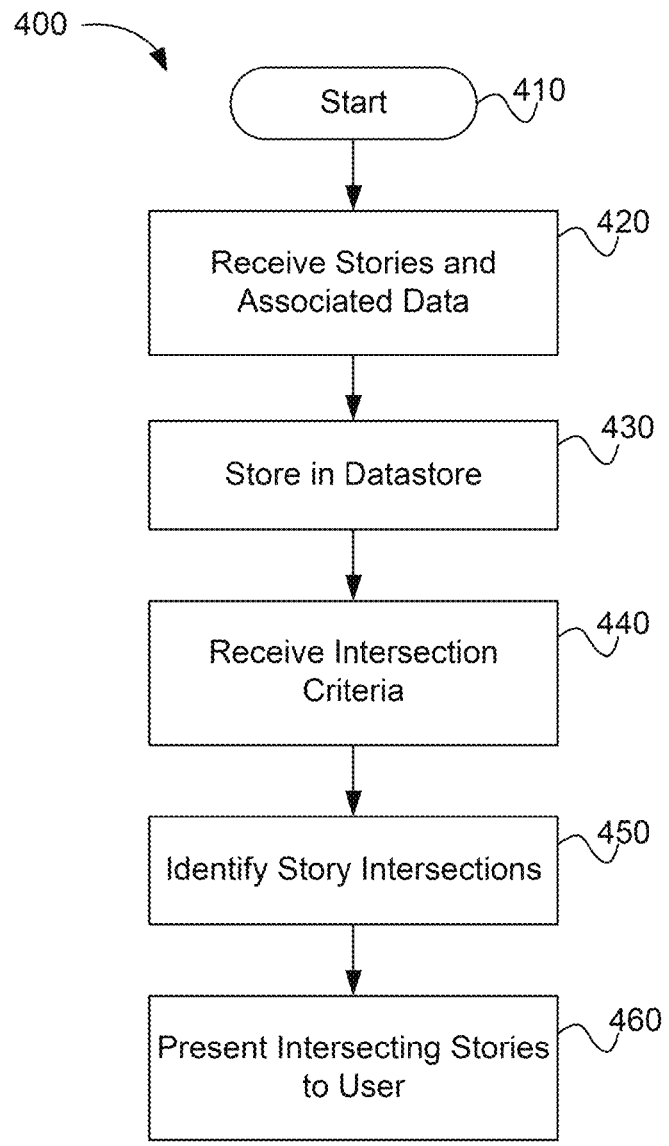
FIG. 4 is a flow diagram of a method for identifying intersections.

FIG. 4 is a flow diagram of one embodiment of a method 400 for identifying stories using intersection criteria. At step 410, the method 400 may be initialized as described above.

At step 420, one or more stories and associated metadata may be received. Each of the stories received at step 420 may comprise one or more content items and associated metadata, such as a timeframe, location, participants, contributor(s), descriptive tags, and so on. The stories may have been contributed and/or authored using an interface provided by a network-accessible service (e.g., website), such as the interface 100 of FIG. 1A.

At step 430, the one or more stories (and associated metadata) may be stored on a datastore (e.g., database, directory, or the like) and made available for access by users via a network, such as the Internet. In one example, one or more of the stories may pertain to a youth sporting event. The stories may include photographs of the participants, which may be of interest to other event attendees.

At step 440, intersection criteria may be received. The intersection criteria may comprise a timeframe and location (e.g., may be TL intersection criteria). The intersection criteria may be received from a user via a user interface (e.g., via the interfaces 500 and/or 503 described below in conjunction with FIGS. 5A and 5B). The timeframe of the intersection criteria may comprise a chronological range having a starting point (start time) and/or an ending point (ending time). The location of the intersection criteria may identify a location or region of interest. The location may identify a "real-world" location (e.g., an address, set of coordinates, etc.) or "virtual" (a location in a virtual space, a mobile location, an alias, or the like). The location may be specified at varying levels of detail or specificity (e.g., as a particular address, a block, a neighborhood, a region, and so on).

Continuing the example above, the intersection criteria received at step 440 may be provided by a user interested in the youth sporting event. Accordingly, the intersection criteria may identify the timeframe and location of the event (e.g., Apr. 12, 2008, from 2:30 PM to 4:40 PM at Smith Park).

At step 450, the method 400 may query the datastore to identify stories that intersect with the timeframe and location of the intersection criteria. Continuing the youth sporting event example, the intersecting stories identified at step 450 may comprise the stories available to the method 400 (e.g., stored in the datastore) that occurred within the specified location (e.g., Smith Park) during the specified timeframe (Apr. 12, 2008 2:30 PM to 4:40 PM).

Step 450 may further comprise filtering the intersecting stories. As discussed above, intersection criteria may include additional constraints, which may be used to "filter" intersecting stories. For example, to find intersecting stories related to the youth sporting event, the stories may be filtered using a "soccer" descriptive tag, a "participant" filter may be used to identify the stories in which a particular user appears, and so on.

At step 460, the stories identified at step 450 may be presented to the user in an interface. The results may comprise a list of stories that intersect with the provided intersection criteria and/or satisfy one or more additional filter constraints. In some embodiments, the results may be ordered relative to one another in the interface, such that the stories that are most likely to be of interest to the user are more prominently displayed (e.g., displayed near the head of the list or stories). Examples of systems and methods for ordering intersecting stories are discussed below.

Although FIG. 4 describes identifying intersections with respect to timeframe and location, the disclosure is not limited in this regard; the teachings of the disclosure could be used to identify intersections of any type. For instance, timeframe-contributor intersection criteria may be used to identify stories contributed and/or borrowed by a particular user during a particular timeframe, timeframe-participant intersection criteria may be used to identify stories in which a particular user appears, and so on.

The intersection criteria described above may be used to define an "intersection space." As used herein, an "intersection space" may refer to a "virtual companion space" that may aggregate content that intersects with a particular set of intersection criteria. Accordingly, an intersection space may refer to a particular junction of timeframe and location, such as Apr. 12, 2008, from 2:30 PM to 4:40 PM and "Smith Park." An intersection space may act as a "home page" to document activities occurring at the park during the specified timeframe. Of course, an intersection space may be defined more broadly. For example, an intersection space may be defined along a very long timeframe (e.g., unlimited timeframe) to chronicle the history of a particular location (e.g., chronicle the history of a particular building or institution). Alternatively, an intersection space may be limited to the "here and now," to provide a real-time display of stories told, potentially from various vantages, pertaining to the time and location of the user. Different levels of metadata specificity may determine which stories are included in an intersection space and how the stories are displayed and/or ordered therein.

In one illustrative example, a contributor may create a story regarding a trip to the summit of Mt. Rainier on Jul. 10, 2003, at 10:15 AM. The timeframe of the story may include the short time the contributor actually spent on the summit (e.g., 30 minutes), may comprise the entire day of the hike, or some other timeframe (e.g., the weekend of the trip, the month of July 2003, the season, and so on). Similarly, the location of the story may be provided at varying levels of specificity; the location may be the summit area itself, the area traversed during the summit approach, the mountain range, the entire state of Washington, and so on.

The timeframe and/or location metadata assigned to the story may determine what other stories will intersect with the story's intersection space. For example, if the contributor assigns the "30-minute" timeframe to his story, the story may not intersect with the story of another hiker who summited Rainier at 1:20 PM on the same day (and specified a similarly specific timeframe for his story). If the contributor were to specify a broader timeframe, however, such as the entire month of July 2003, the intersection space of the contributor's story may include other stories occurring during the month of July 2003, including the story of the 1:20 PM summit.

The location metadata may similarly define the scope of the intersection space. For instance, if the contributor were to specify the location of his story as a small area in the vicinity of the summit, the story may not intersect with the story of another hiker who stopped short of the summit (and specified a similarly narrow location). If the contributor used a broader location, such as the entire mountain range, the resulting intersection space would include other hikes to the summit, as well as other experiences that may be unrelated to a summit attempt.

As discussed above, in some embodiments, the location of a story may be "virtual," such as a location within a MMOG, a cruise ship, a business name, or the like. For example, an intersection space of a restaurant may chronicle the events occurring at the restaurant despite the fact that the restaurant may have changed locations several times during its history. Since the intersection space is defined with respect to the restaurant as opposed to a particular location or address, the intersection space may "follow" the restaurant as it moves from place to place. Similarly, an intersection space specified with respect to a particular cruise ship may "follow" the cruise ship's movements (may be referenced by name as opposed to a particular, "real-world" location).

An intersection space may be specified with respect to other types of intersection criteria, such as story contributors, story participants, and the like. For example, an intersection space may chronicle the stories involving a particular set of participants during a particular timeframe (e.g., the stories involving a youth soccer team). As will be discussed below, these types of intersections may be formed into a "storyline," which may chronicle a particular set of related stories. The intersection space of a particular contributor may comprise all the stories contributed (or borrowed) by the contributor over his/her lifetime. Accordingly, a contributor intersection space may represent the lifetime "storyline" of a particular user.

Like the story content and metadata discussed above, an intersection space may be submitted to a network-accessible service (e.g., website) and stored on a datastore thereof (e.g., database, directory, or the like), which may provide an interface (e.g., a webpage) to display intersection spaces. For example, the network-accessible service (e.g., website) may provide an interface dedicated to the intersection space of the summit of Mt. Rainier and the month of July 2003. The intersection space interface may act as a repository of the stories related to a particular time and place. Alternatively, or in addition, an interface through which users may dynamically determine an intersection space may be provided (e.g., interface 500 of FIG. 5A discussed below).

Figure 5A:
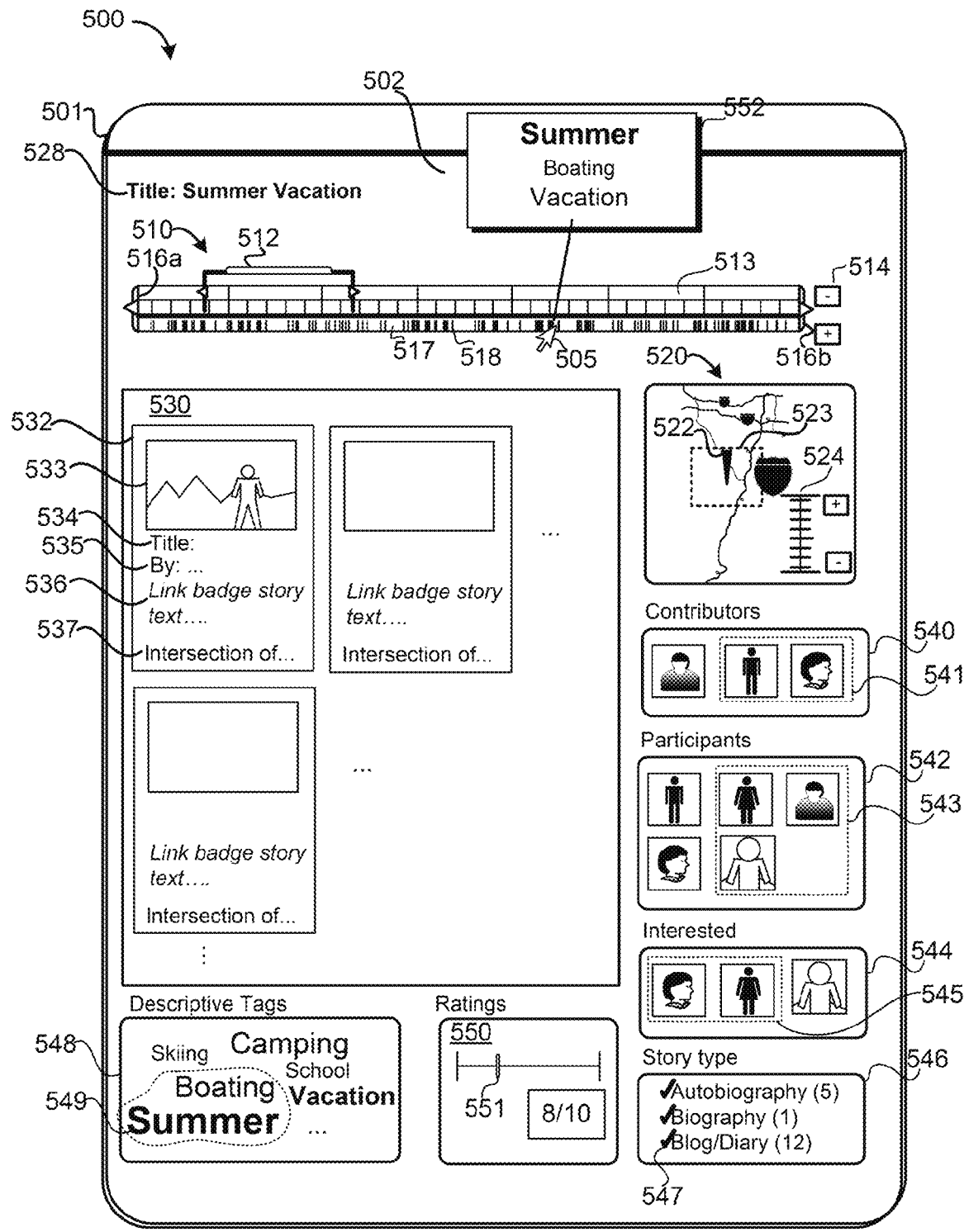
FIG. 5A depicts one embodiment of an interface for presenting an intersection space.

FIG. 5A depicts one embodiment of an intersection space interface. The interface 500 may be provided by a network-accessible service, such as a website, for display on a user computing device. In some embodiments, the interface 500 may be provided in a browser-renderable format, such as Hypertext Markup Language (HTML) or the like. Accordingly, the interface 500 may be displayed within a window 502 of a browser application 501. Alternatively, or in addition, the interface 500 may be adapted for display in a stand-alone application, as a plug-in to another application, or the like.

The interface 500 may include a timeframe control 510, upon which a timeframe indicator 512 may be manipulated to dynamically select a timeframe of interest (to select the prevailing timeframe 512). The timescale (or time span) covered by the timeframe control 510 may be shown by timeframe indicators 513, which, in some embodiments, may comprise labels identifying the year, month, day, hour, or the like, currently displayed in the timeframe control 510. In alternate embodiment, the labels could indicate the age of an individual, institution, event, or other storyline (discussed below). The timeframe control 510 may include a time scale input 514, which may be used to selectively increase or decrease the time scale of the timeframe control 510. For example, a user may use the input 514 to "zoom in," until the control 510 spans only few seconds, or "zoom out" until the control 514 spans a series of decades. As illustrated in FIG. 5A, the timeframe 512 may specify a start time and an end time. In other embodiments, however, the timeframe 512 may be manipulated such that there is no pre-defined start or end time. At the start and/or end points, the control 510 may comprise timeframe browsing inputs 516a and 516b, which may allow a user to shift the timeframe control 510 forward or backwards in time respectively.

In some embodiments, the timeframe control 510 may include a "story indicator" region 517, which may comprise one or more indicators 518 of stories that intersect with the timeframe selection 512 (and other intersection criteria, such as location 520 and the like). As will be discussed below, the region and/or indicators 518 may be configured to display stories according to relative importance, density, "heat" (relative rating), and so on.

Although a timeframe control is depicted in FIG. 5A (and FIG. 5B), the interface 500 is not limited in this regard; other timeframe inputs could be used under the teachings of this disclosure, such as text input fields, clock controls, calendar controls, or the like. The timeframe control 510 (or other timeframe control element) may reference an absolute time, a virtual time, or a relative time (including an age or duration). For example, the start time of the control may be specified using an alias (e.g., the day the contributor was born), and the timeframe control 510 may display times as an offset from the relative time. In this way, a contributor may hide his/her real age, while allowing users to browse his stories chronologically.

A location control 520 may be used to specify a location of interest 522. The location may be specified with respect to a single point (or address) 522 or as an area or region 523. The control 520 may include a location scale control 524, which may be used to change the scale of the map 520 (to "zoom in" to a particular neighborhood or "zoom out" to a state, country, or continent). Although a map 520 is depicted in the interface 500, the interface 500 is not limited in this regard; other inputs could be used under the teachings of this disclosure. For example, a text input could be used to enter address or coordinate information. The locations may be in the "real-world" or within a virtual location namespace. Accordingly, in some embodiments, a "virtual" address namespace or map could replace a "real-world" map, and so on.

The timeframe and location information provided via the controls 510 and 520 may define intersection criteria, which may be used to identify an intersection space. The timeframe of the intersection space may be the timeframe 512 specified using the timeframe control 510, and the location of the intersection space may be the location or region entered via the location control 520. The interface 500 may display indicators of the stories that intersect the intersection space in a display region 530. The intersecting stories may be identified as described above in conjunction with FIGS. 2 and 4 (e.g., by comparing timeframe, location, and/or other story metadata to the intersection criteria provided via the interface, such as the timeframe 512 and/or location 522 or 523). As will be described below, the stories in the region 530 may be ordered according to which stories are likely to be of the most relevance to the user.

In some embodiments, the interface 500 may include a title 528. The title 528 may be predetermined. For example, if the interface 500 is configured to display a particular intersection space (e.g., the history of a location), the title may be the name of the location. For dynamically selected intersection spaces, such as the intersection space depicted in FIG. 5A, the title 528 may be determined based upon the content of the intersecting stories. For example, the title 528 may be selected from a set of prominent descriptive tags associated with the stories in the intersection space (e.g., if the story tags are predominantly "summer" and "vacation" the title 528 may be set to "summer vacation"). An example of a "dynamic tag cloud" is described below in conjunction with element 546.

Stories may be displayed within the region 530 in various ways. In some embodiments, stories may be displayed in a "link badge" format. The link badge format of a story 532 may include a scaled image 533 of the story, a story title 534, a byline 535 indicting the story contributor, a text selection 536 from the story 532, an intersection indicator 537, and so on. The intersection indicator 537 may identify the intersection criteria used to include the story 532 in the intersection space (e.g., identify the timeframe and/or location of the story 532). As discussed above, the content of the link badge elements 533, 534, 535, 536, and/or 537 (and/or other link badge elements, not shown) may be automatically selected from the story content and/or may be authored by the story contributor (e.g., using a link badge authoring interface, such as interface 103 of FIG. 1B). In other embodiments, the interface 500 may display the stories 530 in different ways (e.g., a list), a set of thumbnails, or the like. Therefore, the interface 500 should not be read as limited to any particular way of displaying story indications.

The interface 500 may further comprise one or more metadata display and/or filtering elements, which may be used to display story metadata and/or "filter" the stories in the intersection space (filter the stories included in the region 530). In the FIG. 5A example, the interface 500 includes a contributor element 540, a participants element 542, an interested persons element 544, a story type element 546, a descriptive tag element 548 (e.g., dynamic tag cloud), and a rating element 550. The interface 500, however, is not limited in this regard and could be extended to include any number and/or type of filtering controls configured to filter the intersection space based on any type of story content and/or metadata.

The contributor element 540 may filter stories based upon the story contributor. In some embodiments, the contributor element 540 displays the contributors of the stories in the intersection space. The contributor indications may include a count of the number of stories submitted by each contributor. Selection of a particular set of one or more contributors 541 may filter the intersection space, such that only stories submitted by the specified contributors 541 are included therein, stories contributed by other, unselected contributors may be removed.

A participants element 542 may be provided to filter the intersection space based upon which participants appear therein. The participants element 542 may be pre-populated with a union of the participants of all the stories in the intersection space. The participant indicators may include a count (or other indicator) of their respective prevalence in the intersecting stories. The intersection space may be filtered to include only those stories that include a particular set of one or more participants 543. The interface may further comprise an interested persons element 544, which may operate similarly to the participants element 542 (e.g., may display a union of the interested persons associated with the stories in the intersection space and/or provide for filtering of the intersection space by selected interested persons 545).

In some embodiments, the interface 500 may include a story type element 546, which may filter the intersection space by story type. The story type element 546 may be pre-populated with indications of the story types of the stories in the intersection space. The story type indicators may include respective counts indicating how many stories of each type are in the intersection space. Selection of one or more story types 547 may filter the intersection space by story type; only stories of the selected story type(s) 547 will remain in the intersection space.

In some embodiments, the interface 500 may include a descriptive tag element (dynamic tag cloud) 548, which may be pre-populated with a "dynamic tag cloud" of the intersecting stories; the dynamic tag cloud may comprise a "union" of the descriptive tags of the stories in the intersection space and included in the region 530. A tag may be expressed in language, pictures, a combination (picture(s) and language), or the like. The dynamic tag cloud displayed in the element 548 may indicate the relative tag prevalence. For example, tags that appear in many different stories may be displayed prominently (e.g., in a large, bold font), whereas tags other tags may be less prominently displayed (e.g., in a smaller font). Alternatively, or in addition, a story count may be displayed in connection with each tag. The user may select one or more tags 549 in the descriptive tag input 548 (or tag cloud) to cause only stories that have the selected tags 549 to be included in the intersection space.

The interface 500 may include a rating element 550 configured to filter the intersecting stories by rating, regardless of whether the rating is expressed explicitly. The rating element 550 may be pre-populated with an indicator of an average or mean or other rating of the stories in the intersection space. The user may set a rating threshold 551, and any stories that fall below the threshold may be filtered from the intersection space.

As described above, the controls 510 and 520 may be manipulated to dynamically modify the intersection criteria of the intersection space, which, in the FIG. 5A example, is timeframe and location. Accordingly, as a user manipulates the controls 510 and/or 520, the stories included in the intersection space may change and/or the relative ordering of the stories in the region 530 may change. Other elements of the interface 500 may similarly change. For instance, the contributor element 540 may be re-populated to reflect changes to the intersection space (e.g., remove indicators of contributors whose stories are no longer in the intersection space, update contributor counts, add new contributors, and so on). The participants element 542, interested persons element 544, story type element 546, descriptive tag element 548 (dynamic tag cloud), rating element 550, and/or other elements (not shown) may be similarly updated. For example, as the stories in the intersection space change, the tags in the tag cloud displayed in the descriptive tag element 548 may be updated (added, removed, etc.). Likewise, the relative prominence of the tags may change; for instance, a "skiing" tag (e.g., skiing) which was prominent during a winter timeframe may become less prominent when the timeframe is shifted into the summer.

The timeframe control 510 of the interface 500 may provide an "inverted tag cloud" display 552. The inverted tag cloud 552 may display a set of tags associated with a selected region of the timeframe control 510. For example, the user may hover an interface cursor 505 over a particular location on the timeframe control 510. The hover location may specify a particular timeframe within the timeframe control 510. When the cursor is "hovered" for a predetermined time, the inverted tag cloud display 552 may be shown. The inverted tag cloud display 552 may comprise the descriptive tags of stories (if any) having a timeframe that intersects and/or is proximate to the timeframe (in the timeframe control 510) over which the cursor 505 is hovering. A user may move the cursor 505 over the timeframe to see how the story tags change over time.

Frequently, an intersection space will be defined based on the combination of time and place assigned to a particular story; the user will be able to see other stories that happened at the same time and place as the particular story. Alternatively, or in addition, the user may manipulate the controls/elements 510, 520 and/or 542-550 to select an intersection space comprising stories related to a very specific event. For example, the user may be interested in accounts of a traffic accident. The user may manipulate the controls 510 and 520 to specify the timeframe and location of the crash. The resulting intersection space may include stories that are relevant to the accident (have intersecting timeframe and location metadata). The user may further refine the intersection space by selecting "accident" or "crash" descriptive tags in the descriptive tag element 548.

In another example, a user may define a broader intersection space in order to explore the character of a particular location, address, business, stories involving a particular set of participants, or the like. For instance, the user may want to investigate the "reputation" of a park to determine whether it would be a suitable place to take his child. In this case, the user may specify a large timeframe (the last decade) and may include a fairly large region (the park and surrounding neighborhoods). The user may further specify descriptive tags of interest, such as "crime," "mugging," and so on. The resulting stories may give the user an idea of how much crime has taken place in the area.

As discussed above, an intersection space may act as a "home page," or "virtual companion space," for a particular set of stories (e.g., stories sharing a common set of intersection criteria, such as timeframe and location). Therefore, in some embodiments, an intersection space interface, such as interface 500, may be fixed to particular intersection criterion. For instance, the network-accessible service (e.g., website) may provide an interface dedicated to chronicling the history of a particular location. The location control 520 of the dedicated interface may be fixed to the location of interest (e.g., park, hotel, etc.). The timeframe control 510 of the interface may remain dynamic or may be similarly restricted. For example, the starting time of the timeframe 512 of an interface dedicated to the history of a particular hotel may be limited to the date that construction on the hotel began. In another example, such as an intersection space dedicated to a youth sports team, the timeframe control 510 may be fixed to a particular range (e.g., the little league season), and the location control 520 may be fixed to particular location(s) (e.g., the venues where the team practices and plays). As would be appreciated by one of skill in the art, the teachings of this disclosure could be adapted to provide any number of dedicated intersection space interfaces directed to any number and/or type of intersection criteria.

In some embodiments, the network-accessible service (e.g., website) may provide an interface configured to display an intersection space dedicated to a particular contributor or about a topic of interest to the owner of the storyline. The intersection space may comprise stories that have been contributed and/or borrowed by the contributor over a particular timeframe and, as such, may represent a life "storyline" for the contributor. The intersection space may further comprise stories in which the contributor has appeared as a participant and/or the contributor has expressed an interest. As will be described below, the contributor may "borrow" stories from other contributors, which will cause the borrowed stories to appear on a storyline owned by the contributor and/or may cause the stories to appear in the contributor's intersection space. Similarly, a user may be identified (tagged) as an "interested user" in one or more stories. The contributor may "borrow" these stories to include them the contributor's intersection space.

Figure 5B:
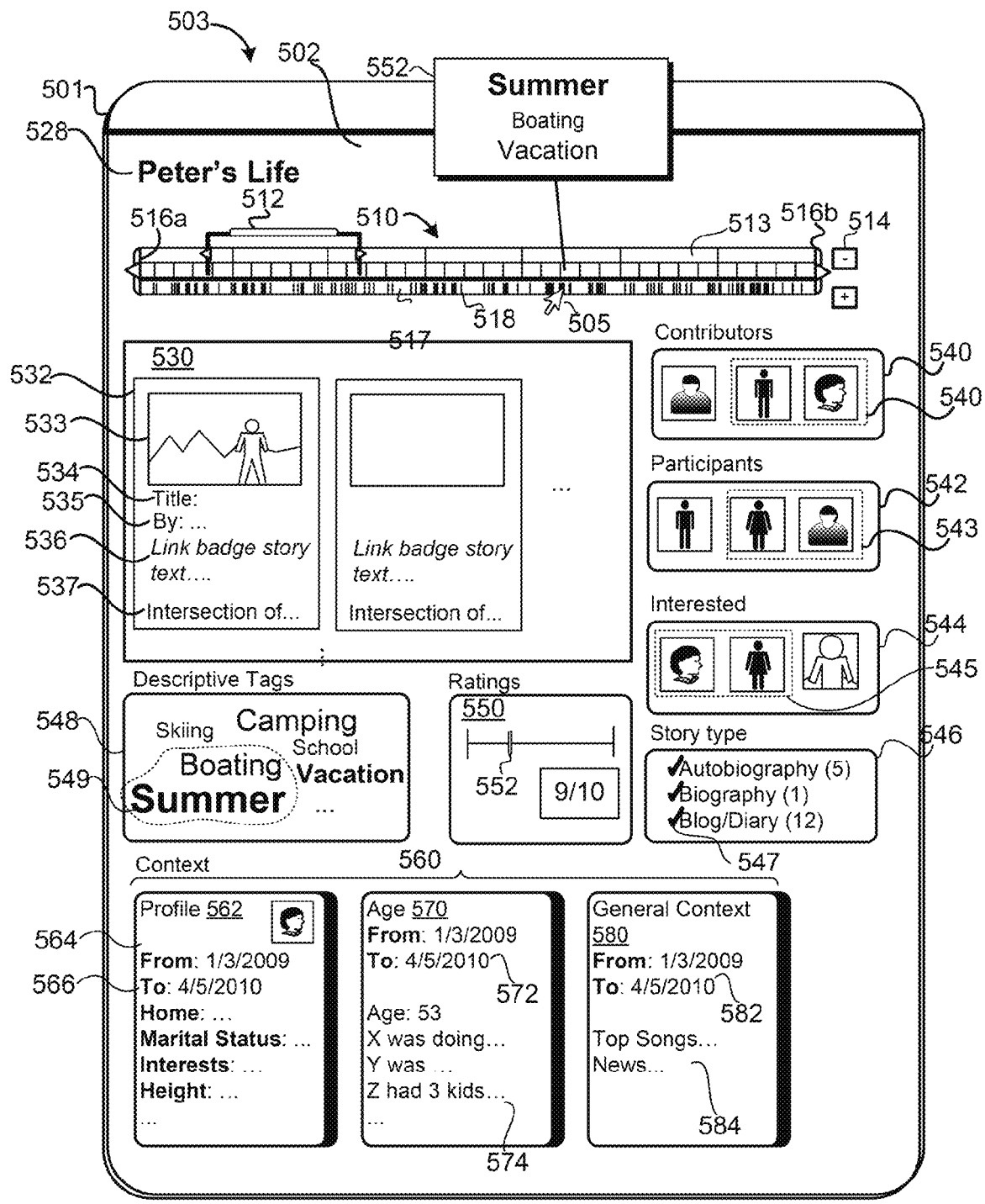
FIG. 5B depicts another embodiment of an interface for presenting an intersection space.

FIG. 5B depicts one embodiment of an interface 503 for displaying a contributor intersection space. In some embodiments, the interface 503 comprises a browser-renderable markup configured to be displayed in a window 502 of a browser application 501. However, as discussed above, the interface 503 is not limited in this regard and could be provided using any interface display and/or presentation mechanism known in the art.

The interface 503 includes a timeframe control 510 that, as discussed above, may be used to select a timeframe 512. Selection of the timeframe 512 may define a timeframe-contributor intersection space (TC intersection criteria). Indications of the stories that intersect with the TC intersection criteria may be displayed in region 530 (in a link badge format 532). The interface 503 may further comprise one or more metadata elements, which may be used to display and/or filter the intersecting stories according to story metadata, such as story contributor 540, story participants 542, interested persons 544, story type 546, descriptive tags 548, rating 550, and so on. Although not shown in FIG. 5B, the interface 503 may include a location input or display (like the location input 520 of FIG. 5A), which may be used to identify a location of interest (to define a timeframe-contributor-location intersection space). The intersection space interface by comprise a title 528 identifying the contributor ("e.g., Peter's Life").

The interface 503 may further include a context pane 560. The context pane 560 may comprise a "tab" (or other interface element) configured to display a chronological profile 562 of the contributor or of the topic of the contributor's storyline. As discussed above, a user profile under the teachings of this disclosure may include chronologically-tagged profile information (profile information may be associated with a particular timeframe). Therefore, unlike traditional user profiles that provide only an "instantaneous" picture of the user, the user profiles taught herein may provide a user profile chronology. For example, a user profile attribute, such as marital status, may be different at different times of a contributors life; the contributor starts out as "single," gets married in 1994, is divorced in 1998, and is remarried in 2004. The marital status of the user may include each of these attributes (single, married, divorced, remarried), each associated with a respective timeframe. Other "milestone" type life events, such as educational status, employment status, and the like, may be similarly tied to a chronology. For example, chronological profile attributes may show the progression of the contributor's musical or artistic taste over time. User-defining information, such as a "motto," favorite quote, or the like, may be tied to a chronology as may the contributor's physical attributes (height, weight, health, chronic disease, etc.). For example, the user may indicate that from 2003 to 2005 he/she was "fighting cancer," and from 2006 onward is a "cancer survivor." The user profile may comprise a plurality of contributor avatars, each associated with a different respective timeframe. Accordingly, the profile photos may illustrate changes in the appearance of the contributor over time. As used herein, an avatar may refer to any depiction of a user (graphical or otherwise). Therefore, an avatar may refer to a photograph, a caricature, a drawing or illustration, a video clip, renderable content, or the like.

The chronological profile 562 may include a timeframe indicator 564 that shows the relevant time period covered in the profile 562 (from Apr. 4, 2005, to Oct. 5, 2005). The timeframe indictor 564 may correspond to the timeframe 512 of the timeframe control 510. The contents 566 of the chronological profile 562 may comprise the profile entries that "intersect" with the timeframe 564 (attributes that were valid during the specified timeframe 564). The content 566 may include the profile photo that corresponds to the timeframe 564. If multiple attributes are valid during the timeframe 564, each valid attribute may be displayed (e.g., marital status may display as married, divorced (on date)). Alternatively, only the "most recent," "least recent," "most prevalent," or similar profile attribute may be displayed (as determined automatically or by the user). For example, if the contributor was married on the last day of a three-month timeframe 564, marital status may be "married." Alternatively, since during most of the timeframe 564 the contributor was single, the status may indicate "single." The disclosure contemplates many different mechanisms for selecting and/or prioritizing chronological information (e.g., method 700 of FIG. 7A) and, as such, this disclosure is not limited to any particular technique for selecting chronological profile information.

The context pane 560 may further include an age display element (as a "tab" or other interface element) 570. Therefore, although the age display element 570 is shown as a separate component (window), it may be included as selectable tab of the context pane 560. The age display element 570 may be configured to display a chronologically comparison between the contributor's life to the life of another user (or prominent person). The "age" used for comparison purposes may be the age of the contributor at the timeframe 512 specified in the timeframe control 510. The age display element 570 may include an indicator 572 of the relevant time period, which may comprise the comparison age discussed above. The age display element 570 may compare the stories and/or profile information of the contributor at the identified age to stories and/or profile information of another user. Accordingly, the chronological context of the other user may be "shifted" to correspond to the contributor's age. For example, the life events of Abraham Lincoln may be "time shifted" to correspond to the chronology of the contributor. Relevant results may be presented in a display area 574. For example, if the contributor is age 22 in the timeframe 572, contributor's profile and/or stories may be compared to Abraham Lincoln's life events at age 22 (at age 22 Abraham Lincoln struck out on his own, canoeing down the Sangamon River to New Salem). This information may be juxtaposed to the contributors profile information; for example, the contributor may have recently graduated from college and is moving to a new town for his/her first job. It would be understood by one of skill in the art that any manner of age- or chronology-based comparisons could be included in the age display element 570.

The context pane 560 may further include a general context display element (as a "tab" or other interface element) 580. Therefore, although the age display element 580 is shown as a separate component (window), it may be included as selectable tab of the context pane 560. The general context display element 580 may include a timeframe indicator 582, which may correspond to the timeframe control 510, 512. A display area 584 of the element 580 may include general context information relevant to the indicated timeframe 582. The display area may include newsworthy events, top songs (including "listen" or "purchase" links), what other "notable lives" were doing at the time, what members of the contributor's circle were doing, and so on.

As discussed above, a contributor may "borrow" stories from other contributors. In some embodiments, a contributor may be a tagged as a participant and/or as an "interested person" in a story contributed by another user. The contributor may be informed of the story (via a message, a display element, or the like), and may be given the opportunity to accept or reject the tag. In addition, the contributor may be prompted to view and/or "borrow" the story. As will be discussed below, rejecting a "participant" or "interested person" tag may cause the contributor to be removed from the story metadata (e.g., be unlinked from the story), accepting the tag may cause the contributor to be associated with the story (e.g., be displayed in "participant" or "interested person" story metadata, and so on). Borrowing the story may cause the story to be included in the contributor's intersection space. Accordingly, the story may appear with other stories contributed by the contributor. When a story is borrowed, the borrower may specify access controls for the story, as if the story were contributed and/or authored by the borrower. The contributor may specify that the story is to be available publicly or only within one or more circles. Accordingly, access to a story may be predicated on a "multi-tiered" system. A first tier may be determined by the original story contributor (e.g., whether the participants may have access to the story). The story participants that borrow the story may include their own set of access controls (e.g., additional tiers of access). For example, the original contributor may specify that a story is to be accessible to his "family" circle. A user who borrows the story may choose to publish the story to a different group of people (e.g., his "friends" circle).

Multi-tiered access control may be leveraged to publish stories in a "mixed trust" environment. For example, a group of parents whose children play on the same soccer team may not have personal relationships with one another; they may, however, have a trust relationship with the coach. The parents may choose to restrictively share stories related to the soccer team with the coach, who may "borrow" the stories. The coach, who has a trust relationship with the other parents, may publish the stories to a "parents" circle. In this way, all of the parents may get access to soccer-related stories, while preserving their individual privacy (and without individually establishing trust relationships with each of the other parents). Alternatively, if the coach makes the circle public or otherwise visible to its members, members could borrow the coach's circle and use it as a target for other published stories.

The original contributor of a story may control how certain story information is disseminated in the multi-tiered access scheme described above. For example, the original contributor may refer certain story metadata (timeframe and/or location) using aliases. The "actual" data associated with the aliases may be available only to the user's "friends" circle. Therefore, even if a friend publicly shares a story, other users accessing the story may not have access to the underlying timeframe and/or location information.

In some embodiments, the original story contributor may have additional controls over story sharing. For example, the user may not allow the story to be borrowed and/or the user may define to whom the story may be accessible. These types of access controls may be tied to the story, to prevent the story from being made available outside of a specified group of people (outside of a specified circle).

As illustrated above in FIGS. 5A and 5B, an intersection space may include a plurality of intersecting stories (displayed in the region 530). The story indications displayed in the region 530 may be ordered according to the likelihood that the story will be relevant to the user. Stories considered more "important" (relevant) to the user may be displayed more prominently within the region 530 (e.g., at the head of a list, in a larger, bold font or the like). The likelihood that a story is relevant may be based on comparisons between the story metadata and the intersection space criteria and/or metadata filters.

Figure 5C:
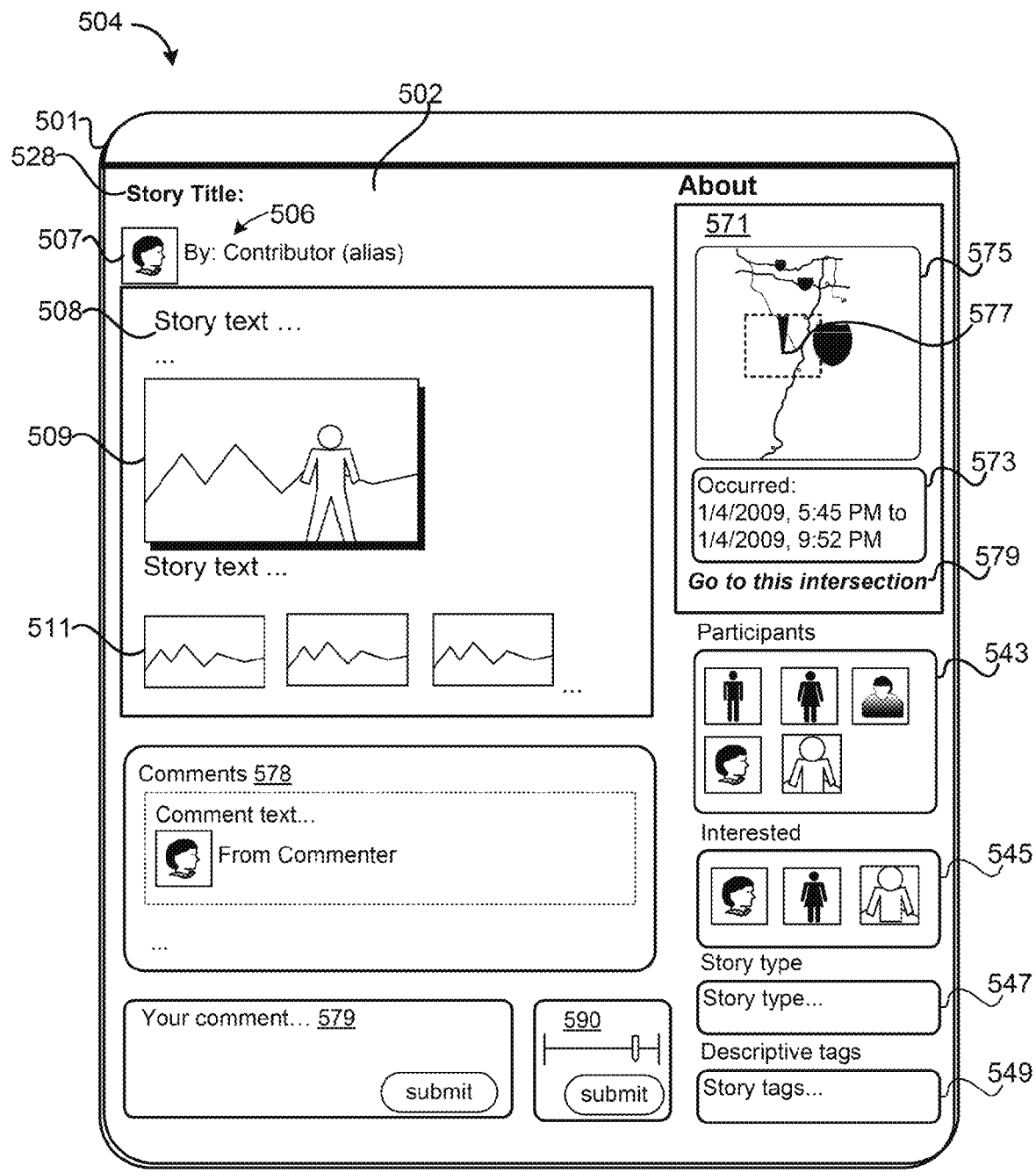
FIG. 5C depicts one embodiment of an interface for presenting a user-submitted content, such as a story.

FIG. 5C depicts one embodiment of an interface 504 for displaying a story. The interface 504 may be accessible via the interfaces 500 and/or 503 by, inter alia, selecting a story displayed in the region 530. The interface may display story content, such as a story title, text (in text display area 508), story images, or other content items (e.g., video, audio, etc), including a currently selected or highlighted content item 509 as well as "thumbnail" indicators 511 of other story items. In some embodiments, the interface 504 may include a video player component (not shown), an audio player component (not shown), or the like.

The interface may identify the story contributor in a byline display 506. The byline may display a profile avatar (photo) 507 of the contributor. The byline display 506 may comprise a link to an interface configured to display other stories of the contributor (such as interface 503 discussed above). If the contributor specified an alias, and the viewer of the interface 504 is not authorized to access the contributor alias, the byline may not identify the user by his/her username, but instead an alias may be depicted and a different avatar 507 (if any) may be displayed. The link component of the byline 506 may link to stories submitted under the alias name (or the link may be disabled).

The interface 504 may display an intersection component 571, which may display metadata describing the story, such as a timeframe indicator 573 and/or a location indicator 575. The timeframe indicator 573 may be depicted on a timeframe control (not shown) as text (as in indicator 573), or the like. The story location metadata may be depicted on a map interface 575 (or in some other way, such as text, as a virtual location, an alias, or the like). The story location may be identified as a region and/or location point 577. The intersection component 571 may comprise a link 579 to access other items at the story intersection (e.g., to access stories that "intersect" with the story based on the story metadata, such as timeframe, location, participants, and the like).

If the story timeframe and/or location metadata are expressed as aliases, and the viewer of the interface 504 is not authorized to access the "actual value" of the aliases, the location and/or timeframe indicators 575 and/or 573 may be hidden or depicted as their "alias values." Accordingly, the intersection link 579 may be disabled and/or may be directed to a limited set of stories having the same contributor alias.

The interface 504 may include a participants element 543 that displays indications of the story participants as identified by the story contributor (including the contributor, if applicable). The participant indicators 543 may comprise links to the respective participants' profiles (discussed below), or a link to an interface depicting the participants' stories (e.g., in an interface, such as the interface 503 discussed above). Interested persons indicators 545 may similarly display indications of the persons identified as being interested in the story. The interface 504 may include a story type element 547 to display the story type, and a descriptive tags element 549 may be to display the story tags.

In some embodiments, the interface 504 may comprise a comments display element 578, which may be configured to display user-submitted comments pertaining to the story. As will be discussed below, users identified as story participants and/or interested persons (in displays 543 and/or 545) may have a "right to comment" on the story. Comments submitted by story participants and/or interested persons may be prominently displayed in the element 578 (to prevent participant comments from being "drowned out" by other commentary). A comment input component 579 may be provided to receive user-submitted commentary.

A rating input and display element 590 may be provided to allow users to rate various aspects of the story. In some embodiments, the rating input 590 may comprise a multi-factor rating input. Examples of such inputs are described in U.S. patent application Ser. No. 12/539,789, entitled "Systems and Methods for Aggregating Content on a User-Content Driven Website," filed Aug. 12, 2009, which is hereby incorporated by reference in its entirety. In some embodiments, the interface 504 may include a plurality of rating inputs 590, each adapted to rate a different aspect of the story (e.g., story content, story metadata, descriptive tags, etc.). In some embodiments, for example, users may rate the relevance of descriptive tags. Examples of such rating inputs are provided in U.S. patent application Ser. No. 11/969,407, entitled "Relevancy Rating of Tags," filed Jan. 4, 2008, which is hereby incorporated by reference in its entirety.

In some embodiments, user ratings may be used to form an overall contributor rating, which may be displayed in connection with the contributor's profile. Examples of contributor rating indices and related displays are disclosed in U.S. patent application Ser. No. 12/540,171 which is incorporated by reference above. In some embodiments, the weight given the contributor's ratings of other user-submitted content may be based, at least in part, on the contributor's rating. Examples of systems and methods for calibrating user-submitted ratings are described in U.S. patent application Ser. No. 12/540,163, entitled, "Systems and Methods for Calibrating User Ratings," filed Aug. 12, 2009, which is hereby incorporated by reference in its entirety.

Figure 6:
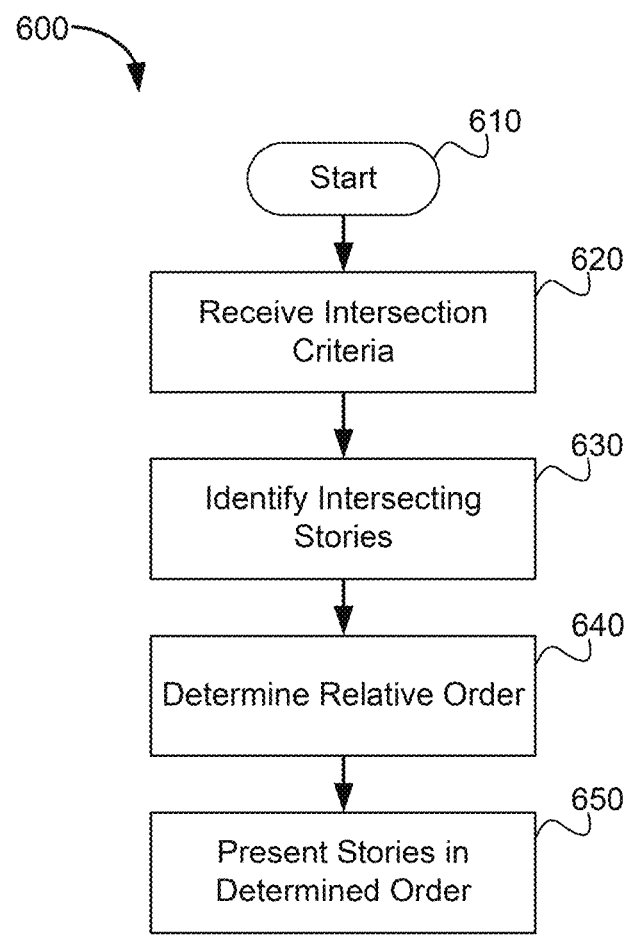
FIG. 6 is a flow diagram of one embodiment of a method for ordering stories in an intersection space.

FIG. 6 depicts one embodiment of a method for prioritizing items presented in a chronology. For example, the method 600 may be used at step 460 of FIG. 4 to order a list of stories in an intersection space and/or to order the story indicators in the region 530 of the interface 500.

At step 610, the method 600 may be initialized as described above. Initializing may comprise accessing a datastore comprising a plurality of stories, each associated with metadata, such as a timeframe, location, and so on.

At step 620, intersection criteria may be received, the intersection criteria may comprise a location and timeframe of interest. The intersection criteria may be received in response to user interaction with one or more user interface components, such as the timeframe and/or location controls discussed above. Alternatively, the intersection criteria may be provided by another device or process. For instance, the intersection criteria may be derived from current location and/or time information provided by a computing device and/or mobile communication device (e.g., mobile phone, computer, etc.). In other examples, the intersection criteria is derived from the intersection metadata of a content item of another story (such as a photograph) or from another story (e.g., to find other stories that intersect with a particular story).

At step 630, the method 600 may identify a plurality of stories that intersect with the received intersection criteria. As discussed above, the intersecting stories may be identified by comparing intersection metadata of the stories to the received intersection criteria. Step 630 may further comprise comparing the stories to one or more filters (e.g., descriptive tags, participants, etc.).

At step 640, the intersecting stories identified at step 630 may be assigned a relative order. The order may be determined by comparing the intersection criteria and/or filters to the story metadata. In some embodiments, each intersecting story may be assigned a respective "relevance" score. The relevance metric may quantify an empirically determined likelihood that the story will be relevant to a user viewing the intersection space. In some embodiments, the relevance metric may be determined by combining relevance metrics of different story metadata. For example, a story may be assigned a "timeframe" relevance metric, a "location" relevance metric, and so on, which may be combined into an overall relevance metric used to order the stories. The relative relevance metrics may be weighted with respect to one another. For example, the "location" relevance metric may be more heavily weighted in some situations than the "timeframe" relevance metric.

At step 650, the intersecting stories may be presented in a user interface in the order determined at step 640.

Although the method 600 is described as ordering stories (as are methods 700 and 800 discussed below), one of skill in the art would recognize that the chronological- and/or location-based ordering disclosed herein could be applied to any content item associated with chronological information. Therefore, this disclosure should not be read as limited to ordering only certain types of content.

Figure 7A:
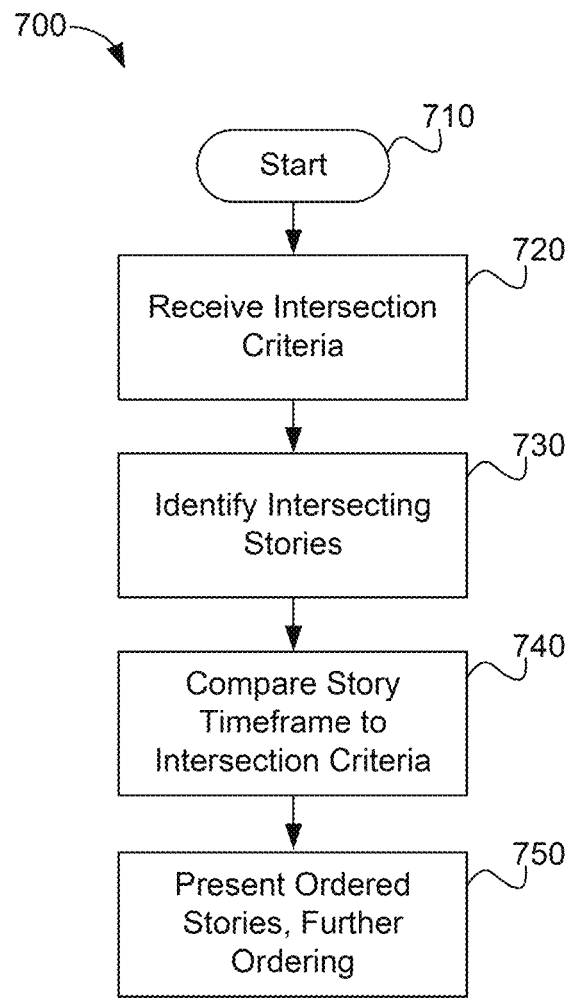
FIG. 7A is a flow diagram of one embodiment of a method for determining story importance using timeframe comparisons

FIG. 7A is a flowchart of one embodiment of a method 700 for determining story importance using timeframe comparisons. The method 700 may be used to determine a relative order of a plurality of stories in an intersection space and/or to assign a "timeframe" relevance metric thereto.

At steps 710, 720, and 730, the method 700 may be initialized, intersection criteria may be received, and a plurality of intersecting stories may be identified as described above.

At step 740, the timeframe of each of the stories may be compared to the intersection criteria timeframe (referred to as the "prevailing time") to determine a relative ordering of the stories and/or to assign a timeframe relevance metric thereto.

In some embodiments, the stories may be ordered (or the "timeframe" score may be set) according to a "relative start time" metric. In this case, stories having a start time that is after the start time of the prevailing timeframe are ordered before stories having a start time that is before the start time of the prevailing timeframe. The stories that start after the prevailing timeframe are ordered chronologically (based on proximity to the prevailing start time). The stories that begin before the prevailing timeframe are ordered in reverse chronological order (again based on proximity to the prevailing start time).

Figure 7B:
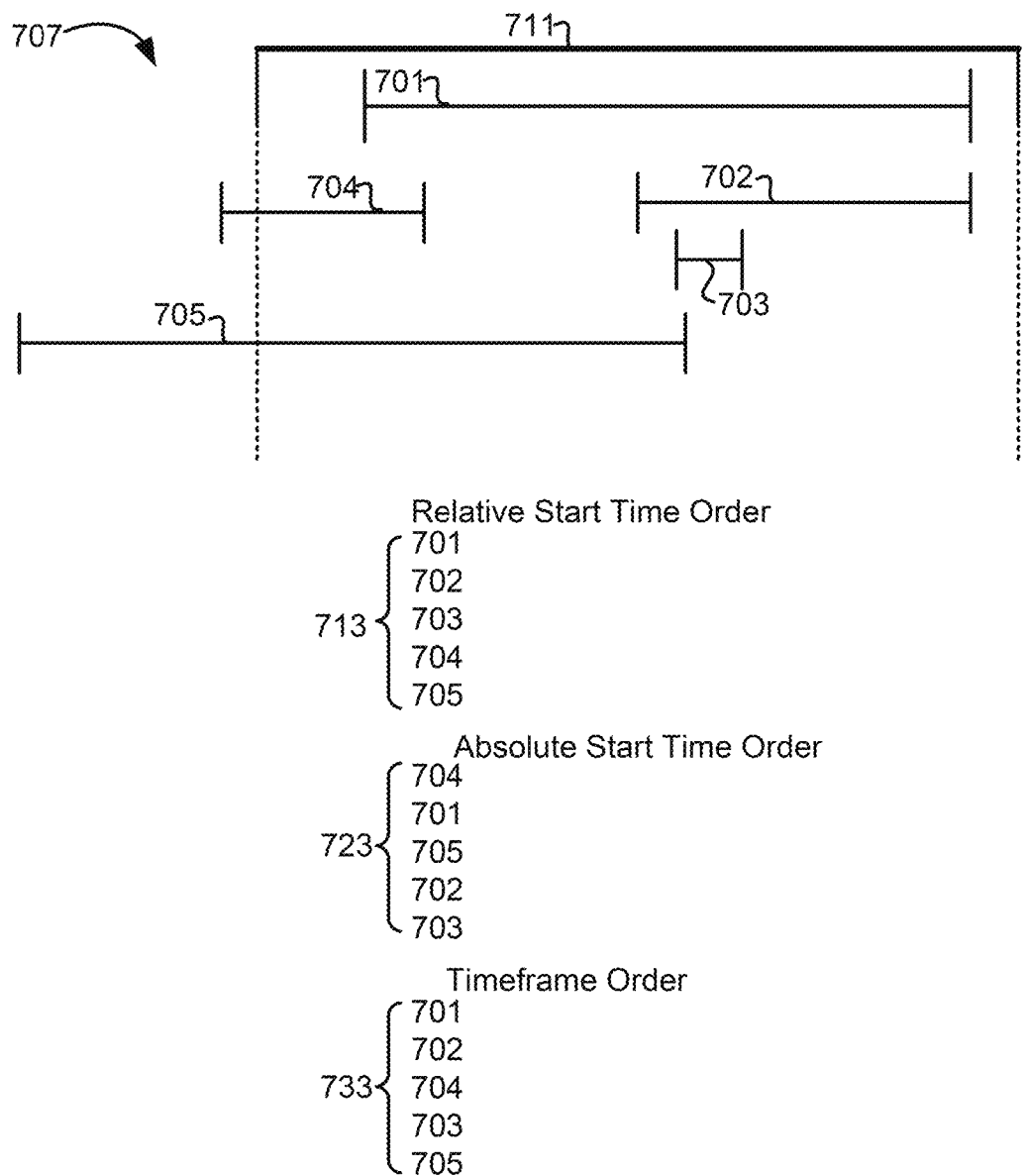
FIG. 7B depicts examples of timeframe comparisons.

FIG. 7B depicts exemplary timeframe comparisons. FIG. 7B depicts an intersection criteria timeframe (prevailing time) 711 and a corresponding set of intersecting stories 701-705. The timeframe of stories 701, 702 and 703 begin after the start time of the prevailing timeframe 711, and the timeframe of stories 704 and 705 begin before the time of the prevailing timeframe 711. Accordingly, stories 701, 702, and 703 will be ordered before stories 704 and 705. Stories 701, 702, and 703 are ordered chronologically with respect to one another, and stories 704 and 705 are ordered in reverse chronological order. The resulting order 713 and/or timeframe relevance metrics (from most to least relevant) is 701, 702, 703, 704 and 705.

In other embodiments, stories may be ordered according to an "absolute start time" metric. In this case, the stories may ordered according to the "absolute value" of the difference between story start time and prevailing start time regardless of whether the story start time begins before or after the prevailing start time. Referring to FIG. 7B, the order 723 using "absolute start time" is 704 (since it is the most proximate to the prevailing start time 711), 701, 705, 702, and 703.

In other embodiments, a timeframe metric may be used. The timeframe metric may quantify how closely the prevailing timeframe corresponds to the timeframe of a story (e.g., a comparison of the "scale" of the timeframes). The timeframe correspondence may be determined as a sum (or other combination) of an absolute value difference between the story start time and prevailing start time and the story end time and prevailing end time. Referring to FIG. 7B, order 733 according to the timeframe metric begins with story 701, which most closely corresponds to the intersection criteria timeframe followed by 702, 704, 703, and 705. As illustrated above, the timeframe ordering 733 assigns importance based upon comparisons between the "scale" of the story and intersection criteria timeframe. Additional detail regarding timeframe and/or time scale comparisons is provided below in conjunction with FIGS. 9A and 9B.

Referring back to FIG. 7A, although the method 700 is described using a particular set of exemplary timeframe comparison techniques, one of skill in the art would recognize that method 700 could be extended to incorporate any time and/or timeframe comparison technique known in the art. Therefore, method 700 is not limited to the exemplary timeframe comparisons disclosed above.

After the timeframe ordering of the stories is determined and/or a timeframe relevance metric is assigned to each of the stories, the flow may continue to step 750 where the ordered stories may be presented to a user in an interface and/or additional ordering processing may occur (e.g., at step 640 of FIG. 6).

Figure 8A:
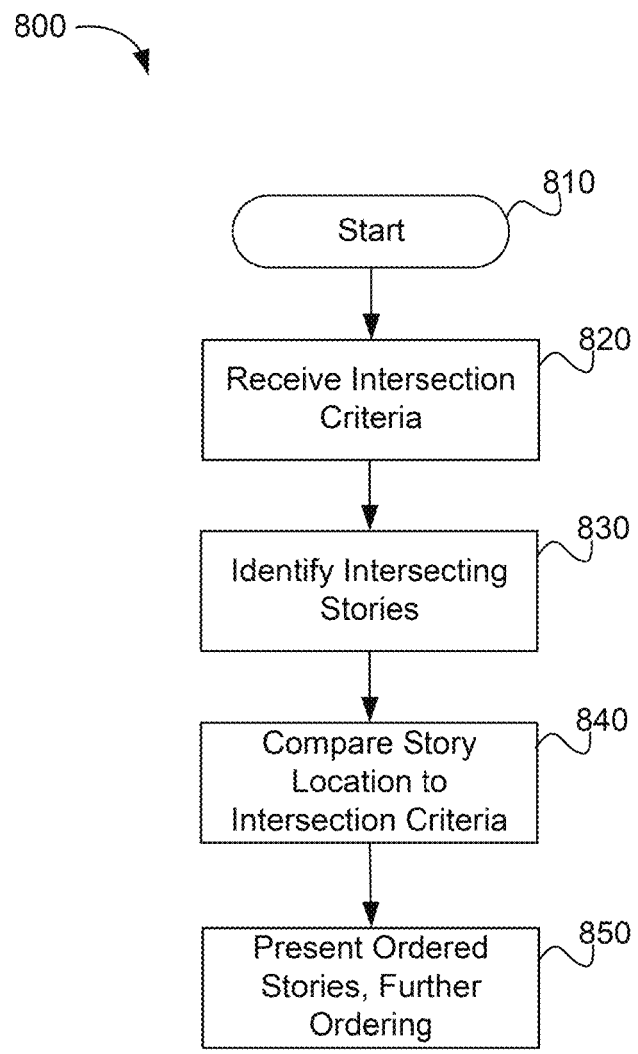
FIG. 8A depicts one embodiment of a method for determining story importance using location comparisons.

FIG. 8A is a flowchart of one embodiment of a method 800 for determining story importance using location comparisons. The method 800 may be used to determine a relative order of a plurality of stories in an intersection space and/or to assign a "location" relevance metric thereto.

At steps 810, 820, and 830, the method 800 may be initialized, intersection criteria may be received, and a plurality of intersecting stories may be identified as described above.

At step 840, the location of each of the stories may be compared to the intersection criteria location (referred to as the "prevailing location") to determine a relative ordering of the stories and/or to assign a location relevance metric thereto.

In some embodiments, the stories may be ordered (or the "location" score may be set) according to a "proximity" metric. In this case, stories may be ordered according to the proximity of the "center" of the story location to the "center" of the intersection criteria location. As used herein, the "center" may refer to a particular point location within a region (e.g., the center of a circle or square region). If a location is specified as a particular point or address, the "center" is the particular point or address.

Figure 8B:
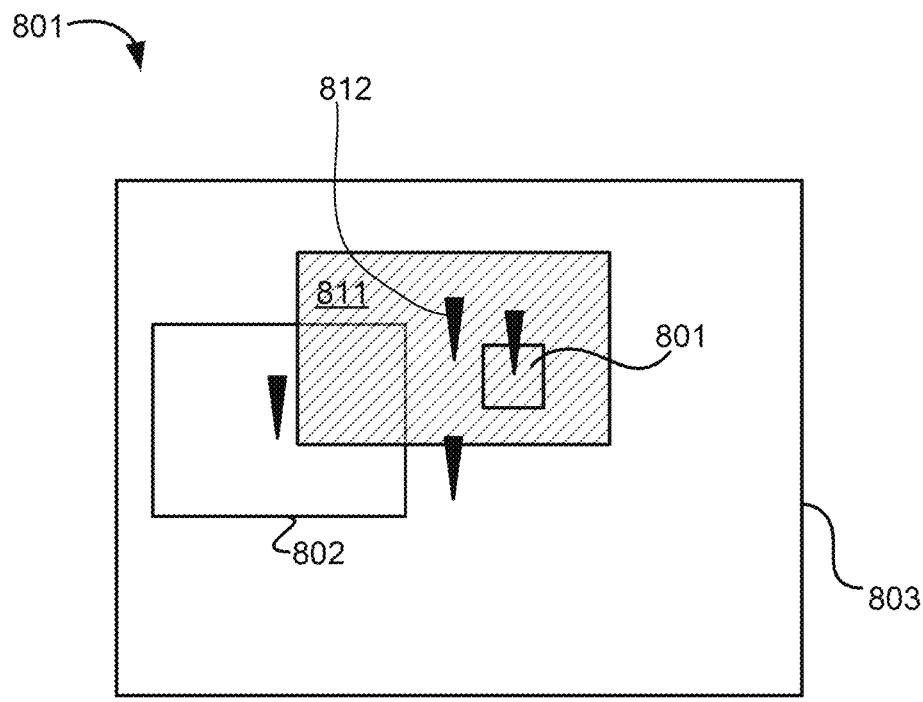
FIG. 8B depicts examples of location comparisons.
Figure 8B:
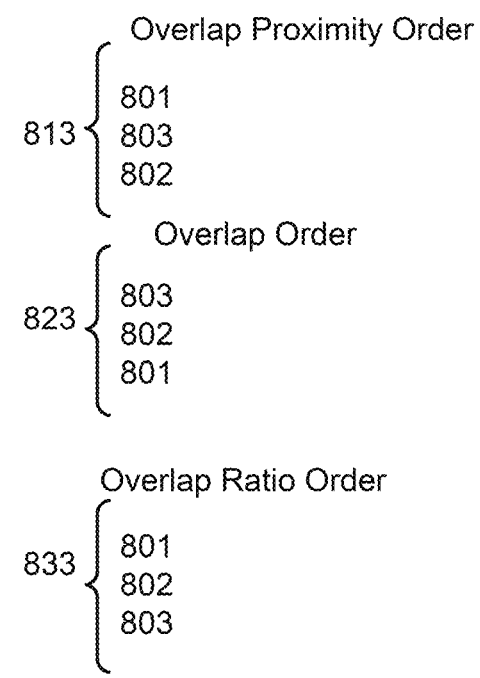

FIG. 8B depicts exemplary location comparisons. The intersection criteria may include a region 811 having a center 812. Stories 801, 802, and 803 may be ordered 813 (or location score assigned) based the proximity of each story location center to the center 812. The story 801 is most proximate to the center 812 and, as such, is ordered first, followed by 803 and 802.

In other embodiments, stories may be ordered according to an "area of overlap" order 823 that corresponds to the area of overlap between the intersection criteria location 811 and the story locations. Referring to FIG. 8B, the story 803 completely overlaps the intersection criteria location 811 and, as such, is ordered first, followed by 802 and 801.

In other embodiments, stories may be ordered according to the ratio of story location area to the area of overlap between the story location and intersection criteria location. Under this metric, stories that have extremely broad locations may be ordered lower than stories that have an area that more closely resembles the intersection criteria area. Referring to FIG. 8B, the story 801 may be placed first in the order 833 since it has a high ratio of overlap area to total area (1 to 1), story 802 is ordered next, and story 803, which has an extremely broad location, is ordered last.

In another example, the location score is calculated using a Euclidian norm (e.g., an $L_1$- or $L_2$-norm). The area of a story (or location intersection criteria) may be defined using a 4-value tuple (s,w,n,e), in which s is a southern extent of the area (e.g., latitude of southern side of the bounding box), w is the western extent of the area (e.g., longitude of the western side of the bounding box), n is the southern extent, and e is the eastern extent. Location intersection criteria may be represented as a "query" location tuple $q_0$-$q_3$, and the location of a story may be similarly represented as a story location tuple $s_0$-$s_3$. The location score between intersection criteria and a story may be based upon the Euclidian distance therebetween (the Euclidian $L_1$-norm), per Equation 1:

$$d_{L1}(q, s) = \sum_{i=0}^{3} |q_i - s_i| \qquad \text{Eq. 1}$$

Equation 1 quantifies the difference between the area of the query (location intersection criteria q) and the location of the story (story location $s_i$). Small values of $d_{L1}$ indicate greater spatial similarity. The stories 801, 802, and 803 may be ordered according to the Euclidian distance value ($d_{L1}$) as described above. As would be appreciated by one of skill in the art, Equation 1 could be modified to calculate a Euclidian distance (or an equivalent value) in other coordinate systems and/or in other dimensions. For example, Equation 1 may be adapted to calculate the distance between two or more volumes in 3-space. Accordingly, the disclosure should not be read as limited in this regard.

In another embodiment, the spatial relevance (or importance) of a story is determined using a spectral clustering (or spectral partitioning) approach. In this approach, the intersection criteria location is deemed to be the "kernel" of a spectral partition. The distance between the kernel and each story is expressed using a distance matrix D per Equation 2:

$$D_{i,j} = |d(s_i - k) - d(s_j - k)| \qquad \text{Eq. 2}$$

The resulting matrix D is a real symmetric matrix having an orthonormal basis of eigenvectors. The first leading eigenvector describes the principle behavior of the data (the story with respect to the kernel), and the second leading eigenvector describes the behavior of the first leading eigenvector. Accordingly, the signs of the entries in the second leading eigenvector provide a natural partition of the story location metadata.

Figure 8C:
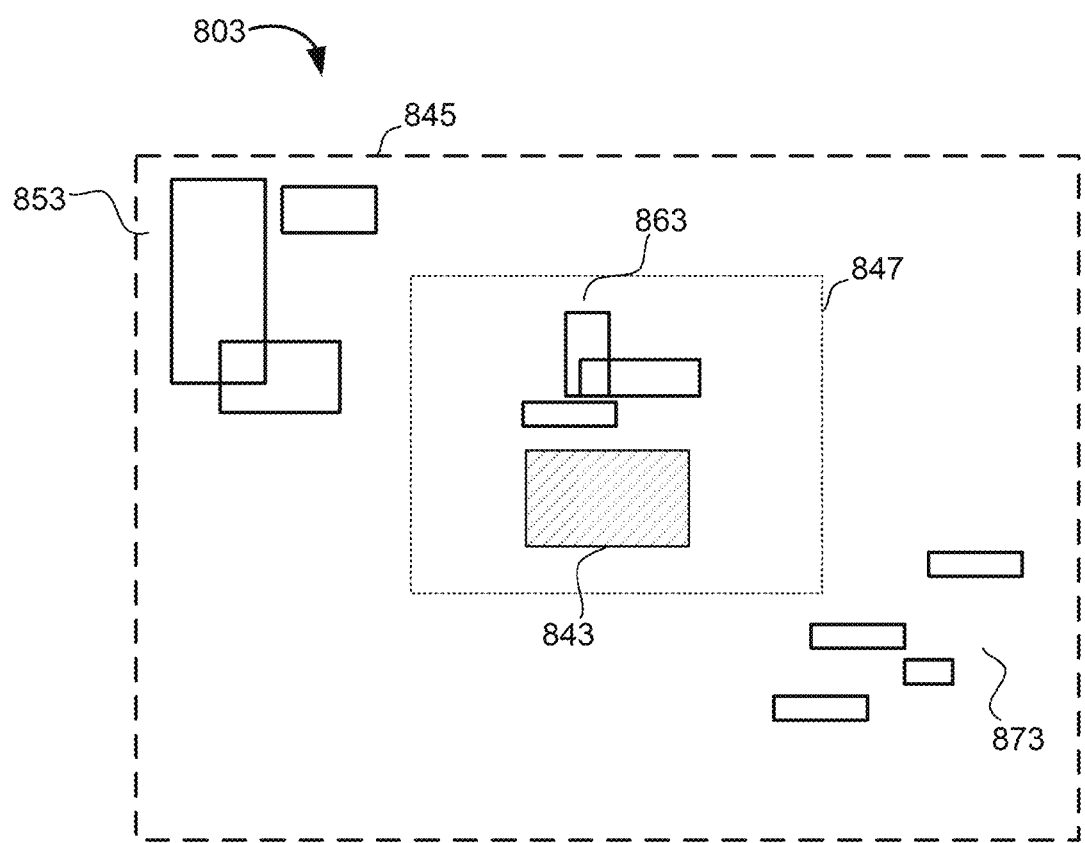
FIG. 8C depicts examples of location partitioning.

With the partitions of the stories determined, the partition that is closest to the kernel (according to a distance metric, such as the Euclidian L1-norm described above), is identified as most spatially important. FIG. 8C depicts examples of location partitioning, such as spectral partitioning 803. The boundary 843 represents an initial location intersection criteria. As depicted in FIG. 8C, the initial location 843 does not intersect any of the stories (853, 863, and/or 873). The initial intersection criteria 843 is expanded (as described below) to the boundary 845, which does intersect the location intersection metadata of a number of stories. A distance matrix D for the stories within boundary 845 is calculated and used to partition the stories into partitions 853, 863, and 873.

The stories are assigned a relative importance based upon the distance between their respective partition and the kernel (boundary 845, or original intersection criteria boundary 843). As shown in FIG. 8C, the partition 863 is closer than the partitions 853 and/or 873 and, as such, is identified as the most important.

In some embodiments, the story partitions may be further leveraged to "filter" and/or select stories for inclusion in the intersection space. For example, stories that are in the same partition may be considered to be relevant to one another and, as such, are treated as a group. Stories may be included and/or excluded from the intersection space by partition membership. In example depicted in FIG. 8C, only the most important partition 863 is included in the intersection space, which results in new location intersection criteria (boundary 847). In other examples, the N most relevant partitions are included in the intersection space and/or modifications to the location intersection criteria (e.g., boundary 845) are adapted according to partition distribution. Alternatively, or in addition, partitions may be included and/or excluded from the intersection space based upon a partition distance metric and/or in accordance with intersection space constraints, such as a maximum story threshold and/or a sufficiency threshold. Although the disclosure provides several exemplary mechanisms for determining story importance, the disclosure is not limited in this regard and could be adapted to incorporate any suitable unsupervised machine learning technique (community detection or cluster analysis), including, but not limited to: hierarchical clustering, partitional clustering (e.g., k-means clustering, quality threshold clustering, etc.), modularity maximization, principle component analysis, alternative spectral clustering and/or partitioning techniques, or the like.

Referring back to FIG. 8A, although the method 800 is described using a particular set of exemplary location comparison techniques, one of skill in the art would recognize that method 800 could be extended to incorporate any location and/or area comparison technique known in the art. Therefore, the disclosure is not limited to the exemplary location comparisons disclosed above. The partition that is closest to the kernel (according to the Euclidian distance described above, or some other distance metric), may be selected as the most relevant or important subset within the intersection space.

After the location ordering of the stories is determined and/or a location relevance metric is assigned to each of the stories, the flow may continue to step 850 where the ordered stories may be presented to a user in an interface and/or additional ordering (or other processing) may occur (e.g., at step 640 of FIG. 6).

As discussed above, the order in which stories appear in an intersection space may be determined by comparing the story timeframe to the prevailing timeframe of the intersection space. Timeframe information may also be used to maintain the visibility of important stories within a prevailing timeframe. As used herein, an "important" story may be a story that is likely to be highly-relevant and/or of interest to a user. Maintaining the visibility of an important story may comprise placing important stories at the head of a story list (e.g., region 530 if FIGS. 5A and 5b), prominently displaying the important stories, filtering "unimportant stories" from the intersection space, or the like.

A timeframe selection control, such as the control 510 of FIGS. 5A and 5B may be scalable; a user may "zoom in" to view a detailed timeframe spanning a single day, hour, or minute, or "zoom out" to view a timeframe that spans a significantly longer timeframe (e.g., months, years, decades, etc.) As the user "zooms out" and/or otherwise increases the size of a prevailing time, more items may be included in the resulting intersection space. Conversely, when the user "zooms in," a smaller number of stories may intersect the prevailing time. In either case, it may be important to highlight "important" stories within the prevailing timeframe that are likely to be of interest to the user.

The identification of important stories may be similar to a "level of detail" interface on a map. The information displayed on the map may be appropriate to the map scale. When the view of a map is zoomed out, low-level details, such as city names, local roads, and the like are hidden (since their inclusion would render the map unreadable), and higher-level features are displayed, such as state lines, major roadways, and the like. Conversely, when a user zooms in, the display may replace the higher-level features with more detailed features, such as city names, county lines, and the like in accordance with the more detailed map scale.

A similar phenomenon may occur as a user explores the intersection space of particular stories. As discussed above, a user may browse chronological content (stories) using intersection criteria, such as a particular timeframe of interest (also referred to as a "prevailing timeframe" or more generally as "intersection criteria"). The stories in an intersection space may be "filtered" by their relative importance. In some embodiments, important stories may be included in a particular results set or displayed in an interface, while other, less important stories may be excluded. As used herein, the "importance" of a story can refer to metadata associated with the story itself (e.g., an importance value set by the user) and/or to the relevance of a story to a particular set of intersection criteria. For example, the relative importance of an item within a prevailing timeframe may be quantified by, inter alia, comparing a timeframe associated with the item to the prevailing timeframe. When there is a high correlation between a scale of the item's timeframe and the scale of the timeframe of interest, the item may be identified as potentially important. Conversely, when the scale of the item's timeframe and the prevailing timeframe differs, the item may be considered to be less important. Accordingly, story importance may be intersection-criteria specific; a story that is highly important in a first intersection space may be less important in a second intersection space (e.g., due to differences in the intersection criteria of the intersection spaces).

For example, consider the stories 901-907 illustrated on the chronology 900 of FIG. 9A. Each of the stories 901-907 is associated with a respective timeframe: story 901 may describe coffee with a friend and may have a short timeframe of less than an hour; story 902 may relate to the birth of a child and may span a few months (late pregnancy until the child is taken home from the hospital); story 903 may describe the purchase of a new car 903 and may span the three (3) years that the contributor owned the car; story 904 may describe a routine lunch with a client that covers a few hours, story 905 may describe a week sick in bed; story 906 may describe the contributor's experience attending a play with his wife and may span approximately four (4) hours; and story 907 may describe life at 1021 Biglong Street where the contributor lived for six (6) years.

As illustrated in FIG. 9A, the timeframe of the stories 901-907 may differ significantly from one another, however, each story timeframe intersect with a particular timeframe (e.g., a week 910).

A user may browse the items 901-907 based upon a particular prevailing timeframe of interest. In some examples, the user may browse the stories 901-907 using an "intersection space" interface, such as the interfaces 500 and/or 503 described above in conjunction with FIGS. 5A and/or 5B.

The user may specify a broad prevailing timeframe, such as the 10-year span 912, which includes the week 910 that intersects all of the stories 901-907. Important stories may be identified within the prevailing timeframe 912 by comparing the story timeframes 901-907 to the prevailing timeframe 912. Given that the selected prevailing timeframe 912 is fairly broad (10 years), it may be determined that the stories that have a similarly broad timeframe will be more important than shorter-duration stories; the broader timeframe stories are more appropriate to the level of detail specified by the user in the prevailing timeframe 912. Accordingly, in the context of a 10-year timeframe 912, stories 902, 903, and/or 907 may be considered more important than stories 901, 904, 905, and/or 906, which have much narrower timeframes (and may be less appropriate to the level of detail specified by the user).

When a user specifies a different timeframe, a different set of stories may be identified as "important." For example, when a user specifies a narrower timeframe, such as the timeframe 914 that spans approximately three months, "medium-termed" stories, such as the story about the birth of the son 902 and/or a week sick in bed 905 may be identified as more important than the longer-termed stories 903 and/or 907. Although the stories 903 and 907 intersect with the timeframe 914, they may be considered to be less important in the context of the narrower prevailing timeframe 914 specified by the user (less appropriate to the more specific level of detail indicated by timeframe 914). Similarly, the stories with the shortest timeframes (the coffee with a friend 901, lunch with a client 904, and/or attending a play 906) may be less important since their timeframes are still significantly smaller than the timeframe of interest 914 and/or the timeframe of stories 902 and 905. Conversely, when a highly-specific timeframe 916 is specified (a timeframe of a few days), the shorter-termed stories, such as coffee with a friend 901, lunch with a client 904, and/or attending a play 906 may be considered to be more important than the other stories 902, 903, 904, 905, and/or 907, since the stories 901, 904, and/or 906 are more appropriate to the highly-detailed timeframe 916 specified by the user.

As described above, timeframe scale comparisons may be used to quantify the importance of items (such as stories) within a particular prevailing timeframe or chronology. However, the disclosure is not limited to timeframe comparisons and could be extended to include any comparison metric(s) known in the art. For example, criteria, such as item timeframe scale (discussed above), timeframe correlation, item location, item repetition frequency, item content, item type (e.g., news story, biographical story, review, etc.), item quality metrics, access metrics, borrow metrics, user-provided importance indicator, and so on, may be used to determine relative item importance.

Item timeframe scale may be determined by comparing a scale of the item timeframe to a scale of the prevailing timeframe as discussed above. Item timeframe correlation may quantify the extent to which the item timeframe and the prevailing timeframe overlap. Examples of timeframe correlation metrics are disclosed above in conjunction with method 700 of FIG. 7A.

Item location metrics may quantify the correlation between an item location and a prevailing location (if specified). Like the timeframe comparisons discussed above in conjunction with method 800 of FIG. 8A, a location metric may quantify the proximity and/or overlap between an item location and a location of interest. A location metric may also compare the scale of the item location (how specifically the item location is defined) to the scale of the location of interest. The scale comparison may be performed similarly to the timeframe scale comparison(s) discussed above.

An item repetition metric may quantify how often an item is repeated (e.g., coffee with a friend). In some embodiments, item repetition may be identified automatically using item metadata (e.g., such as identifying a repeating item timeframe, location, descriptive tags, or the like). Alternatively, or in addition, a contributor may explicitly mark an item as repeating (e.g., mark the item as part of a storyline as discussed below). In some embodiments, a repeating item may be considered to be less important than less frequent items.

An item content metric may quantify relevance based on the quantity and/or type of content in an item (story) or the mechanism used to create the story. For example, a story comprising only a few short lines may be considered to be less important than a story that includes a large amount of text and/or other multimedia content (e.g., photos, video, audio, etc.). However, a story comprising only a few short lines that was created using a mobile application may be considered more important than a story comprising only a few short lines that was created using a Web browser interface, because mobile applications are better suited to telling shorter stories and thus a short story created on a mobile device may be deemed to be more likely to be important than a short story told via a browser interface. Alternatively or in addition, a story contributed to the system via an Application Programming Interface (API) or via email may be deemed to have more or less significance than a story created natively.

Item type criteria may quantify item importance based on item type (e.g., story type). For example, a "status" story type (a simple story that relates what the contributor was doing at a particular time, e.g., "going to the store") may not be considered as important as a "biographical" or "news" story type.

Item quality metrics may identify items that have been highly rated by other users; higher rated items may be considered more important that lower rated items. An access metric, which may quantify how many times a particular item has been viewed, may be used to identify important stories. Similarly, the number of times a story has been "borrowed" by other users may be indicative of story importance.

In some embodiments, the item contributor may provide his/her own importance indicator. The indicator may be expressed on a continuum (such as from 1 to 100), or using a set or pre-defined identifiers (e.g., "routine," "frequent," "minor," "significant," "life-changing," "critical," and so on). An input configured to receive an item importance indicator may be included on a contribution interface, such as the interface 100 of FIG. 1A. In some embodiments, user-provided identifiers may be displayed in a timeline indicator as "milestones" or "marker events." When determining relative story importance, stories indicated as a "milestone" or "marker event," may be given a high importance rating.

Figure 9B:
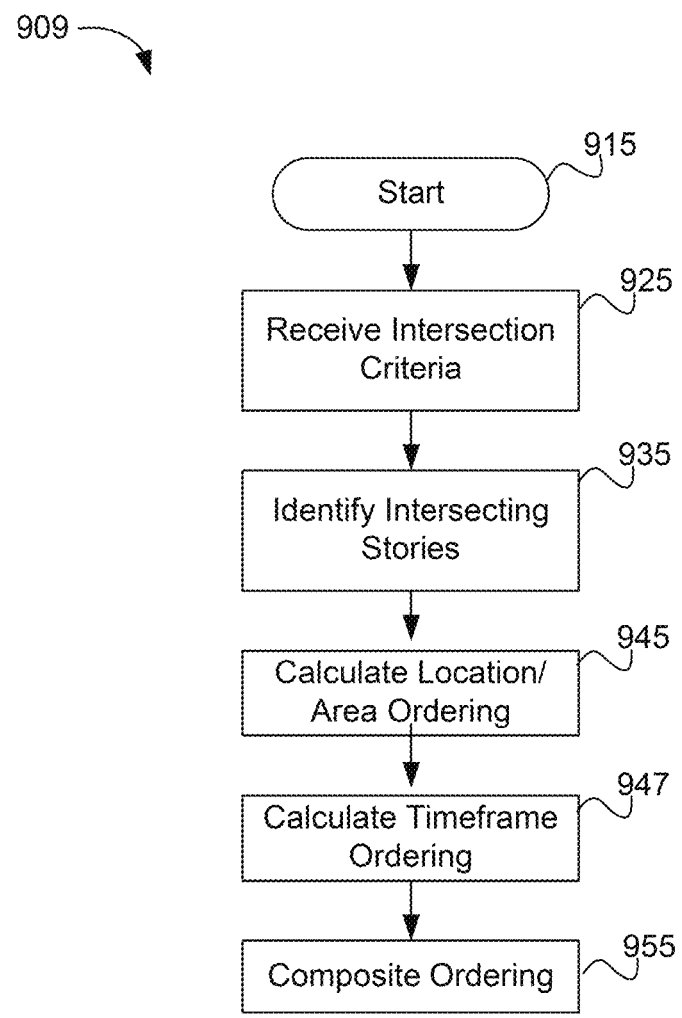
FIG. 9B is a flow diagram of one embodiment of a method for determining the relative relevance of stories in an intersection space.

FIG. 9B is a flow diagram of one embodiment of a method for determining the relative importance and/or relevance of stories in an intersection space. At steps 915, 925, and 935, the method 909 starts and is initialized, receives intersection criteria, and identifies intersecting stories, as described above.

At step 945, the method calculates a location/area ordering of the intersection space. Step 945 may comprise calculating the area of overlap, distance, Euclidian distance, spectral partitioning, or other location/area metric, resulting in an ordering that is based upon the spatial relevance (location importance) of the stories to the intersection criteria (e.g., as described above in conjunction with FIGS. 8A and 8B).

At step 947, further ordering is applied using a timeframe metric (e.g., as described above in conjunction with FIGS. 7A, 7B, and 9A), resulting in an ordering based upon temporal relevance (timeframe importance).

At step 955, a composite ordering for the stories is determined. In some embodiments, the composite ordering comprises partitioning the stories using a spectral partitioning technique, assigning corresponding importance scores at step 945, and then ordering the stories within each partition at step 947. In these embodiments, the spatial relevance weighs more heavily in the ordering than the temporal relevance. In other embodiments, the temporal ordering of step 947 may be more heavily weighted. For example, the order of steps 945 and 947 may be reversed, and the initial ordering (e.g., partitioning) of the stories may be based upon temporal relevance. The order within each cluster may be determined according to the relative spatial relevance of the stories therein.

In some embodiments, the spatial and temporal importance scores are combined using a scoring system; each story is assigned a respective score based upon its spatial and temporal relevance with respect to the intersection criteria. At step 955, the scores are combined to calculate a composite importance of the story, which is used to order the stories in the intersection space. In some embodiments, the temporal and spatial scores may be weighted equally. Alternatively, the scores may be weighted according to a user preference (e.g., provided as part of the intersection criteria), weighted based upon the intersection criteria, and/or based upon the nature of the intersection space. For example, intersection criteria that includes a finely-grained timeframe (a few hours), and a broad intersection space, may indicate that the user is more interested in the timeframe of story content than the location. Therefore, the temporal relevance of step 947 may be weighted more heavily than the spatial relevance of step 945 in the composite ordering at 955. Alternatively, if the timeframe is very broad, and the location is highly specific, the relative weighting may be reversed (e.g., to weight the spatial relevance more highly than the temporal relevance). In another example, the weights may be based upon the "density" of the intersection space. The intersection space may be dense with respect to timeframe, and sparse with respect to location, and the relevance scores may be weighted accordingly (e.g., weighted in proportion to the relative density of the stories in the intersection space). Although particular mechanisms for calculating a composite ordering at step 955 are described, the disclosure is not limited in this regard and could be adapted to use any suitable technique determining a composite ordering known in the art. Moreover, the disclosure is not limited to ordering story content by spatial and/or timeframe relevance; the systems and methods disclosed herein could be adapted to order story content using other intersection criteria, such as metadata tag relevance, social relevance, and so on.

In some embodiments, stories are indexed using the story intersection metadata. The indexing may occur as the stories are received or edited. Alternatively, or in addition, indexing may occur periodically (e.g., during low-load conditions, at pre-determined times, etc.). The up-front indexing may provide for more efficient searching and/or browsing within the intersection space. In some embodiments, stories are indexed by location using a hierarchical partitioning or clustering technique. The indexing may allow stories to be selected for inclusion in an intersection space based upon partition membership as opposed to evaluating each story individually. The indexing may further comprise indexing stories by timeframe using similar techniques (e.g., timeframe-based partitioning or clustering).

In some embodiments, the indexing includes partitioning or clustering stories based upon the scale of the story intersection metadata; stories pertaining to similarly sized areas and/or timeframes may be grouped together. The scale indexing may be used to efficiently determine intersection inclusion and/or to relative story importance, as described above.

Figure 10A:
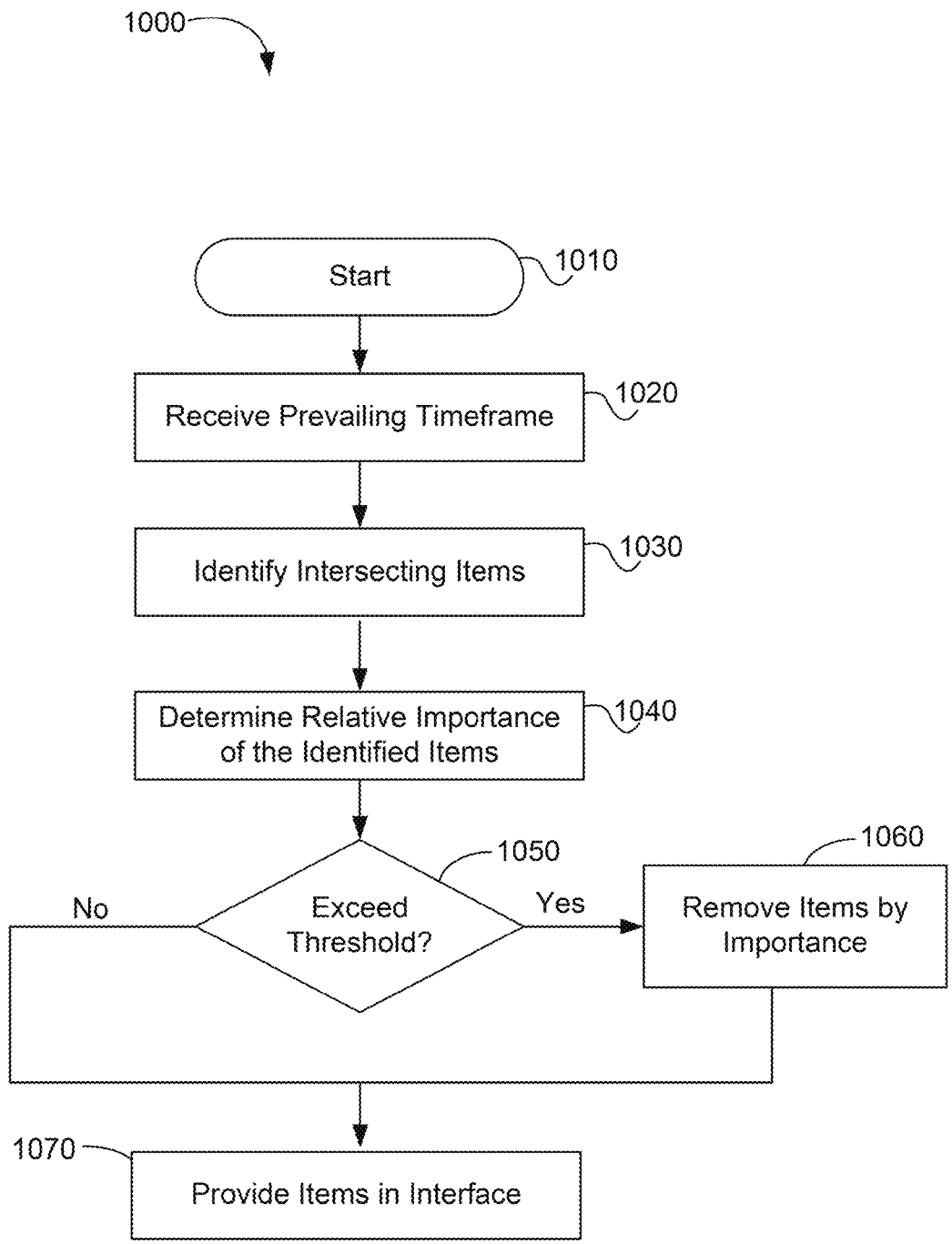
FIG. 10A is a flow diagram of one embodiment of a method for identifying important items in a chronology.

FIG. 10A is a flow diagram of one embodiment of a method 1000 for identifying important items within a chronology. At step 1010, the method 1000 may start and be initialized as described above.

At step 1020, a prevailing timeframe may be received. The prevailing timeframe may be part of intersection criteria and, as such, may define an intersection space comprising a plurality of items (stories). The prevailing timeframe may be received via an interface as part of a query or browse operation. For example, the prevailing timeframe may have been provided via the timeframe control 510 described above in conjunction with FIGS. 5A and 5B.

Step 1020 may further comprise receiving and/or determining an item threshold. The item threshold may determine how many items are to be returned (e.g., return no more than ten results). Alternatively, or in addition, the threshold may comprise an "importance" threshold. Items that intersect with the prevailing timeframe, but do not meet the importance threshold, may not be returned and/or presented by the method 1000.

At step 1030, a plurality of items that intersect the prevailing timeframe may be identified. An intersecting item may be an item having a timeframe that "overlaps" the prevailing timeframe received at step 1020. In some embodiments, the intersecting items may be identified as described above in conjunction with FIGS. 3 and 4.

At step 1040, a relative importance of the identified items may be determined. The relative importance of an item may be determined by comparing the scale (breadth) of the item timeline to the scale of the prevailing timeline as discussed above.

In some embodiments, determining relative importance may comprise calculating and/or combining a plurality of importance metrics for each item including, but not limited to: timeframe scale, timeframe correlation, item location, item repetition frequency, item content, item type, item quality, item access, item borrows, source of the item, user provided indicator(s), and so on. As discussed above, two or more of the metrics discussed above may be combined into an "importance" metric of an item. In some embodiments, the combination may comprise applying different respective weights to each of the metrics.

At step 1050, the method 1000 may determine whether the number of items identified at step 1030 exceeds an item threshold and/or whether the importance metric of any of the identified items fails to satisfy a relevance/importance threshold. If so, the flow may continue to step 1060; otherwise, the flow may continue to step 1070.

At step 1060, items may be removed from the result set until the result set satisfies the item threshold. The items may be removed in "reverse" order of their relative importance or relevance, such that the items having the lowest value or score are removed first. In addition, any items that fail to satisfy the importance metric may be removed. In some embodiments, step 1060 employs the spectral partitioning techniques described above, in which stories are partitioned based upon their spatial relationship to the intersection criteria. Stories are selected for inclusion in the intersection space based upon partition membership. For example, stories in the closest "N" partitions may be included, while stories in other partitions are excluded.

At step 1070, the remaining items may be provided to a user in an interface. The items may be presented by their relative importance; more important items may be displayed more prominently than less important items (e.g., at the head of an item list, in a larger/bolder font, or the like).

In some embodiments, the intersection space of a set of intersection criteria is filtered to remove "outlying" results. The filtering may be determined dynamically from the intersection criteria itself. For example, minimum and maximum area values may be calculated from the intersection criteria. Equation 3 provides exemplary mechanisms for calculating a minimum area ($area_{min}$) value and a maximum area ($area_{max}$) value:

$$area_{min}(q) = \min\left[\frac{area(q)^{1.447}}{1.88 \cdot 10^6}, 1.02 \cdot 10^{11}\right] \quad \text{Eq. 3}$$

$$area_{max}(q) = \min\lfloor area(q)^{1.447} \cdot 1.88 \cdot 10^6, 1.5 \cdot area(q) \rfloor$$

In Equation 3, q represents location intersection criteria, and area(q) represents the area of the location intersection criteria. The constant values of Equation 3 and 4 have been determined by testing and experience. The disclosure is not limited in this regard, however, and could be adapted to use different constant values and/or different techniques for calculating $area_{min}$ and/or $area_{max}$ values. Similarly, Equation 3 (and 4 discussed below) could be adapted for other coordinate systems, intersection criteria, or the like.

The intersection space may be filtered using the minimum and maximum area values per Equation 4:

$$IS(q)=\{s|area(s)>area_{min}(q), area(s)<area_{max}(q)\} \quad \text{Eq. 4}$$

In Equation 3, the intersection space of a query, IS(q), includes a story, s, when the area of the story, area(s), is greater than $area_{min}(q)$ value and less than $area_{max}(q)$ value.

In some embodiments, the filtering of Equation 3 is iterative and/or dynamic based upon a sufficiency threshold or other metric. For example, the sufficiency threshold may be initially set to fifty (50) stories. If the filtering of Equation 3 results in fewer than fifty stories, the $area_{min}$ value may be iteratively lowered until the sufficiency threshold is met and/or the $area_{min}$ value goes to zero. Alternatively, or in addition, the $area_{max}$ value may be similarly modified.

Figure 10B:
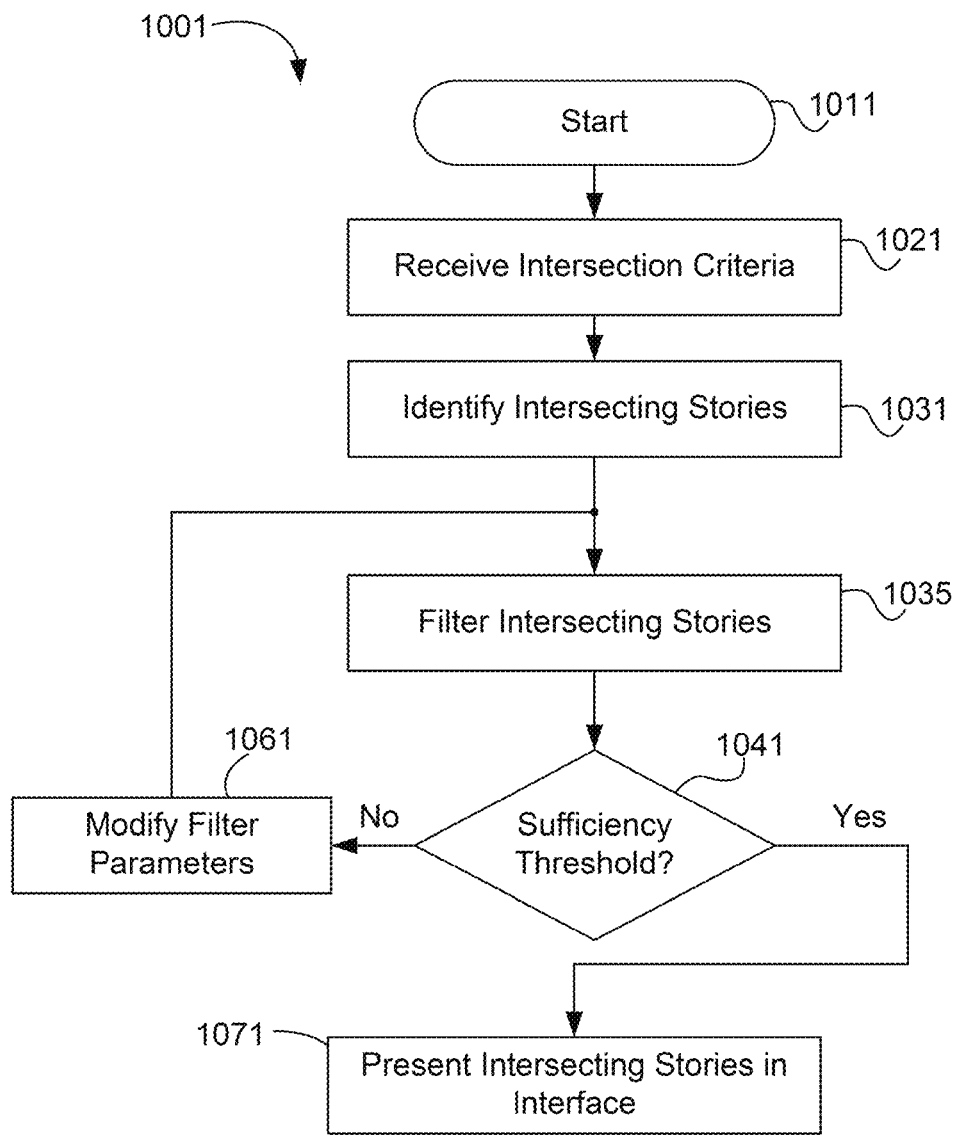
FIG. 10B is a flow diagram of one embodiment of a method for filtering an intersection space.

FIG. 10B is a flow diagram of one embodiment of a method 1001 for identifying an intersection space using minimum and maximum area parameters. At steps 1011, 1021, and 1031, the method 1001 starts and is initialized, receives intersection criteria (a query), and identifies a set of intersecting stories as described above.

At step 1035, the intersecting stories are filtered using minimum and maximum area parameters. Step 1035 comprises calculating $area_{min}$ and $area_{max}$ parameters for the intersection criteria as described above. Step 1035 further comprises calculating the area (or accessing a pre-calculated area) of the stories identified at step 1031. Stories having an area less than $area_{min}$ or greater than $area_{max}$ may be filtered from the intersection space.

Alternatively, or in addition, the intersecting stories may be filtered using a spectral partitioning technique. As described above in conjunction with Equation 2 and FIG. 8C, spectral partitioning may comprise partitioning stories in the intersection space into respective partitions using a distance matrix. Stories are then filtered based upon their partition membership. Story partitions may be included or excluded as a whole. Stories in partitions that are closer to the intersection criteria may be retained in the intersection space, whereas stories in other partitions are filtered. The number of partitions included in the intersection space may be based upon the sufficiency threshold of step 1041 (e.g., enough to satisfy the threshold), a maximum story threshold (e.g., threshold of step 1050 in FIG. 10A), or another metric.

At step 1041, the method 1001 determines whether the filtered intersection comprises a sufficient number of stories (e.g., based on a sufficiency threshold, such as the sufficiency threshold of step 1042 as described below in conjunction with FIG. 10O). If so, the flow continues to step 1071; otherwise, the flow continues to step 1061.

At step 1061, the filter parameters (e.g., $area_{min}$ and $area_{max}$) are modified to increase the number of stories in the filtered intersection space. The modifications of step 1061 may comprise increasing $area_{min}$ and/or decreasing $area_{max}$. The modified filter parameters are then used at step 1035 to filter the intersection space of step 1031.

At step 1071, and when a sufficient number of filtered, intersecting stories are identified, the intersecting stories are presented to a user in an intersection interface. The stories may be ordered relative to one another according to relative importance and/or relevance as described above.

Although examples of filtering based upon location are described herein, the disclosure is not limited in this regard and could be adapted to filter an intersection space using other types of intersection criteria, such as timeframe (e.g., minimum and/or maximum timeframe), and so on.

Figure 10C:
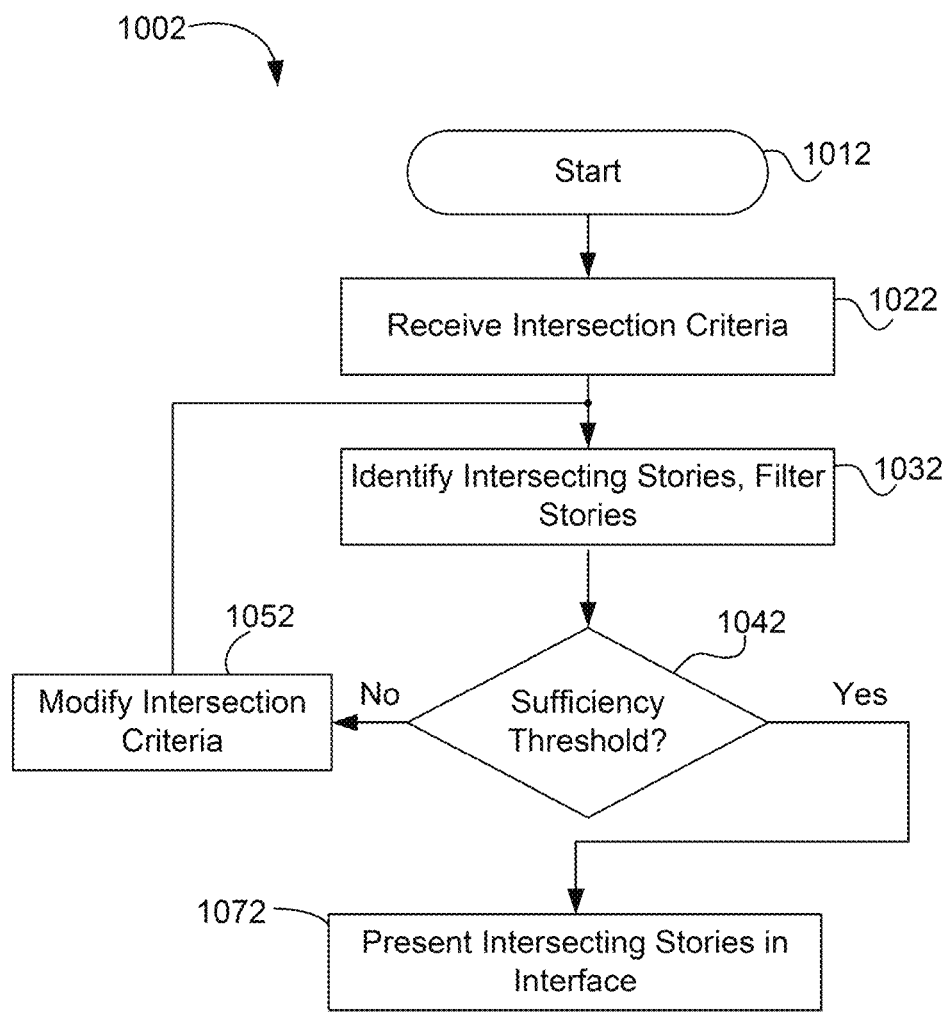
FIG. 10C is a flow diagram of another embodiment of a method for identifying intersecting stories using intersection criteria.

FIG. 10C is a flow diagram of another embodiment of a method 1002 for identifying intersections using intersection criteria. At steps 1012, 1022, and 1032, the method 1002 starts and is initialized, receives intersection criteria, and identifies stories that intersect with the criteria as described above.

In some embodiments, step 1032 identifies intersecting stories using pre-determined story index information. The story index may index stories by location, timeframe, or other intersection criteria (e.g., participants, interested persons, descriptive tags, etc.). The stories may be indexed when submitted to the network-accessible service or at another time (e.g., on a periodic schedule, during low-load conditions, etc.). The indexing information may be used to efficiently identify stories for inclusion in the intersection space, determine relative story importance, filter stories (e.g., based upon relative importance, scale, or the like), and so on. In some embodiments, the story index partitions stories by location, timeframe, location scale, timeframe scale, or the like, as described above.

At step 1042, the set of intersecting stories identified at step 1032 is compared to a sufficiency threshold. The sufficiency threshold determines the minimum number of stories for an intersection space. The sufficiency threshold may be a single story (e.g., one) or some other pre-determined value (e.g., fifty stories).

In some embodiments, the sufficiency threshold of step 1042 is determined dynamically from the intersection criteria of step 1022 and/or the metadata associated with the intersecting stories identified at step 1032. Accordingly, step 1042 may comprise determining and/or calculating a dynamic sufficiency threshold value. The dynamic sufficiency threshold of step 1042 may be determined according to the granularity of the intersection criteria and/or the "density" of the intersecting stories. For example, an intersection criteria that is defined broadly (e.g., large location footprint and/or broad prevailing time) and/or is defined within a "dense" area of potentially intersecting stories may indicate that the user is interested in a large number of stories and, as such, the sufficiency criteria may be set to a high value (e.g., fifty to one hundred stories). In other examples, the sufficiency criteria may be set to a low value in accordance with narrowly defined intersection criteria (e.g., narrow location footprint and/or timeframe) and/or is defined within a "sparse" area of potentially intersecting stories.

If the intersecting stories identified at step 1032 satisfy the sufficiency threshold at step 1042, the flow continues to step 1072; otherwise, the flow continues to step 1052.

At step 1052, the intersection criteria is modified to increase the number of intersecting stories. The modification of step 1052 may comprise incrementally broadening the intersection criteria of step 1022 (e.g., applying a scaling factor to time and/or location intersection criteria). In some embodiments, the modification maintains the "center" of location and/or time intersection criteria, while expanding the "extent" of the criteria. For example, scaling a prevailing timeframe spanning one (1) hour (e.g., timeframe from 2 PM to 3 PM on May 2, 2001) by a factor of two (2) results in a timeframe spanning two (2) hours (e.g., from 1:30 PM to 3:30 PM on May 2, 2001). Similar scaling operations may be applied to other intersection criteria (e.g., modifying a location "bounding box" or area radius), expanding participating persons using social connections, expanding metadata tag and/or rating criteria, and so on.

In some embodiments, the modifications of step 1052 may be adapted according to the intersection criteria and/or underlying intersection space. For example, if the intersection space is dense with respect to the intersection criteria, the scaling factors (or other modifications) of step 1052 may be relatively small to avoid the case where the modified intersection criteria returns too many results (e.g., more than the threshold of step 1050 of FIG. 10A). Modifications in a sparse intersection space may be larger to satisfy the sufficiency threshold.

The modifications to the scaling factors of step 1052 may be intersection-criteria dependent. For example, the location density of the intersection space may exceed the timeframe density of the intersection space (e.g., stories are dense with respect to location, but not to time). In this case, the modifications to location intersection criteria may be relatively small as compared to the modifications to the timeframe criteria.

In some embodiments, the modifications of step 1052 are calculated using an iterative expansion of the intersection criteria. At each iteration, the intersection criteria is recursively expanded until a sufficient number of stories are found and/or an iteration limit is reached. In some embodiments, the expansion factor is proportional to the intersection criteria. Equation 5 is an example of an iterative expansion of location and timeframe intersection criteria:

$$f_l(q_i) = \max\lfloor 3.70514 - 0.45368 \cdot \log_{10}(\sqrt{area(q_i)}), 1.2 \rfloor$$

$$f_t(q_i) = \max[2.853 - 0.2 \cdot \log_{10}(duration(q_i), 1.1] \quad \text{Eq. 5}$$

In Equation 5, $q_i$ represents the intersection criteria (query). The $i$ notation indicates the current iteration of the intersection criteria (since the expansion is recursive, each iteration operates on the intersection criteria as modified in the previous interaction). The area($q_i$) represents a function that calculates the area of the location intersection criteria, and the duration($q_i$) represents a function that calculates the duration of a timeframe of the intersection criteria. The constant values in Equation 5 were selected by testing and experience. The modified intersection parameters are calculated by applying the scaling factors per Equation 6:

$$q_{l,i+1} = f_l(q_i) \cdot q_i \qquad \text{Eq. 6}$$

$$q_{t,i+1} = f_t(q_i) \cdot q_i$$

In Equation 6, $q_{l,i+1}$ represents expanded location intersection criteria, and $q_{t,i+1}$ represents expanded timeframe criteria. The modified intersection criteria calculated at step 1052 (e.g., $q_{l,i+1}$ and $q_{t,i+1}$) is used to identify intersecting stories at step 1032.

Although examples of modifications to timeframe, location, and/or "social" intersection criteria are described herein, the disclosure is not limited in this regard and could be adapted to modify other types of intersection criteria, such as metadata tags (e.g., to include related tags), rating metadata, and so on.

The intersection criteria modified at step 1052 is used to identify a new set of intersecting stories at step 1032, and the flow continues to step 1042 as described above. In some embodiments, the method 1002 iterates over steps 1032, 1042, and 1052 until the sufficiency threshold of step 1042 is satisfied and/or an iteration threshold is met.

At step 1072, and when the sufficiency threshold is satisfied, the intersecting stories are presented to a user in an intersection interface. The stories may be ordered relative to one another according to relative importance and/or relevance as described above.

Although not depicted in FIG. 10C, in some embodiments, the method 1002 includes a threshold comparison step, such as step 1050 of FIG. 10A that limits the maximum number of intersecting stories presented at step 1072 and/or a filtering step, such as step 1035 of FIG. 10B. Moreover, steps of the methods 1000, 1001, and/or 1002 may be combined to generate an intersection space that includes a maximum story limit (as in method 1000), one or more filtering parameters (as in method 1001) and/or the sufficiency threshold of method 1002.

Figure 10D:
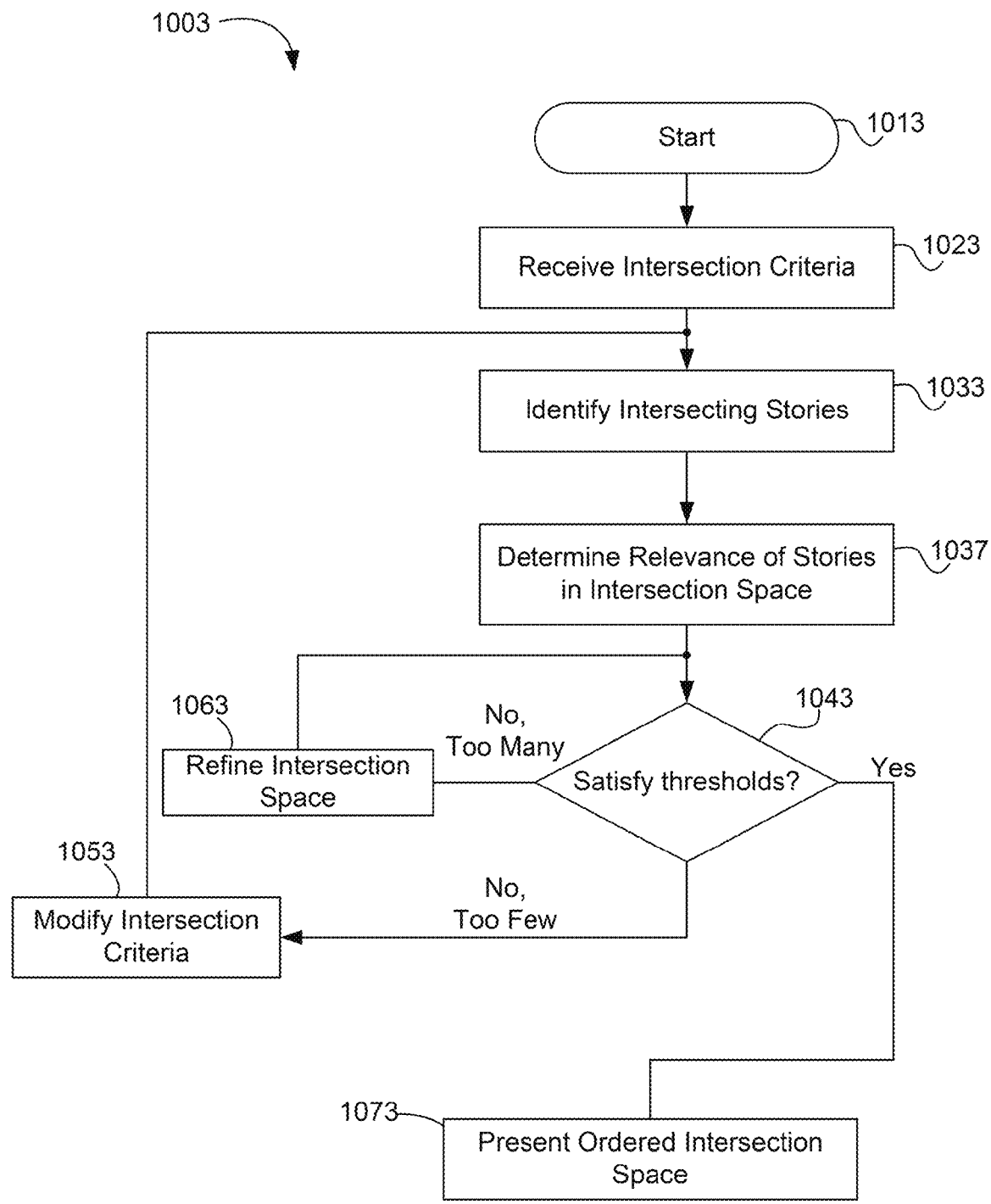
FIG. 10D is a flow diagram of another embodiment of a method for identifying intersecting stories and determining the relative relevance of stories in an intersection space.

FIG. 10D is a flow diagram of another embodiment of a method for identifying intersecting stories and determining the relative relevance of stories in an intersection space. At steps 1013, 1023, and 1033, the method starts and is initialized, receives intersection criteria, and identifies intersecting stories as described above.

At step 1037, the relative importance of each story in the intersection space is determined. The relative importance of the stories may be calculated using the location and/or timeframe comparisons described above. In some embodiments, the comparison comprises partitioning the stories using the spectral partitioning techniques described above in conjunction with Equation 2 and FIG. 8C.

Step 1043 comprises determining whether the intersection space satisfies one or more thresholds. The thresholds may include a sufficiency threshold defining a "minimum" number of stories to be included in the intersection space and/or a maximum threshold defining a maximum number of stories to be included in the intersection space. Step 1043 may further comprise an iteration threshold that limits the iterations of the modifying steps and/or filtering steps 1053 and 1063.

If step 1043 indicates that the thresholds are satisfied and/or the iteration threshold has been reached, the flow continues to step 1073. If step 1043 indicates that the intersection space does not satisfy a sufficiency threshold (comprises too few stories), the flow continues to step 1053. If step 1043 indicates that the intersection space does not satisfy a maximum story threshold (includes too many stories), the flow continues to step 1063.

At step 1053, the intersection criteria is modified as described above (e.g., using a scaling factor). The modification of step 1053 may comprise "expanding" the intersection criteria to include "nearby stories" in the intersection space. A "nearby story" is a story that does not technically intersect with the intersection criteria, but may be still be relevant (e.g., has intersection metadata that is "similar" or "close" to the intersection criteria). The modification of step 1053 may comprise scaling the intersection criteria using proportional scaling factors as described above in conjunction with FIG. 10C and/or Equations 5 and 6 described above. Upon modifying the intersection criteria, the flow continues to step 1033 where the modified intersection criteria is used to identify a broader intersection space and proceeds as described above.

At step 1063, the intersection space is refined to remove stories therefrom. Step 1063 may comprise removing stories in order of their relative importance as in step 1060 of FIG. 10A. Alternatively, or in addition, step 1063 may comprise filtering the intersection space using one or more filtering criteria (e.g., minimum area, maximum area, etc.). Step 1063 may further comprise partitioning the stories using a spectral partitioning technique. Accordingly, at step 1063, the stories in the intersection space are partitioned (e.g., using a distance matrix per Equation 2), the closest partitions are identified, and one or more partitions are selected for inclusion in the intersection space.

The intersection space refined at step 1063 and/or broaden through the modification of the intersection criteria at step 1053 may be evaluated at step 1043 to determine whether the intersection space satisfies the thresholds as described above. If the intersection space includes too many stories, the intersection may be further refined at step 1063. If the intersection space does not satisfy the sufficiency threshold, the refinements of step 1063 may be modified as described above in conjunction with step 1061 of FIG. 10B and/or the intersection criteria may be modified at step 1053.

When the intersection space satisfies the thresholds and/or an iteration threshold is reached, the flow continues to step 1073 where the intersection space is presented to a user. Step 1073 may further comprise ordering and/or highlighting stories by order of importance as determined at step 1037.

As discussed above, stories in an intersection space may be ordered by relative importance. The importance of a story may quantify the degree to which the intersection metadata of the story corresponds to the intersection criteria. More important stories may be prominently displayed in the intersection space. In addition to prominently displaying important stories in a set of results, important stories or items may be prominently displayed on a timeframe control, such as the timeframe controls 510 of FIGS. 5A and 5B. In addition, a timeframe control may be configured to display a "dynamic timeframe." A dynamic timeframe may display different time granularities depending upon the number of intersecting items therein. For example, if a particular three-year time span includes only a few items, the time span may be "constricted" in that area to conserve display space. Conversely, if a particular time span includes many relevant items, that time span may be dilated in the display area in order to better depict the items. In some embodiments, the areas of time constriction and/or time dilation may be presented in different ways to indicate to the user that a change to the time scale has been made (e.g., the background of the region(s) may be modified).

Figure 11A:
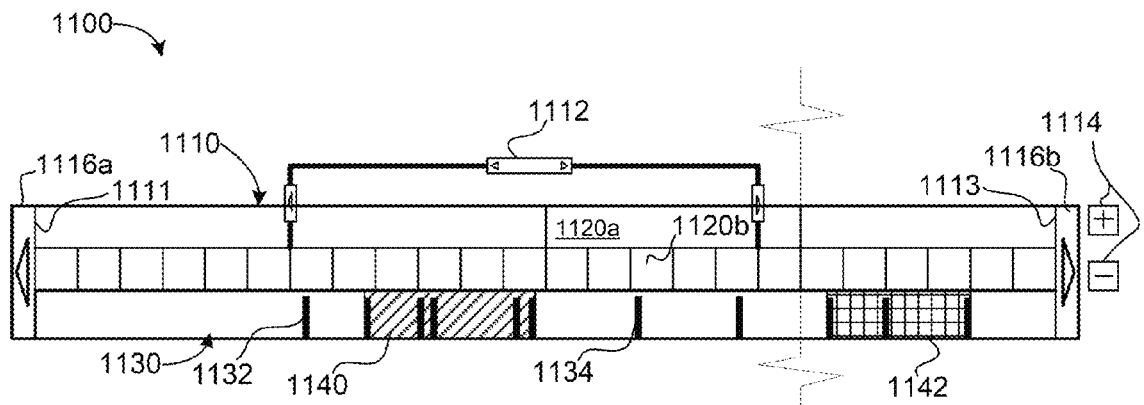
FIGS. 11A-C depict embodiments of a timeframe control interface element.

FIG. 11A depicts one example of a timeframe control 1100. The control 1100 may be displayed in an interface, such as the interfaces 500 and/or 503 discussed above. The control 1100 may comprise a timeframe display (timeline) 1110, which may span a particular time segment. The time span of the chronology display 1100 may be determined using zoom controls 1114. Zooming in may cause the display 1110 to display a more finely-grained timeframe. When fully "zoomed-in," the timeframe display 1110 may comprise the seconds of a single minute (e.g., the chronology display 1100 may have a start time 1111 of Jul. 4, 2008, at 11:23:35 AM and an end time 1113 of Jul. 4, 2008, at 11:24:35 AM). The intervening chronological scale may be regularly segmented by seconds or portions of seconds. When "zoomed-out," the timeframe display 1110 may comprise a time span covering months, years, decades, or beyond.

The timeframe control 1100 may include a timeframe selector 1112 that is used to select a timeframe of interest (a prevailing timeframe). As the timeframe of interest changes (e.g., as the timeframe control 1100 and/or timeframe selector 1112 are manipulated to select different prevailing timeframes), the stories included in the resulting intersection space may change. Referring to FIGS. 5A and/or 5B, these changes may cause a different set of stories to be included in the region 530 and/or different metadata to be displayed in the elements 540, 542, 544, 546, 548, 550, and so on, as described above.

The timeframe display 1110 may be labeled with a time scale. As discussed above, when "zoomed in," the labels 1120a and 1120b on the timeframe display 1110 may be expressed as minutes within a particular hour (e.g., label 1120a may read 11 AM, and label 1120b may read ":28" indicating the 28th minute of 11 AM). At other levels of granularity, the labels 1120a and 1120b may reflect a different time scale. For example, the timeframe display 1110 may span the hours of a day, and the labels 1120a and 1120b may read "Jul. 12, 2008" and "3 PM," respectively. When the timeframe display 1110 spans one or more months, the labels 1120a and 1120b may read "July 2009" and "16," respectively. When the timeframe display 1110 spans one or more years, the labels 1120a and 1120b may read "2009" and "Nov," respectively. When the timeframe display 1110 spans one or more decades, the labels 1120a and 1120b may read "2000s" and "2009," respectively. Although a particular set of timeframe ranges (time spans) and respective labels 1120a and 1120b are disclosed herein, the timeframe control is not limited in this regard and could be adapted to display any time span using any type of labeling known in the art. Moreover, other timeframe controls, such a calendar control or the like could be used under the teachings of this disclosure. The timeframe controls may reference an absolute timeframe, a "virtual timeframe," a relative timeframe (e.g., years since the contributor's birth, where the birth year is not defined), or the like.

A user may move the timeframe display 1110 in time by directly manipulating the display 1110 (e.g., clicking and/or sliding the display 1110), using the zoom controls 1114 to change the time span or scale of the control 1110, and/or using browse controls 1116a and 1116b to shift the control 1100 forward or backward in time. On a touch screen, gestures and touches may be used to give user input to the timeframe display. A keyboard can be used as well. For example, in one embodiment the Left and Right keys scroll time backwards and forwards, respectively, and the Up and Down keys expand and contract the duration of time displayed. Likewise, holding the Shift key may cause a selected region to expand rather than change in response to a command that otherwise would change the prevailing time.

The timeframe control 1110 may include a "story indicator" region 1130, which may comprise indications 1132 of where particular items (e.g., stories) fall within the timeframe of the timeframe control 1110. Accordingly, the story indication region 1130 may be "tied to" the timeframe control 1110, such that the timescale and/or range displayed in the timeframe control 1110 corresponds to the chronology of the story indications 1132. The timeframe range on the display 1110 at which a particular story indication 1134 is shown indicates the timeframe of the item (e.g., the indicator 1134 may correspond to a story having a timeframe comprising the time indicated by the labels 1120a and 1120b).

In some embodiments, the story indication region 1130 may comprise a "heat" or "density" map. As used herein, a "heat map" may refer to a modification of regions within a timeframe control or story indication region 1130 to indicate the quality of the items therein. For example, the items within the region 1140 of the story indication region 1130 may be highly rated (as determined by user-submitted ratings or another ratings source). The appearance of the intersection indications in the region 1140 (or a background area of the region 1140) may be modified to indicate that the region 1140 comprises "hot" content (e.g., modified to have a brightly colored background). The appearance of regions (e.g., region 1142) that comprise poorly-rated content may be modified to appear "cool" (e.g., modified to have a darker background).

As used herein, a "density map" may be used to indicate the relative density of intersecting items within a particular time span in the timeframe display 1110. In some cases, the scale of the timeframe display 1110 may be such that the display intersects with a large number of items. There may be so many intersecting items that it may be impractical to show indicators 1132 for each one. Therefore, in certain portions of the story indicator region 1130, a density map may replace individual story indicators 1132, or may be displayed along with a plurality of story indicators 1132; where it is not practical to display each indicator, a single indicator may be used to represent a plurality of intersecting items. Like the "heat" indicators discussed above, a density map may change the appearance of certain regions of the timeframe display 1110 and/or story indication region 1130 according to the relative density of intersecting items therein. Regions comprising more intersections may be displayed in "hot" colors, whereas regions comprising fewer intersections may be displayed in "cooler" colors. In some cases, the timeframe range and/or story indication region 1130 may be displayed concurrently (on different portions of the timeframe display 1110 and/or story indication region 1130). Alternatively, or in addition, the "heat" and "density" maps may be displayed in different ways, the heat indicator may modify the appearance of the story indicators 1132, and the density map may modify a background of the story indication region 1130 or timeline display 1110.

As illustrated in the description of a density map, chronological Items may not be uniformly distributed in time. Certain regions of a timeframe may include many items, whereas other regions may include only a few (or none). For example, a contributor may primarily contribute stories about his/her summer vacations. Accordingly, the summer months of a timeline may be tightly packed with intersecting items, whereas other times are virtually empty. When viewing this contributor's items within a multi-year timeframe, it may be difficult to distinguish individual items due to this temporal clustering (the story indications 1132 may be tightly clustered in certain regions of the story indication region 1130 while other regions are empty). In some embodiments, the timeframe control 1100 may comprise a dynamic timescale adapted to account for disparity in item time distribution.

Figure 11B:
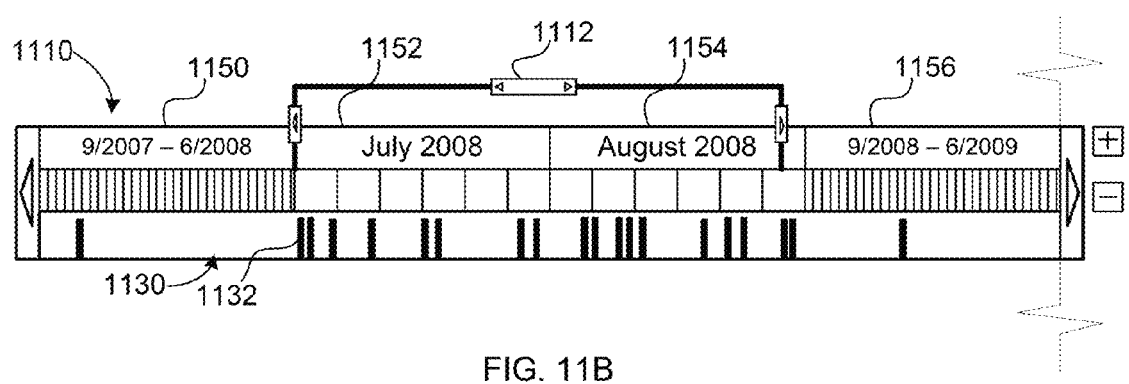

FIG. 11B depicts one example of a timeframe control 1101 having a dynamic time scale. As illustrated in FIG. 11A, the timeframe regions 1150 and 1156 comprise a coarser time scale than the regions 1152 and 1154; the region 1150 and 1156 each span ten months, whereas the regions 1152 and 1154 each span a single month. The difference in scale may be automatically determined based upon the time distribution of the story indications 1132 in the timeframe 1110 (as shown in FIG. 11B, many items intersect with the months of July and August, while the other ten-month spans each intersect with only a single item). Displaying different timeframes in different regions may allow a user browsing the control a better depiction of item distribution; without the differing scale, the item indicators within the July and August regions 1152 and 1154 may appear as a single "blob." In some embodiments, the distribution of items within a timeframe may be automatically evaluated to identify "sparse" timeframes and "dense" timeframes. Sparse timeframes are candidates for compression, whereas dense timeframes are candidates for dilation. Under certain conditions, one or more sparse timeframes may be compressed in order to allow for one or more dense timeframes to be expanded.

As discussed above, some items (such as stories or the like) may be ordered by relative importance. See methods 700 and 800 above. The relative importance of an item may be determined empirically by comparing the item or item metadata (e.g., story timeframe, location, etc.) to intersection criteria, such as a prevailing timeframe as displayed by a timeframe control 1100. The comparison may further comprise comparing item properties, such as quality, access count and the like. Alternatively, or in addition, item importance may be specified by the item contributor. For example, the contributor may mark an item as "critical," "life changing." These events may be classified as "milestones" or "marker events."

Marker events may be used to indicate life-altering, watershed events that may have a permanent effect on the contributor's life. Examples of marker events may include, but are not limited to: marriage, bar mitzvah, a first trip out of the country, childbirth, graduation, and the like. A marker event may relate to something that, having happened, remains true for the remainder of the contributor's lifetime. Since marker events may be defined by the contributor, they may relate to virtually any experience. For example, tasting gelato for the first time for many people may not be particularly significant, but for some people (e.g., a chef) may represent a life-changing moment (e.g., the moment the contributor decided to become a chef). Marker events may be embodied as a story. A story may be identified as a marker event in a contribution interface, such as the interface 100 of FIG. 1A (e.g., using importance input 134 and/or selecting a "marker event" story type in input 124). In some embodiments, the relative importance of items displayed in the timeline control may be used to select a dynamic time scale as described above. For example, important items may be weighted more heavily when determining whether to compress or dilate a particular time region.

Figure 11C:
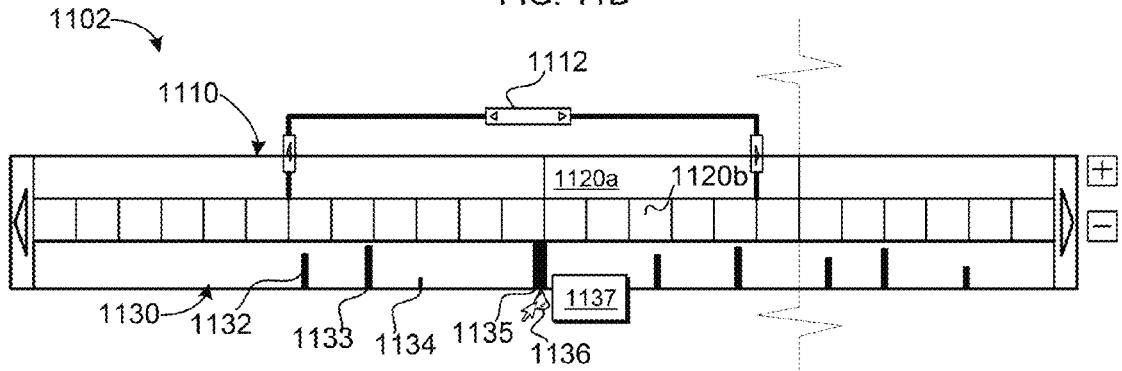

Marker events may be prominently displayed within a chronology, such as the timeframe controls 1100 and/or 1101 described above. FIG. 11C depicts one example of a timeframe control 1102 configured to display items of varying relative importance. The appearance of the story indicators 1132 in the story indicator region 1130 may be modified to reflect the relative importance of the items represented thereby. In some embodiments, a height or size of the indicators 1132 may indicate their importance. The indicator 1133 may represent a relatively important item and, as such, may be more prominently displayed (e.g., may be taller than other, less important indicators 1132). Alternatively, or in addition, the indicator 1133 may be displayed in a different color or width. The indicators 1132 of less important items may be displayed less prominently. For example, the indicator 1134 may correspond to a relatively unimportant item and, as such, may be shorter (or of a less prominent color) than other indicators 1132. As discussed above, item importance may be determined based upon a prevailing timeframe. Accordingly, as the timeframe control 1100 is manipulated (e.g., to change the time scale, move within the chronology, or the like), the relative importance of the items may change, causing a corresponding change to the indicators 1132.

Indicators 1132 of the most important items (e.g., marker events) may be displayed prominently. The indicator 1135 may represent a marker event. In some embodiments, the indicator 1135 may be selectable and/or may comprise a selectable area 1136 which, when selected or hovered over by a cursor, may cause an additional display element 1137 to appear. The display element 1137 may display a link badge of the marker event story, may provide a short description of the marker event, or the like.

Figure 12:
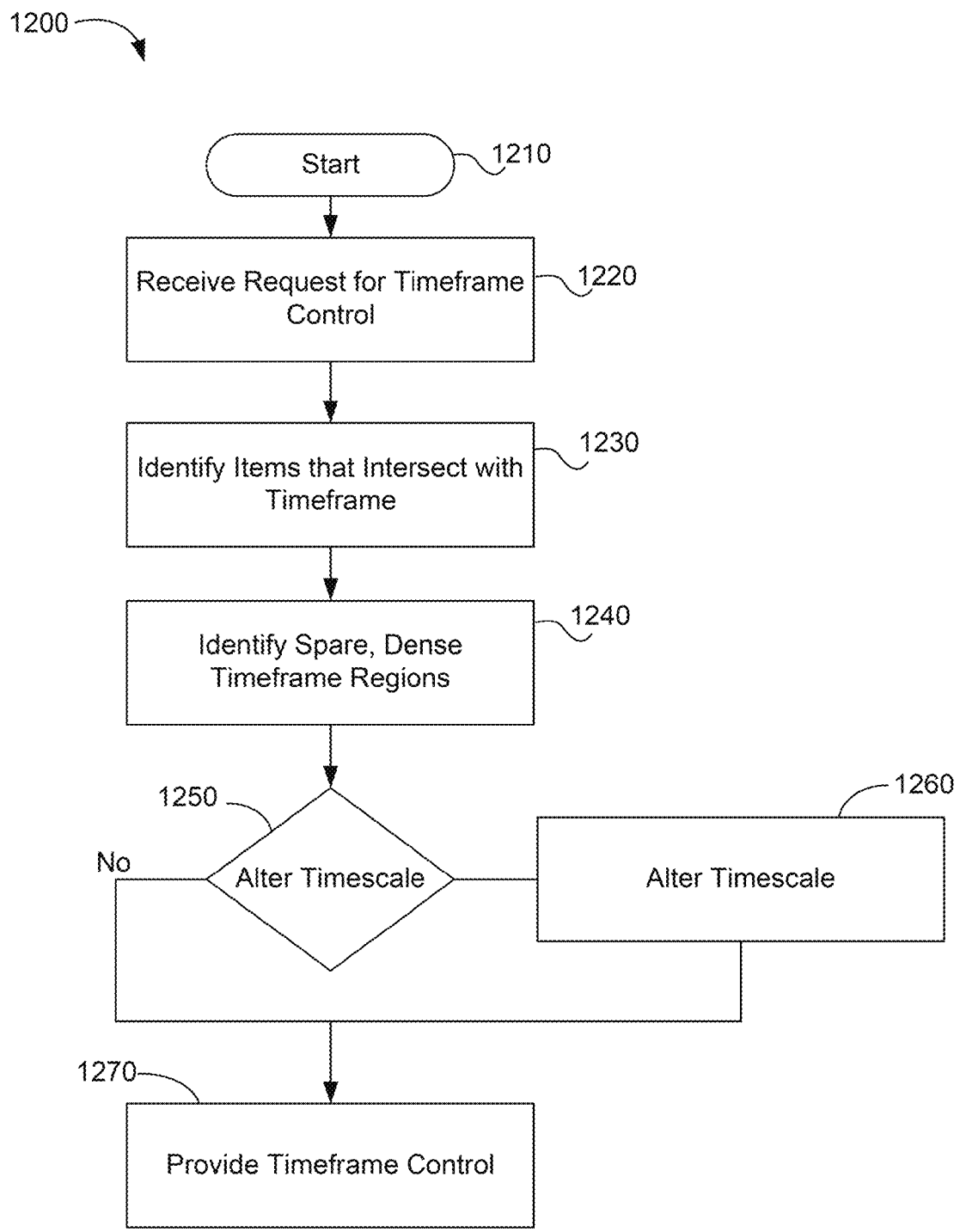
FIG. 12 is a flow diagram of one embodiment of a method for displaying a timeframe control interface element.

FIG. 12 is a flow diagram of one embodiment of a method 1200 for displaying a timeframe control, such as the timeframe controls 510 and/or 1100 disclosed above.

At step 1210, the method 1200 may start and be initialized as described above. At step 1220, a request for a timeframe control may be received. The request may be issued responsive to a user interaction with an interface, such as the interface 500 and/or 503 of FIGS. 5A and 5B. In some embodiments, the request may include a timeframe of interest (the request may indicate that the timeframe control is to display a timeframe having a particular start time and a particular end time). Alternatively, or in addition, the timeframe of interest may be received responsive to user manipulation of a timeframe control (responsive to the user manipulating zoom controls, browse controls, or the like).

At step 1230, a set of items intersecting with the timeframe to be covered by the timeframe control may be identified. The items may be identified as described above (e.g., by comparing a timeframe of the item(s) to the timeframe of the timeframe control).

At step 1240, a time distribution of the identified items may be evaluated to identify "sparse" regions and/or "dense" regions. In some embodiments, step 1240 may comprise evaluating ratings of the identified items. As discussed above, item ratings may be used to mark "hot" or "cold" areas on a timeline control.

At step 1250, the method 1200 may determine whether a time scale of the control should be altered. In some embodiments, the determination of step 1250 may comprise determining whether the "sparse" regions identified at step 1240 are sufficiently sparse that compression would not render them unsuitable for use. The determination may comprise calculating a "compression threshold," which may be based upon the number of items in the sparse region(s) to a desired level of compression. The compression threshold may indicate how much a particular region may be compressed before item density becomes too great (e.g., item density may not exceed a particular compression threshold). Step 1250 may further comprise calculating a "dilation threshold" for dense regions, which may quantify how much dilation would be required to reach a desired item density. The threshold(s) may be compared to determine whether changing the time scale would result in a net benefit (e.g., improve the dense regions by dilation while not rendering the sparse regions unusable as a result of excess compression). The comparison may comprise comparing the compression threshold to the dilation threshold of various regions. If neither threshold can be satisfied, the time span may be unchanged or the approach representing the "best" result may be selected. The best result may be the result that provides some improvement to the sparse regions (but not reaching a dilation threshold) while minimizing adverse effects on the compressed regions (while perhaps exceeding a compression threshold). In some embodiments, the relative importance of the items is used to weight the thresholds and/or to determine whether to modify the time scale. For example, the dilation threshold of a region comprising important items may be increased to ensure that the indicators for these important items are adequately displayed (perhaps to the detriment of other, less important indicators). Similarly, the compression threshold of a region comprising important (e.g., a marker event) may be increased to prevent the region from being compressed in favor of other, less important item indicators.

If the method 1200 determines that the timescale is to be modified, the flow may continue to step 1260; otherwise, the flow may continue to step 1270.

At step 1260, a dynamic timescale for the timeframe control may be determined. As discussed above, the dynamic timescale may compress sparse regions of the timeframe and dilate dense regions. The degree to which each region is compressed or dilated may be based on the compression/dilation thresholds described above.

At step 1270, a timeframe control may be provided for presentation to a user. Step 1270 may comprise providing a timeframe directive to a control (including a dynamic time span), providing item indicators for display on the control, and so on. Step 1270 may further comprise determining whether to display intersecting items as individual indicators, or in some other way, such as composite indicators, density regions or the like. For example, if all of the regions are considered to "dense" (exceed a dilation threshold), and there are no sparse regions to compress, the method may consolidate item indicators into composite indicators and/or depict intersecting items within "density regions" discussed above.

Step 1270 may further comprise marking regions by rating and/or by density. In some embodiments, item ratings (evaluated at step 1240) may be used to mark certain regions of the timeframe control as "hot" and/or "cold." Marking a region may comprise directing a display component to modify an appearance of one or more display components (e.g., modify the background color of a region of the story indication region 1130 of FIG. 11A). Region density may be similarly marked.

As discussed above, a contributor may submit content (such as stories) to a network-accessible service (e.g., website), where they may be stored and made available to other users. The contributor may establish a profile, which may comprise information describing the user, and may include such information as profile avatar (e.g., graphical image, such as a photo representing the user), contact information, citizenship, residency, age (birthday), marital status, preferences (musical, artistic, etc.), and so on.

In some embodiments, and as discussed above in conjunction with FIG. 5B, user profile information may be tied to a chronology. Accordingly, a user profile may include multiple copies of a particular attribute, each associated with a different respective timeframe. For example, the marital status of a user may be "single" until Nov. 3, 2003, be "married" from Nov. 4, 2003, to Dec. 1, 2009, and be "divorced" from December 2 onward. Other user profile attributes may change over time. For example, a user profile may comprise a plurality of profile images, each graphically representing the user during a different timeframe. The images may be photos taken at different times in the user's life (e.g., me at 20, at 22, at 30, at 45, and so on). User preferences, such as "favorite movie," "musical genre," and the like may be tied to particular timeframes. In some embodiments, as new preferences are entered, the old preferences replaced thereby are automatically assigned an end time, and the new preference is automatically assigned a start time. These time values may be the time the new preference was received, or some other, user-defined time. Similarly, user profile information that is determined by the other users (e.g., contributor ratings, etc.) may be tied to a timeframe; changes in a contributor's ratings over time may indicate that the user's content is improving. Although a particular set of user profile attributes are discussed herein, it would be appreciated by one of skill in the art that the teachings of this disclosure could be applied to any type of profile information. As such, this disclosure should not be read as limited to any particular set of profile attributes.

Figure 13:
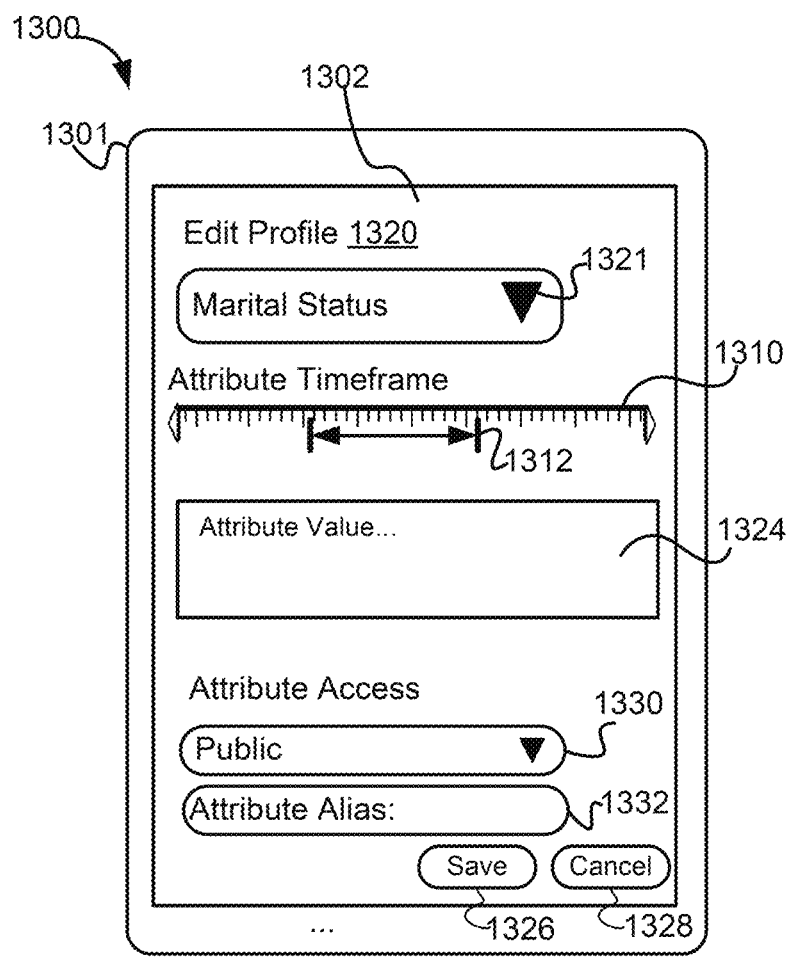
FIG. 13 depicts one embodiment of an interface for authoring a chronological user profile.

FIG. 13 depicts one embodiment of an interface for authoring user profile information. The interface 1300 may be provided by a network-accessible service (e.g., website) for display on a computing device. In some embodiments, the interface 1300 may be provided in a browser-renderable format, such as Hypertext Markup Language (HTML) or the like. Accordingly, the interface 1300 may be displayed within a window 1302 of a browser application 1301. Alternatively, or in addition, the interface 1300 may be adapted for display in a stand-alone application, as a plug-in to another application, or the like.

The interface 1300 may include one or more profile edit controls 1320, each comprising a respective timeframe control 1310 and input 1324. The edit control 1320 may specify which profile attribute is to be edited thereby (e.g., indicate that the control 1320 edits the "marital status" user profile attribute). Alternatively, or in addition, the edit control 1320 may comprise a profile selection input 1321 to allow the user to select different profile attributes for editing.

The input 1324 may be configured to receive user profile information entered by the user. The input 1324 may be configured to receive text, graphical images, video, audio, multimedia content, and the like. Like the timeframe controls described above (timeframe controls 510 of FIGS. 5A and 5B), the timeframe control 1310 may be used to select a particular timeframe 1312 (and/or may include zoom, and/or browse controls, and the like). The selected timeframe 1312 may indicate the timeframe during which the profile attribute entered in the input 1324 is valid. The control may include a "save" input 1326 and/or a "cancel" input 1328. The save input 1326 may cause the timeframe 1312 and profile attribute value entered via the input 1324 to be submitted to and/or stored at the network-accessible service (e.g., website) and included in the user's profile. The cancel input 1328 may discard the contents of the control 1320. In some embodiments, the profile edit control 1320 may include an access control input 1322, which may be used to specify which users are allowed to access the user profile information.

In some embodiments, the control 1320 may include an access control input 1330, which may be used to determine which of the user's circles are to be allowed to view the attribute value (the value entered via 1324). The access control input 1330 may include an alias input 1332, which may be used to indicate an alternative "alias" attribute value to display to users who do not have access to the attribute value (e.g., the alias of a marital status attribute value may be "not disclosed", or the like).

In one example, wherein the edit control 1320 is used to enter a marital status user profile attribute, a user may select a timeframe 1312 spanning his birth date until Nov. 3, 2003, and enter "single" in the input 1324. The user may then select a different timeframe 1312 (e.g., spanning Nov. 4, 2002, to Dec. 1, 2009) and enter "married" in the input 1324. Finally, the user may enter "divorced" in the input 1324 and specify an open ended timeframe 1312 beginning on Dec. 2, 2009.

The user may specify other attributes in a similar manner. Each attribute may be tied to a different respective timeframe (using the timeframe control 1310 or some other mechanism). Accordingly, the user profile may comprise multiple copies of the same user profile attribute, each associated with a different timeframe. Accordingly, each user profile attribute may be stored in connection with a respective timeframe (start time and/or end time). User profile information may, therefore, be referenced chronologically and/or by a prevailing timeframe. In addition, the user profile information may be associated with access controls, which may indicate which users are to be allowed to access which attributes (or attribute updates).

For example, in a prevailing timeframe spanning 1998 to 2002, the marital status attribute of the user profile discussed above would be "single." During a different prevailing time (spanning 1998 to Nov. 2, 2003), the marital status may be "married," and during the prevailing time spanning 1998 to Nov. 5, 2003, the marital status may be "divorced." The user may want to hide the fact that he was divorced in 2003 from everyone but those in his "family" circle. Therefore, when entering the "divorced" attribute, the user may specify (via the access control input 1322) that only his "family" circle is to be allowed to see the "divorced" attribute. When the prevailing timeframe includes Nov. 3, 2003, only the users in the "family" circle may see "divorced," all other users may continue to see "married."

As illustrated above, in some embodiments, the selection of which attribute to display may be based on access controls, or attribute "freshness" (e.g., the latest or most recent value within the prevailing timeframe may be displayed). In other embodiments, other selection mechanisms may be used; for instance, the attribute having the most "overlap" with the prevailing timeframe may be displayed.

Figure 14:
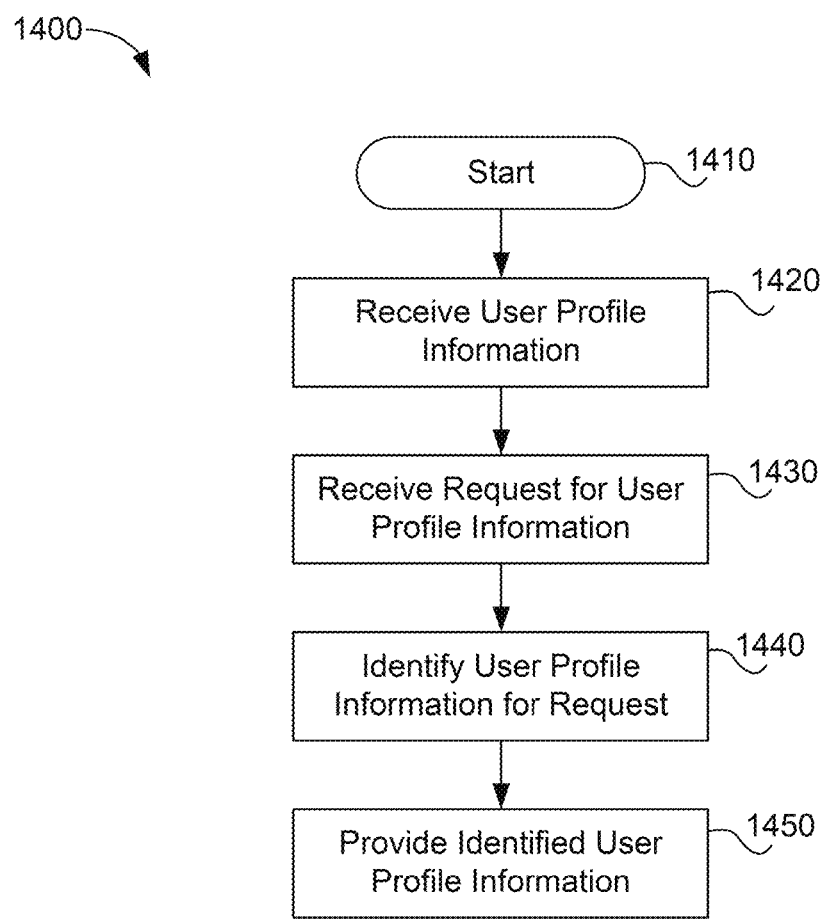
FIG. 14 is a flow diagram of one embodiment of a method for presenting a chronological user profile.

FIG. 14 is a flow diagram of one embodiment for presenting chronological user profile information. At step 1410, the method 1400 may start and be initialized as described above. At step 1420, user profile information may be received. The user profile information may comprise a plurality of user profile attributes, each attribute being associated with a respective timeframe.

At step 1420, the received user profile information, comprising the user profile attributes and respective timeframes may be stored in a datastore, such as a database, directory, or the like. Receiving user profile information may further comprise generating user profile information. For example, a user rating may be generated from a plurality of user-submitted ratings. The user rating may be associated with a respective timeframe (e.g., the user's contributor rating was 4/10 from Nov. 3, 2008, to Apr. 3, 2009).

At step 1430, a request for user profile information may be received. The request may specify a prevailing timeframe.

At step 1440, user profile information that "intersects" with the prevailing time may be identified. More than one attribute may intersect with the prevailing time. In some embodiments, the most recently edited (or "freshest") attribute may be selected. Alternatively, the different comparison metric may be used. For example, the attribute having the highest degree of overlap may be selected.

Step 1440 may comprise evaluating access controls associated with the user profile attributes. If the user requesting the user profile information is not allowed to access a particular attribute, an alternative attribute value may be selected (e.g., the next most recent attribute).

At step 1450, the user profile attributes may be returned to requester for display in an interface, such as the interface element 562 discussed below.

As discussed above, a user profile may comprise one or more profile photos representing a user (or other graphical representations). In some embodiments, the appearance of a user avatar may change in response to the user's disposition, preferences, and/or interests. A user may set his/her disposition manually (e.g., using a user profile authoring interface, such as the interface 1300 discussed above). Alternatively, or in addition, the user's disposition may be inferred by from the content submitted by the user. For example, the network-accessible service (e.g., website) may determine that the user is in a "happy" disposition when the user submits stories having a particular theme and/or associated with a particular set of descriptive tags (e.g., positive tags, such as "fun," "happy," "great," etc.). Comments and other user submissions may indicate the user's disposition. For example, if a significant proportion of content reviews submitted by the user are negative or contain negative language, the user may be identified as being "grumpy" or "sad."

Other user activities may be evaluated to identify user disposition. For example, the time-distribution of the user's contributions to the network-accessible service (e.g., website) may be indicative of whether the user is socially active (e.g., a drop off in user contributions may indicate that the user is becoming withdrawn, whereas an uptick may be a sign that the user is more socially active). The timeframe and/or location of submitted content may be similarly indicative of user disposition. For example, timeframe and/or location may indicate that the user is on vacation, partying a lot (many stories occurring during the late evening hours), or the like.

After determining the user's emotional disposition, the user profile avatar may be updated accordingly; a user identified as "happy" may be depicted with a user profile photo tagged with happy, or dynamically modified to appear happy (e.g., different background, colors, etc.). Similarly, modifications may be made to cause the user's avatar to appear "grumpy" or "sad." In some embodiments, a user profile may comprise a plurality of profile avatars, which, as discussed above, may each be associated with a respective timeframe. In addition, the profile avatars may be tagged with a disposition ("happy," "sad," "grumpy," etc.). Accordingly, modifying the appearance of the profile avatar may comprise selecting an appropriately tagged avatar.

In some embodiments, other users may comment on other users' disposition. For example, if a first user were to "flame" a second user in a comment or story, the second user may submit a report indicating the first user is "grumpy." Conversely, if the first user is polite in his/her comments to the second user, the second user may submit a report indicating that the first user is "friendly" or "happy." If multiple reports of similar dispositions for the first user are received (from different source), the first user may be identified as having the reported disposition.

Other user dispositions (aside from emotional state or attitude) may be determined from user-submitted content. For example, the user's current interests may be inferred; if the user submits a large number of sports-related stories, the user may be identified as a "soccer fan." The user's avatar may then be dynamically updated to indicate this status (e.g., the photo or avatar may include a soccer ball graphic, may be displayed on a soccer field, or the like). Other preferences, such as music preferences, artistic taste, travel affinity, or the like, may be similarly depicted.

Similarly, user profile attributes (and/or user modeling information, discussed below) may be used to dynamically modify the appearance of a user profile avatar, including an avatar that is a caricature. Examples of such attributes include height, weight, relationship status, marital status, musical and other preferences, activity, and so on.

Figure 15:
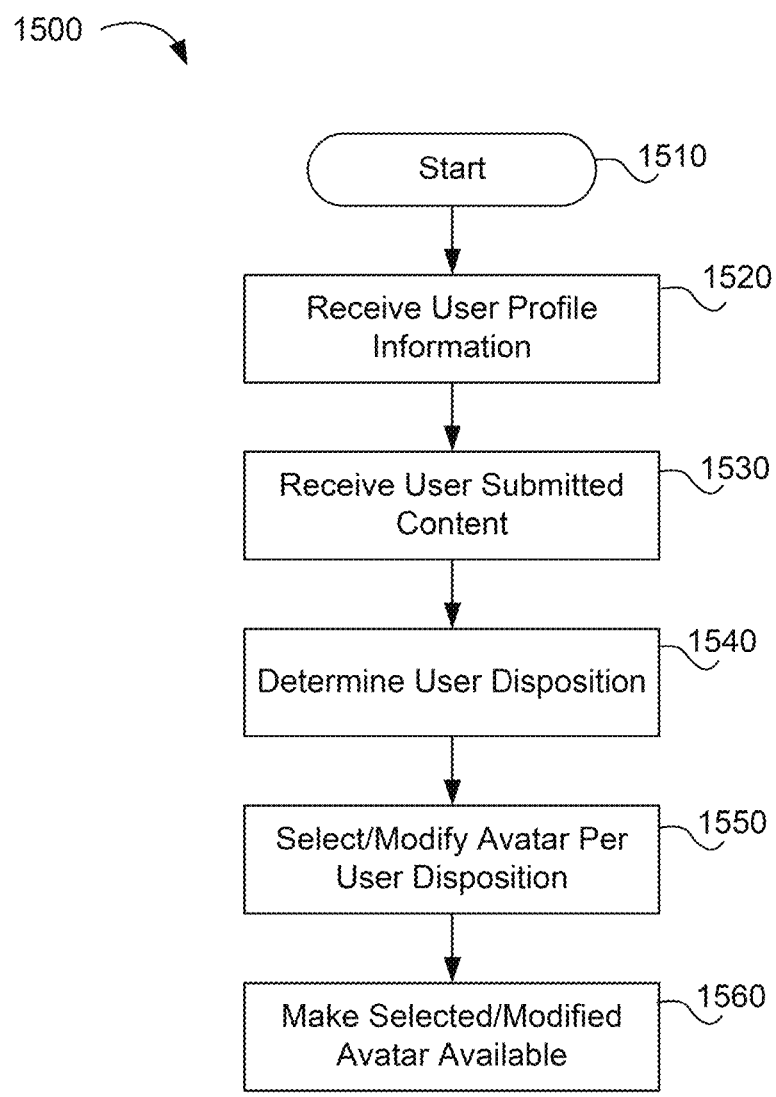
FIG. 15 is a flow diagram of one embodiment of a method for dynamically modifying the appearance of an avatar.

FIG. 15 is a flow diagram of one embodiment of a method for dynamically modifying the appearance of a user profile avatar.

At step 1510, the method 1500 may start and be initialized as described above. At step 1520, user profile information may be received, which as discussed above, may comprise one or more user avatars (or photos), each associated with a particular timeframe and/or tagged with a particular disposition. At step 1520, the avatars may be stored on a datastore in association with user profile information for the user.

At step 1530, user-submitted content may be received. The user-submitted content may comprise user-contributed stories, photographs, comments, tags, and the like. In some embodiments, step 1530 may comprise receiving an explicit disposition indicator from the user himself. Similarly, step 1530 may comprise receiving reports on the user's disposition from other users.

At step 1540, the content received at step 1530 may be evaluated to identify a user disposition. The user disposition may refer to an emotional state of the user and/or current user preferences or interests. The identified user disposition may be determined by combining inferences obtained from user-submitted content, user-indicator of his/her disposition, user profile and/or modeling information, and/or reports from other users. Each of these sources may be assigned a relative weight and combined to determine an overall user disposition.

Step 1540 may further comprise identifying user interest or preference dispositions. As discussed above, user interests and preferences may be identified by searching for commonly used descriptive tags and/or other content submitted by the user, such as user profile information, user modeling information, and the like.

At step 1550, a user avatar may be selected and/or modified to reflect the user disposition identified at step 1540. In some embodiments, an avatar may be selected from a plurality of avatars, each tagged with a particular disposition. If the user has a single avatar, the avatar may be modified to reflect the user disposition. The modifications may comprise modifying the color content of the avatar, modifying an appearance of the avatar (brightness, contrast, saturation, etc.) changing a background of the avatar, or the like.

Step 1550 may further comprise adding user interest and/or preference indicators to the avatar. These indicators may comprise overlays, labels, or other display elements included on or around the user's avatar. For example, if the user has shown an interest in travel to Paris, the avatar may include the Eiffel tower (or other prominent landmark) in the background. A user who has indicated an interest in a particular sport or activity may be depicted with an associated item (e.g., a soccer ball, boat, paintbrush, hiking boots, or the like). The user avatar may be modified account to any number of different user dispositions, interests, and/or properties. For example, if the user has recently lost weight (as indicated by his/her user profile), the avatar may be "thinned." If the user is married, the avatar may be shown with a wedding band, if the user has identified a favorite movie, the avatar may be updated with assets from the movie, and so on. Changing the prevailing timeframe has the potential to change the configuration and attributes of the avatar, reflecting the evolving condition of the user being represented.

At step 1560, the avatar selected and/or modified at step 1550 may be made available to other users of the network-accessible service (e.g., website). The avatar may be made available in a user profile display element (e.g., display element 562 of FIG. 5B), in an "about me" page provided by the website, or the like.

As discussed above, access controls may be applied to user-submitted content to control which users are able to access the content. Access controls may be specified with respect to one or more user-defined circles. A circle may comprise a set of one or more users with which the user has a particular relationship. A "family" circle may comprise the user's family members in the user community of the network-accessible service (e.g., website), a "friends" circle may comprise the user's friends, a "co-workers" circle may comprise the user's co-workers, a "Facebook Friends" circle may comprise a user's "friends" on FACEBOOK®, and so on. Alternatively, or in addition, a circle may be associated with people who are invited to view a story or a storyline, the invitation taking any number of forms, those forms including a link to the story or storyline that confers temporary or permanent membership in a circle or rights equivalent or nearly equivalent to membership, and so on. Any number of different circles defining any number of different levels of trust and/or relationships may be defined. In some embodiments, a user may be added to two or more circles (e.g., a co-worker may also be a friend). A user may change circle membership at any time.

Access controls may be applied to any type of content submitted by a contributor including, but not limited to: story content, story metadata, user comments, user profile information, and the like. In some embodiments, access controls may be applied chronologically. For example, a user may be a "friend" for a pre-determined timeframe (e.g., from Dec. 2, 1998, to Jan. 4, 2004); the user may have access to "friend" content that falls within the "friend timeframe." The user may not be allowed to access content marked for access by "friends" that falls outside of the friend timeframe (or extends before or after the friend timeframe).

In some embodiments, access controls may be applied chronologically; such that a particular set of access controls may apply to all user-submitted content pertaining to a particular timeframe. Some users may not want certain periods of their life to be revealed to the public. For example, a high-school student may want to hide their embarrassing elementary school years from view; a partner in a second marriage may want to make private the years of the first marriage (and their status during that time). A college student-job seeker may want to obscure all but their current life activities, and so on. An access control policy of this type may apply the same set of access controls to user-submitted content pertaining to a specified (e.g., Jan. 1, 1976 to Jun. 30, 1980). In some embodiments, these chronological access controls may be set as "defaults" on individual stories, which the contributor may selectively modify on an item-by-item basis. Alternatively, the chronological access control may be implemented as an additional access control "layer," which may be applied in addition to other access controls.

As discussed above, aliases may be used to control access to personal or private information. Locations may be protected by an alias; the user's home address may be assigned an alias of "home." Timeframes may be similarly aliased; the user's high school graduation date may be aliased as "graduation" or "senior year." Similarly, the contributor's name (e.g., user name) may assigned an alias. In some embodiments, an alias may be tied an underlying piece of "actual" data. For example, the "home address" alias may be tied to the actual location of the user's home; the "graduation" alias may be tied to the user's actual graduation date, and so on. Alternatively, in embodiments where the user may never want the "actual" information to be released, an alias may not be associated with any actual data.

The user may determine which users (if any) should have access to the data using the "circle-based" access controls discussed above. For example, the user may specify that only members of the "family" circle may access his actual name, his home address, a particular photo or photos, the tags of a photo or story, the caption of a photo or certain text of a story, and so on. Access controls on items (story) and/or item metadata may determine whether other user may access user-submitted content. Of course, if a contributor has marked a story as "family" only, a user who is not in the family circle may not be able to access it. However, if a user has marked a story as "public," but has used an alias to specify the story location (which is only available to those in the contributor's family circle), a public user may not be able to "find" the story by location (or view the location of the story if/when the public user finds the story in a different way). Similar access controls may be used to limit browsing based on contributor name (when a contributor alias is used), timeframe, and so on.

Figure 16A:
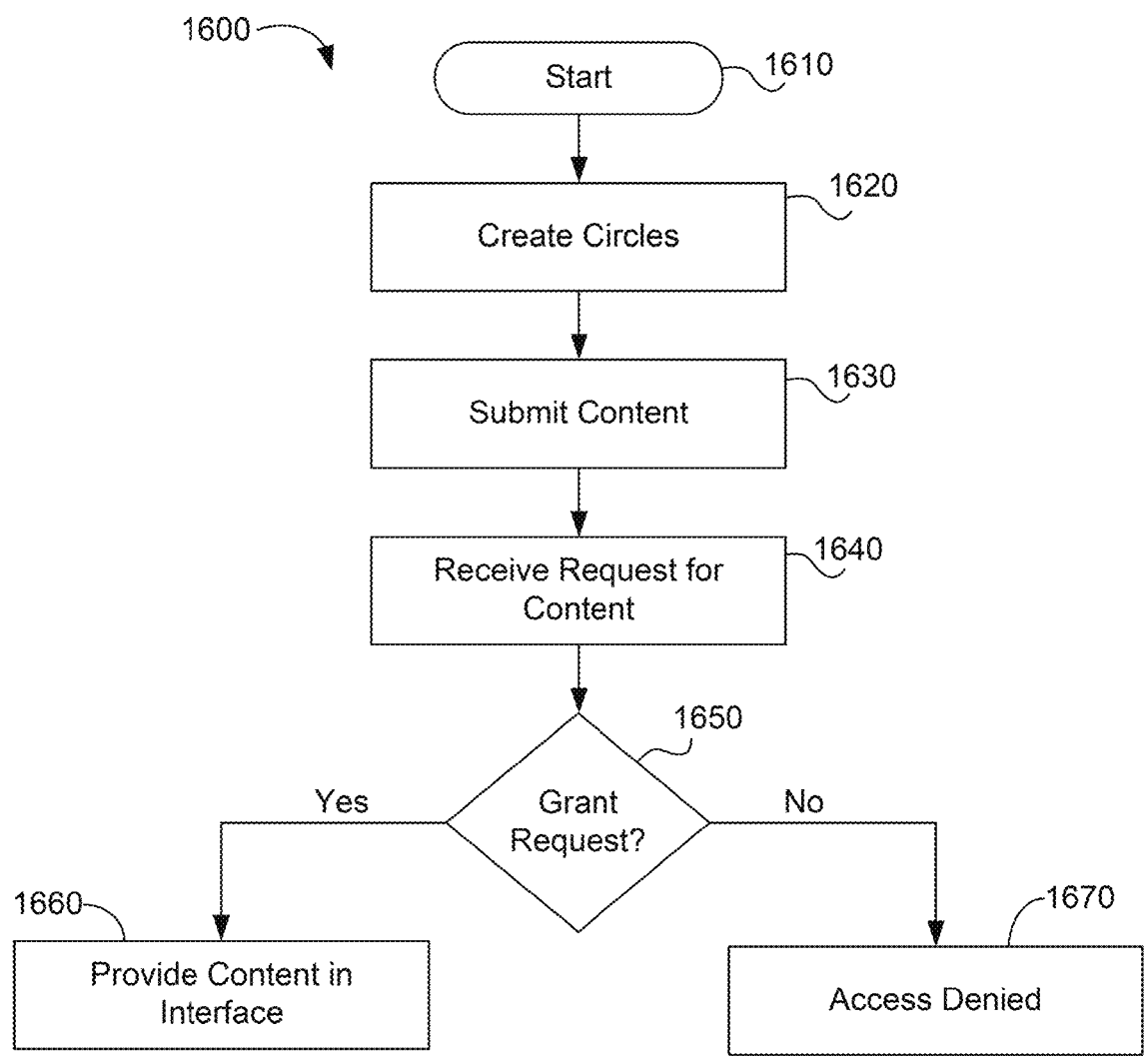
FIGS. 16A and 16B are flow diagrams of exemplary methods for controlling access to content using user-defined access controls.

FIG. 16A is a flow diagram of one embodiment of a method 1600 for controlling access to user-contributed content. At step 1610, the method 1600 may start and be initialized as described above.

At step 1620, a contributor may create one or more circles; each circle may comprise one or more users. A circle user may be another user of the network-accessible service (e.g., website). Alternatively, a user may be a "semblance" (discussed below) identified by a name, distinguished name, email address, alias or the like. A semblance may refer to a user that is not yet a member of the network-accessible service (e.g., website); therefore, when the user joins (using the specified distinguished name, or other relatable information), the user may automatically be added to the specified circle. In some embodiments, adding a user to a circle who is not yet a member of the website (has not registered an account) may cause an invitation message to be sent to the user (e.g., "Joe has added you to his circle, register to see what he has to say"). Step 1620 may comprise storing the circles (and indications of the users therein) in a datastore, such as a database, directory, or the like.

In some embodiments, step 1620 may comprise establishing one or more aliases. As described above, an alias may be a user-defined term that may be linked a particular data item. The user may specify any number of aliases corresponding to any number of data items including, but not limited to: a timeframe, a location, a name, a profile attribute (e.g., photograph, marital status, etc.), metadata, or the like.

Although circle and alias creation is depicted as a step 1620, a user may be able to create, edit, and/or remove circles and/or aliases at any time. Therefore, the disclosure should not be read as limited to a particular ordering and/or timeframe for circle and/or alias creation.

At step 1630, the contributor may submit content to be made available on the network-accessible service (e.g., website). The content may comprise a content item, such as a photograph, text, video, a story (collection of items), or the like. The content may further comprise descriptive, intersection metadata, such as a timeframe, location, descriptive tags, participant indicators, a rating, or the like. In some embodiments, a content item may be associated with an alias. An alias may comprise data that is to be publically available (the alias) and data that is to be made available to certain permitted users (the data underlying the alias). As will be discussed below, the permitted users may be identified by circle membership.

The content (or portions thereof) received at step 1630 may be associated with respective access controls. In some embodiments, content item access control may be expressed permissively (e.g., allow circles A, B, and C to access this content). Alternatively, content item access control may be expressed exclusively (e.g., allow the content to be accessed by all users except the following circles or groups). Content item access control may be permitted to people who click on a link, or to people who can be authenticated as having a certain status on a social media site, such as being a FACEBOOK® friend or a TWITTER® follower. Access controls may be used to specify how certain portions of the content are displayed. For example, the access control of a location alias may indicate the true location is only shown to users in the contributor's family circle, all other users see only the alias value (e.g., "Joe's house.").

At step 1640, a request for content submitted by the contributor may be received. The request may be received from a particular user, or may be received anonymously (from an unregistered user). The request may reference a single content item or a collection of content items (e.g., a story).

At step 1650, the method 1600 may determine whether the request can be granted (or which portions of the request may be granted). Access may be determined by comparing the access controls associated with the item(s) to the user. For example, if a requested content item is marked as being available only those in the contributor's "family" circle, the contributor's family circle may be queried to determine whether the requesting user is a member. If not, the request may be denied and the flow may continue to step 1670; otherwise, the flow may continue to step 1660. If a collection of content items is requested, access controls of each item may be evaluated, and the user may be permitted access only to the items the user is allowed to see.

Step 1650 may further comprise determining which "version" of a content item the requester is allowed to access. For example, one or more of the requested items may be associated with an alias. The determination of step 1650 may comprise determining whether the user should have access to the "alias" version or the actual value of the item(s).

At step 1660, the content items the requesting user is permitted to access may be presented in an interface. At step 1670, the user may be informed that he/she is not authorized to access the requested content items.

Figure 16B:
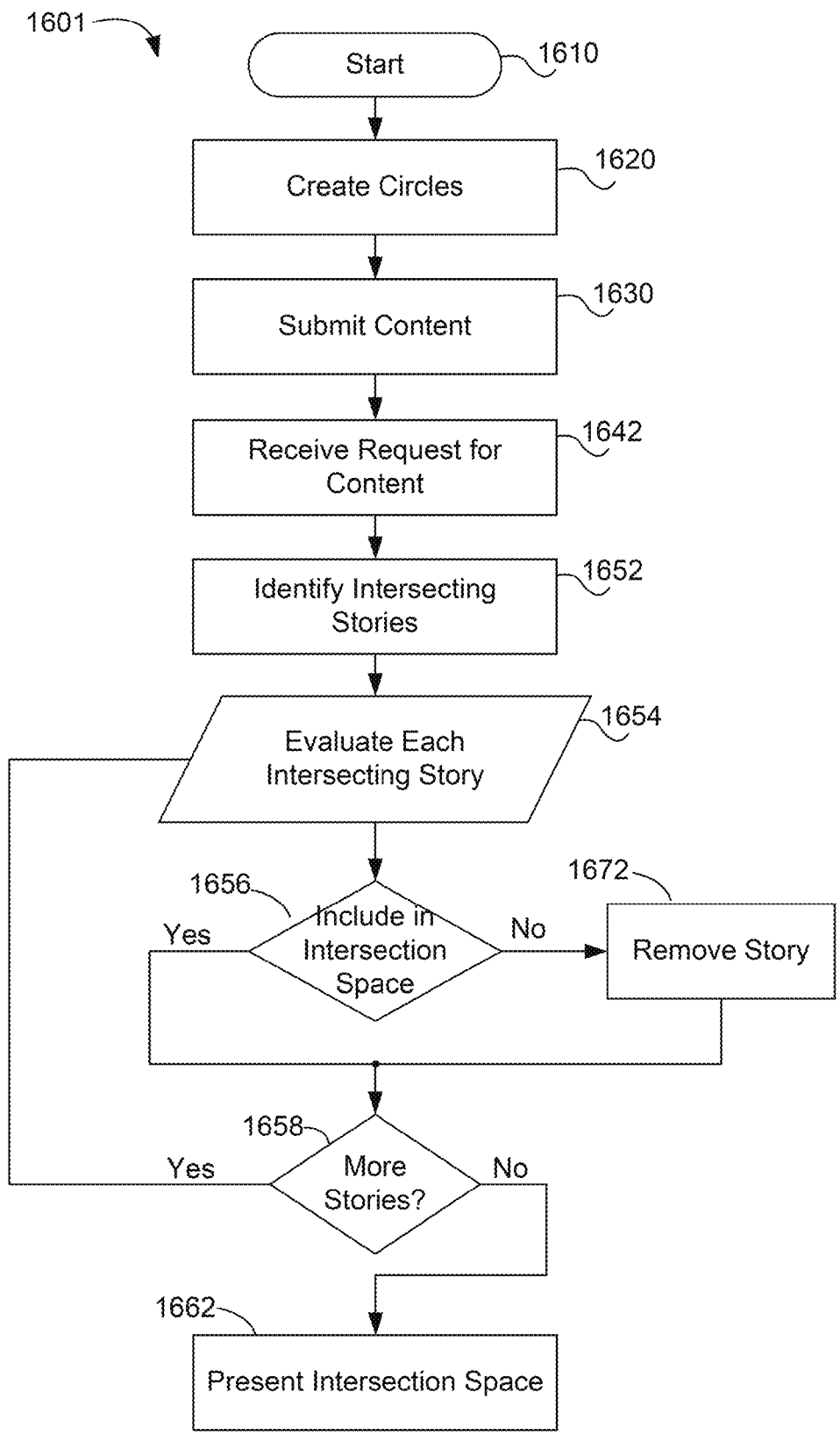

FIG. 16B is a flow diagram of a method 1601 for providing an intersection space comprising items having respective access controls.

At steps 1610, 1620, 1630, the method 1601 may start and be initialized, a contributor may create one or more circles and/or aliases, and user-submitted content may be received at the network-accessible service (e.g., website), as described above.

At step 1642, a request for an intersection set of intersecting stories may be received (e.g., a request for an intersection space). The request may comprise intersection criteria, such as a prevailing timeframe, location, or the like. The request may be received responsive to user interaction with an interface, such as the interfaces 500 and/or 503 if FIGS. 5A and 5B.

At step 1652, a set of intersecting stories may be identified using the intersection criteria.

At step 1654, the method 1601 may iterate over each of the stories identified at step 1652 to determine whether the story should appear in the intersection space.

At step 1656, one of the stories may be examined to determine whether it should be included in the intersection space. The determination may be based upon story access controls as described above. The determination may also be based upon the visibility of story metadata. For example, if story was identified using timeframe, location, contributor, or other metadata for which the contributor has specified an alias, and the requesting user does not have access to the actual value of the alias, the story may be excluded from the intersection space. If the story was identified using other metadata to which the user has access, the story may be included in the intersection space. If the story is to be removed from the intersection space, the flow may continue to step 1672 where the story may be removed from the intersection space; otherwise, the flow may continue to step 1658.

At step 1658, the method 1600 may determine whether there are additional intersection stories to evaluate. If so, the flow may return to step 1656, where a next story in the intersection space may be evaluated to determine whether it should removed.

At step 1662, the stories remaining in the intersection space may be presented to the user in an interface. Step 1662 may comprise selecting appropriate alias values for each of the remaining stories. The alias values may be selected using circle-based access controls as described above.

As discussed above, in some embodiments, a user may borrow a story of another user. In some embodiments, when a story is borrowed the original contributor maintains control over its content and who can see a story or a link or other reference to a story. In these cases, borrowing a story causes the story to be available in a storyline only for those people who have permission to see it (such as people in a specific circle or circles). In other embodiments, when a story is borrowed, the borrowing user may apply his/her own set of access controls thereto. Accordingly, the borrowing user may share a story more broadly than the original contributor. As discussed above, multi-tiered access control may allow content to be shared through a "community connector." A community connector may be a user who has a particular relationship with a disparate group of people. One example of a community connector is a youth soccer coach. Each of the parents may have a relationship with the coach, but may not necessarily have relationship with one another. The parents may want to share content related to the soccer team, but may not want to share it publically. In this case, the parents may each share their soccer-related stories with the coach who, in turn, may borrow the stories and set appropriate access controls to share the stories with the other parents, whom the coach has added to a "team" circle.

In some embodiments, however, the ability of a story borrower to further disseminate a story may be limited. For example, the contributor may publish the story to only his "family" circle, but someone in his family circle may publish the story publically, against the contributor's wishes. The original story contributor may prevent a story from being disseminated too broadly using aliases as described above. When borrowed, the contributor's originally applied alias access controls may remain with the story. Therefore, even when shared publically, users outside of the family circle may not have access to story metadata. In this way, other users may be kept from "stumbling upon" the story. Moreover, the use of aliases may hide sensitive or private information in the story from anyone outside of the contributor's family circle. Therefore, even through the story is available to the public, it may be difficult to find and may not expose sensitive information about the contributor.

In some embodiments, the original contributor may limit how a borrowed story may be shared. For example, the contributor may specify that a story may be borrowed, but cannot be shared beyond the original circle. In this way, the users who "borrow" the story in effect "import" the family circle of the original contributor. Alternatively, or in addition, the original contributor may be given the right to apply "exclusive" access controls to the story. As discussed above, exclusive access controls may be used to specify users who may not access certain content. The exclusive access controls may stay with a story and may limit how other users can share it when borrowed. For example, the borrower's permissions may be applied along with the original contributor's exclusive rules, such that even if the borrower allows the story to be published publically, it will be prevented from being disseminated to users in the "exclude" directive (which may comprise a "public" identifier excluding all users).

The methods 1600 and 1601 may be adapted for use with "borrowed" content. In the case of step 1650 of method 1600, the determination of whether to grant a user access to content may be based upon access controls applied by the borrower, and not the original contributor. However, when the item is provided to the requester, the selection of which version of an "alias" item may be predicated on the alias access controls of the original contributor (not the borrower, who may be unable to change the access controls associated with borrowed aliases).

The method 1601 may be similarly modified. The determination of step 1656 may be predicated upon whether the user has access to the story according to the access controls provided by the borrower. However, availability of the metadata used to identify the story in the intersection space (e.g., the timeframe, location, contributor, or the like) may be determined according to the alias access controls set by the original story contributor. Similarly, when a story is presented to the user, the selection of which version of an alias item is to be displayed may be determined by the access controls set by the original story contributors. In embodiments in which the original contributor retains control over how his content is shared by borrowers, methods 1600 and/or 1601 may be similarly modified (the determination steps 1650, 1660, 1656, and/or 1662 may be based on access control restrictions set by the original contributor). In some embodiments, the borrower of a story may augment it by commenting on why they borrowed it or by adding new or substitute metadata. For example, if the original contributor of a story on a concert listed certain friends as participants in the story, a borrower might add new or substitute participants to reflect their experience at the concert.

As discussed above, a contributor may "tag" other users of the network-accessible service (e.g., website) as participants in a story. When a user is tagged as a participant, the story may appear in a list of stories pertaining to the user (e.g., may appear in the user's life page). A user may "borrow" the story which, as described above, may make the story available to those within the borrowing user's circles (or available publically).

In some cases, however, a user may wish to be "untagged" from a story (the user may not want to appear as a story participant). In some cases, requests to remove participants from a story may be automatically granted. In some embodiments, the determination of whether to automatically grant participation removal may be based on the story type. A user may not have the right to be removed from certain stories (such as news stories) without cause. However, to mitigate this, users identified as story participants may be given the right to comment on a story.

In some embodiments, a user may modify the way he/she is identified as a story participant. For example, a user may request to be identified in the story using an alias. When so identified, only the certain permitted users may be able to see the user's true identity. The access control directives (e.g., circles) controlling access to the participant alias may be determined by the participant, and not the story contributor. As above, however, in certain stories users identified as participants may not be allowed to be referenced by alias without cause.

Figure 17:
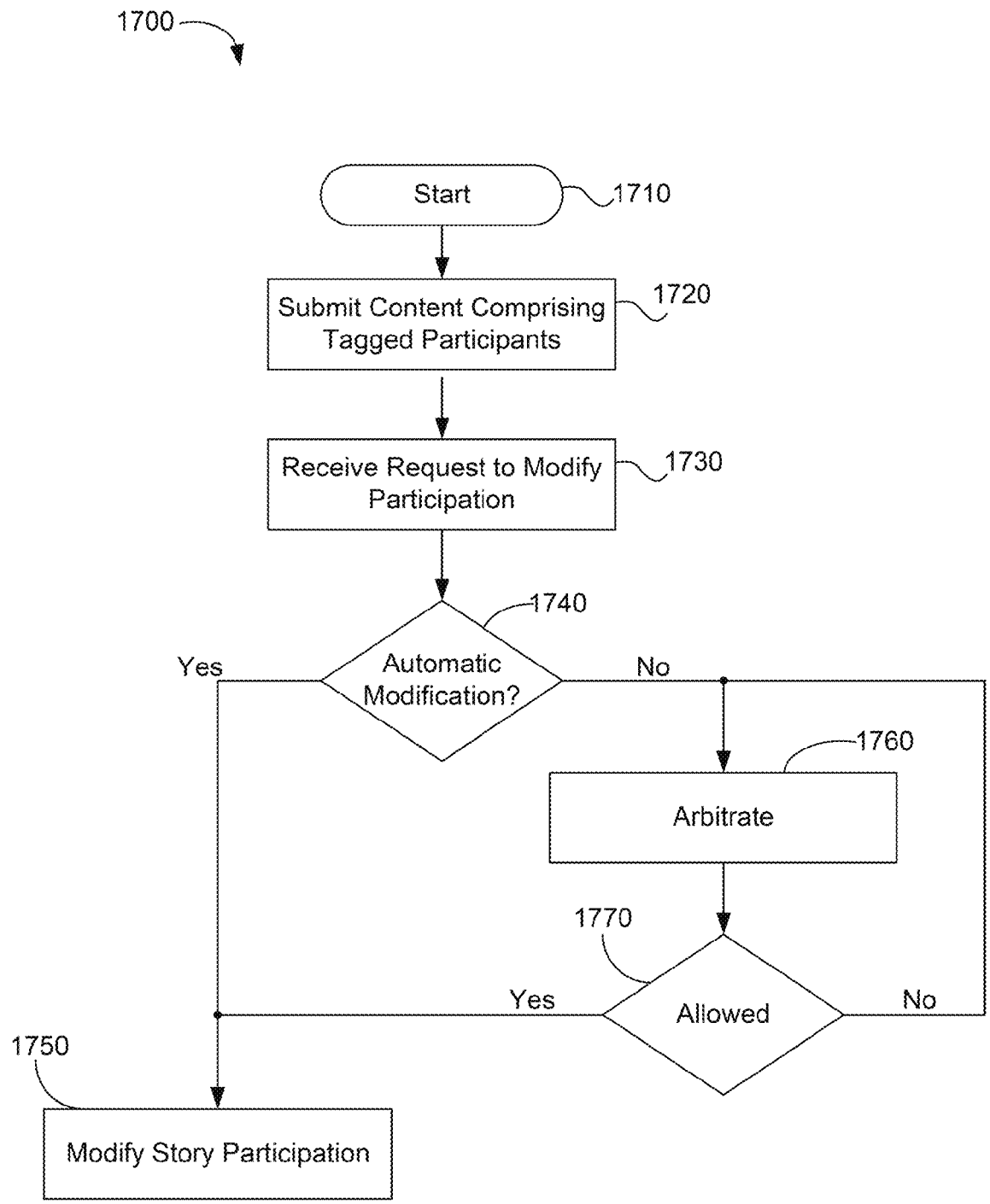
FIG. 17 is a flow diagram of one embodiment of a method for modifying story participants.

FIG. 17 is a flow diagram of one embodiment of a method 1700 for managing story participants. At step 1710, the method 1700 may start and be initialized as described above.

At step 1720, user-submitted content may be received at the network-accessible service (e.g., website). The content may comprise a story (contributed and/or authored using an interface such as interface 100 of FIG. 1A. The content may comprise metadata, including metadata identifying one or more story participants. The story participants may be identified using a user profile identifier, a distinguished name, or any other identifying information. In some embodiments, the network-accessible service (e.g., website) may provide an interface to facilitate the identification of other users (e.g., a user directory).

Step 1720 may further comprise storing the content in a datastore of the network-accessible service (e.g., website) and making the content available to other users via one or more presentation interfaces. In some embodiments, step 1720 may comprise notifying the participants that a story, in which they are identified, is available on the network-accessible service (e.g., website). The notification may be made via an email message, user profile message, displayed in the user's "My Life" interface, or the like.

In some embodiments, users identified as story participants may be given the "right to comment," on the story. The notification discussed above, may inform the users of this right and provide a link to access and/or comment on the story. Since the story participants have a right to comment, the original story contributor may not be able add, remove, or edit the story comments submitted by the participants. In addition, a comment section of the story may prominently display participant comments to prevent these comments from being "drowned out" by other comments.

At step 1730, a request to remove a user as a story participant or modify how the user is identified in the story (e.g., replace the user's name with an alias).

At step 1740, the method 1700 may determine whether the user's participant status may be automatically modified. The determination may be based upon the story type. If the story is a "news" story, then users may not be automatically removed. The determination may further comprise evaluating a reputation metric associated with the contributor. As will be discussed below, the results of participant arbitration may be stored in association with a contributor. If the contributor has shown a history of erroneously or maliciously tagging story participants, the user's request may be automatically granted even if the story is tagged as "news" (or as another news-type story). Similarly, a reputation metric associated with the participant may be evaluated. If the participant has repeatedly attempted (and failed) to have himself/herself removed from news stories, the reputation metric of the contributor may be less likely to provide for automatic removal. If the user can be automatically removed, the flow may continue to step 1750; otherwise, the flow may continue to step 1760.

At step 1750, the user's participation status may be modified per the request of step 1730. Modifying participation status may comprise removing the user as a story participant or using an alias to represent the user. In some embodiments, removal as a story participant may cause any story comments submitted by the user to be removed (or displayed less prominently, just as other story comments).

Step 1750 may comprise recording the removal in a datastore, such that subsequent views of the story may omit the participant. The datastore may be updated to prevent the contributor from re-adding the user as a story participant without the user's express permission.

At step 1760, the user may be informed that the request to be removed as a story participant could not be automatically granted. The user may be informed of the reason (e.g., the story is news) and may be notified of the right to comment on the story. In some embodiments, the user may be linked to a participant arbitration process in which the user may present evidence that he/she should not be included in the story. The evidence may be used to indicate that the user was not actually at the events described in the story. For example, the user may submit a picture to show that he/she was misidentified in a story photo (e.g., the user is not the person depicted in a particular tagged photo). Alternatively, or in addition, the user may present evidence that the contributor misidentified the user by mistake or to harass the user. The story contributor may be allowed to provide information in support of the user remaining as a story participant.

At step 1770, the method 1700 may determine whether to grant the request given the information received at step 1760. The determination may be made automatically. For example, image processing software may determine that the user is likely not the same person as the participant tagged in a story photo. Similarly, the method may determine that the user was probably not involved in the story events using other information (e.g., another story submitted by another user or the user himself), or that the story cannot reasonably be construed as "news." The determination of step 1770 may require the intervention of another user (an arbiter). The arbiter may be selected or randomly selected from the users of the network-accessible service (e.g., website user community), or may be a staff member. In some embodiments, the arbitration of step 1770 may comprise comparing a reputation metric of the user to the reputation metric of the contributor. Although the comparison may not be definitive, the relative reputation metrics may be used to weight the arbitration process to one side or the other.

If the arbitration step 1770 determines that the user's participation status may be modified, the flow may continue to step 1750. If not, the flow may return to step 1770, where the user may continue to attempt arbitration, or appeal directly to the contributor. Similarly, if after arbitration, the user is removed as a participant, the contributor may attempt to re-add the user through an arbitration process (e.g., the user may be removed, but the flow may return to step 1760 to determine whether the user can be re-added).

The results of the participant arbitration may be stored in a datastore and/or associated with a user profile of the user and/or the contributor. If the method 1700 determined that the user was actually a participant and/or that the request was superfluous, the user's reputation metric may be decremented. Similarly, if the contributor falsely claimed that the story was news or it is determined that the user was misidentified (unintentionally or otherwise), the contributor's reputation metric may be decremented. Conversely, if the user and/or contributor provided valid information in good faith and in a timely manner, their respective reputation metrics may be incremented, regardless of the outcome of the arbitration step 1770.

In some embodiments, if a contributor's reputation metric reaches a low threshold, the user may be prevented from tagging users in his/her stories. Repeated abuses may result in the contributor being banned from the network-accessible service (e.g., website).

The stories (and related metadata) submitted to the network-accessible service (e.g., website) by a contributor may be indicative of the contributor's life experiences, interests, preferences, and the like. In some embodiments, user-submitted content may be used develop a "user model" of the contributor. Unlike the user profile discussed above, which is primarily provided by the contributor himself, a user model may be determined (or inferred) from the content submitted by the contributor. Accordingly, as used herein a "user model," may refer to a set of one or more user interests, preferences, and other contributor-descriptive information determined from content submitted by the contributor. In some embodiments, a user model may comprise one or more "personality classifications" or "tags" describing the contributor (e.g., the contributor is a "traveler," an "art lover," etc.).

Figure 18:
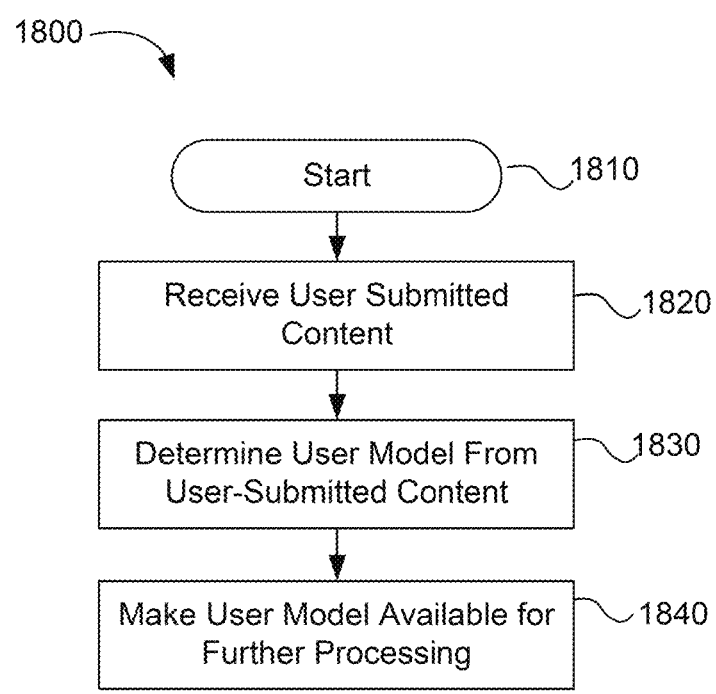
FIG. 18 is a flow diagram of one embodiment of a method for developing a user model from user-submitted content.

FIG. 18 is a flow diagram of one embodiment of a method 1800 for developing a user model from user-contributed content. At step 1810, the method may start and be initialized as described above.

At step 1820, content submitted by the contributor may be received at the network-accessible service (e.g., website). As discussed above, a contributor may submit various different types of content including, but not limited to: user-submitted content items (e.g., text, photographs, video, stories, etc), intersection metadata (e.g., timeframe, location, descriptive tags, participants, interested person(s), circle membership, etc), commentary, ratings, and the like. Similarly, the contributor's activity on the network-accessible service (e.g., website) may be considered user-submitted content. For example, searches submitted by the user may be indicative of a user's interests; as may be the contributor's browsing activity.

At step 1830, the user-submitted content may be evaluated to develop a user model. Step 1830 may comprise identifying common themes in the user-submissions, such as commonly used descriptive tags, common story locations, or the like. The evaluation may further comprise identifying user "habits," by identifying repeating stories. For instance, the contributor may have lunch with a friend at a particular restaurant once a month, which may indicate that the contributor values long-term relationships (and enjoys the type of food served at the restaurant). The timeframe distribution of user submissions may indicate when the user is most active; the user may be identified as a "summer person" if a majority of his/her contributions are in the summer months. Stories related to particular locations may indicate that the user enjoys certain types of activities (e.g., stories about skiing, trips to the theater, climbing, etc.).

Less formal user-submissions, such as commentary, ratings, and the like may be leveraged to form a user model. Positive comments and/or reviews on certain stories may indicate that the user has an interest in the story topic even if the contributor has not yet written about the topic. For instance, the contributor may provide positive commentary and ratings of stories pertaining to mountaineering which, although the contributor has never tried himself, may be of interest to the contributor. Similarly, user browsing or search activity may be used to model the user. For instance, searches for particular topics, timeframes, and/or locations may be used to identify user interests or affinities.

At step 1840, the user modeling information identified at step 1830 may be stored on a datastore and made available for further processing, such as user recommendations, user affinities (discussed below), and the like. For example, if the user model indicates that the contributor has an interest in a particular topic or location, stories on the topic or location may be recommended to him.

In some embodiments, the further processing of step 1840 may comprise displaying modeling information to the user (or another interested user). For example, and as discussed above, a user profile avatar may be updated responsive to user modeling information. Modeling information may be used to show various different summaries of user activity. For example, a map may be populated with the locations that the contributor visited within a particular timeframe (e.g., using a timeframe control, such as the controls 510 and/or 1100 disclosed above, or another timeframe input). Other displays for presenting user modeling information may include contributor timeframe densities (showing the density of user-submitted content by time), contributor rating over time, contributor disposition over time, prevailing descriptive tags (e.g., as in a dynamic tag element, such as the elements 548 discussed above), and so on. As could be appreciated by one of skill in the art, the teachings of this disclosure could be adapted to present user modeling information in any number of different ways using any number of different display elements; therefore, the disclosure should not be read as limited in this regard.

In some embodiments, user-submitted content may be used to identify user affinities. User affinities may be identified by comparing user profile and/or user modeling information of two or more users. Affinity identification may further comprise comparing the content submitted by two or more user-contributors. Stories submitted about the same locations, timeframes, or topics may be used to identify specific shared-experiences (or similar life events, even if they took place at different places and/or times). For example, both users may have both lived in the same town growing up, may have graduated from the same university (in the same year, or at different times), both may have lost a parent when they were young (even though the loss occurred at different times and/or at different locations), and so on.

Accordingly, identifying user affinities may include, but is not limited to: comparing user profile information, comparing user modeling information, comparing user-submitted content, and the like. Each type of comparison may identify a different set of user affinities: user profile comparisons may identify affinities in the ways that the users describe themselves; user model comparisons may identify affinities inferred from the content submitted by the users; and the user-submitted content may be used to identify shared experiences between the users.

User affinities may be identified responsive to a request from one or more users. For example a first user may query the network-accessible service (e.g., website) to identify his/her affinities with another specific user (e.g., show me what I have in common with "Joe Jackson"). Alternatively, an affinity query may be more open ended (e.g., show me the users with whom I have the most in common).

Figure 19A:
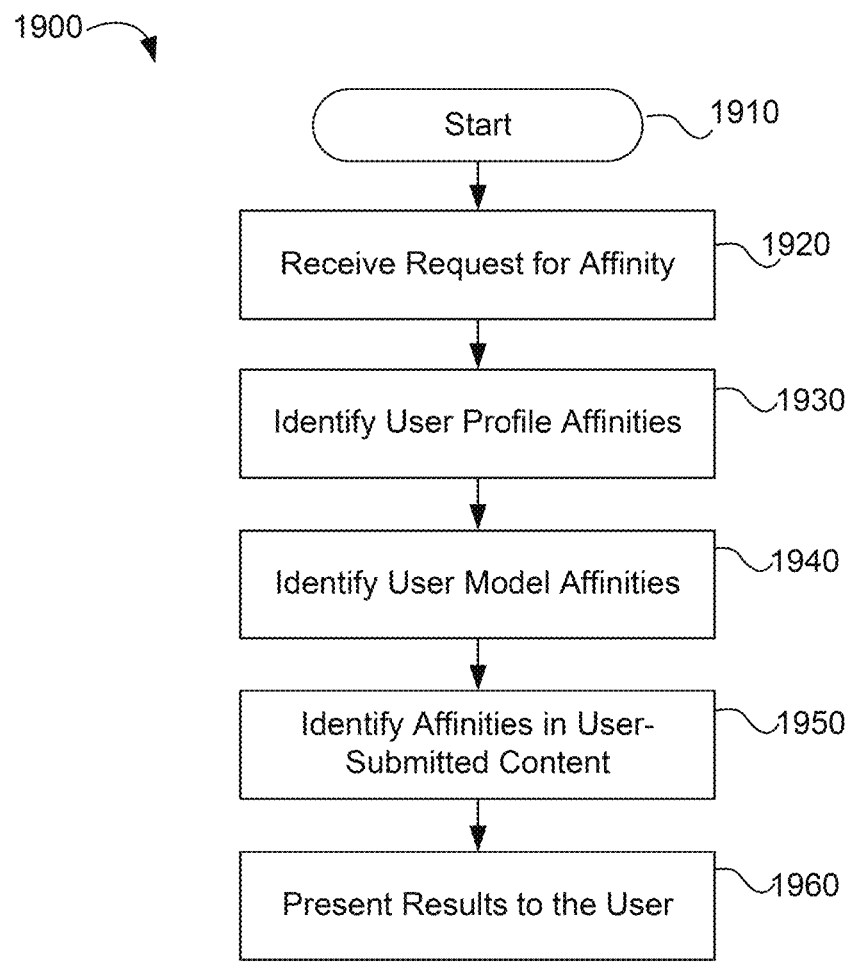
FIG. 19A is a flow diagram of one embodiment of a method for identifying affinities between users.

FIG. 19A is a flow diagram of one embodiment of a method 1900 for identifying user affinities using user-submitted content and/or the metadata associated therewith. At step 1910, the method may start and be initialized as described above.

At step 1920, an affinity query may be received. The query may be received from a user who has submitted content to the network-accessible service (e.g., website). The query may specify a particular user as a target of the query (e.g., what do I have in common with user X).

At step 1930, user profile information may be compared. The comparison may comprise identifying similarities (affinities) in the user profiles. For example, the comparison may determine whether the users share the same taste in music, are of a similar age (if the age information of user X is available to the requester), and so on. In addition, a user profile comparison may compare the circle membership of the users. The circle comparison may be used to identify shared friends, or more "distant" relationships (e.g., you are a friend of a friend of user X, or your friend is in X's family circle).

As discussed above, user profiles under the teachings of this disclosure may comprise chronological user profile information, in which different attributes may be tied to different respective timeframes. Accordingly, the comparison at step 1930 may comprise a chronological comparison to compare the users over time. For example, it may be determined that both users liked the same band during high school. This shared preference may be identified as a musical affinity despite the fact that the musical preferences of the users has diverged over time.

At step 1940, user modeling information of the users may be compared. As discussed above, user modeling information may be determined (or inferred) from the content submitted by the users. Accordingly, the comparison may identify shared preferences that the users have not yet identified in themselves. Step 1940 may further comprise comparing a disposition of the users (discussed above in conjunction with FIG. 15).

At step 1950, the content submitted by the users may be compared. The comparison may comprise identifying shared experiences between the users (e.g., a trip to the same locations at similar or different times). Shared experiences (stories) may be identified using the metadata associated therewith. Shared experiences may be identified by comparing story location metadata (the stories occurred in the same place), comparing story timeframe (stories occurred at the same time), involved some shared participant(s), shared interested person(s), described using similar tags, or any other story content or metadata. The comparison of user-submitted content may further comprise comparing commentary and/or ratings submitted by the users.

Access to other users' stories (or user profile information discussed above) may be limited by access controls, such as circle membership. Therefore, in some embodiments, some affinities may not be identified if the requesting user does not have access to the other users' stories, profile information, or metadata aliases. Alternatively, the comparison may identify the affinity, but may hide the underlying information from the user (the user may be informed of a "location affinity," but may not be told what that affinity is).

At step 1960, the results of the affinity comparison may be provided to requester. The results may be presented in an interface for display to the user in a browser or other application. As described above, step 1960 may comprise any number of different displays and/or presentation types to display any number of different user affinities. For example, the affinity comparison may comprise a map showing the locations in common between the two users. The locations in common may be identified even if the users were not there at the same or similar timeframes (e.g., user 1 visited Prague in 2003 and user 2 visited in 2008); the location "intersection" may still represent a user affinity. Other displays, such as the prevalence of particular descriptive tags, story types, and so on, may be displayed. The timeframes of affinities may be displayed, in some embodiments. Two people may be fans of the Beatles, but their enthusiasms may have started and/or ended on different dates and been of different durations. The age at which a user acquired or lost an affinity may also be compared, indicating, for example, that one person was a fan of Harry Potter books from age 5 to 12, while another was a fan from ages 33-35. These affinities can be compared and contrasted for two or more people; indeed, all of the people who are public fans of Harry Potter might be able to see how their ages and dates compared to those of other fans.

Although FIG. 19 depicts identification of user affinities based on user profile, user modeling, and user-submitted content, in other embodiments only one or more of these comparisons may be made. For example, a user may only be interested in identifying shared experiences and, as such, only the comparison between user-submitted content may be made.

FIG. 19 describes the comparison of a user to another user; however, the method 1900 could be extended to compare a user to any number of other users. In some embodiments, the method 1900 could be used to identify users of the network-accessible service (e.g., website community users) with which a particular user shares the most in common (e.g., by comparing the user to other users, quantifying the number of affinities, and providing the top results).

Users with which a particular user shares a high-degree of affinity may be potential "friends" of the user (e.g., included in one or more circles of the user). In some embodiments, a user-affinity process may continually search for potential user affinities. If or when a high-degree of user-to-user affinity is identified, the identified users may be introduced to one another via a "private introduction." As will be described below, a private introduction may be configured to introduce users to one another without compromising the users' privacy.

As discussed above, users may protect the information submitted to the network-accessible service (e.g., website) using access controls, aliases, and the like. It may be difficult to identify user affinities using only public information. In some embodiments, both public and "access controlled" information may be used to identify user affinities, while maintaining the privacy of the access controlled information. Accordingly, user-to-user affinities may be identified without exposing any private user information.

In one embodiment, a user may be allowed to "opt-in" or "opt-out" of affinity matching. For instance, a user may not be interested in identifying affinities with other users (or being identified thereby). If a user opts-out of affinity matching, his/her protected data may not be used. If a user does not opt-out (or explicitly opts-in), private data may be used to identify potential user affinities. Alternatively, a user may be given the opportunity to completely opt-out of affinity matching (e.g., may indicate that they wish to be excluded from affinity matching, even if it involves only public information).

Figure 19B:
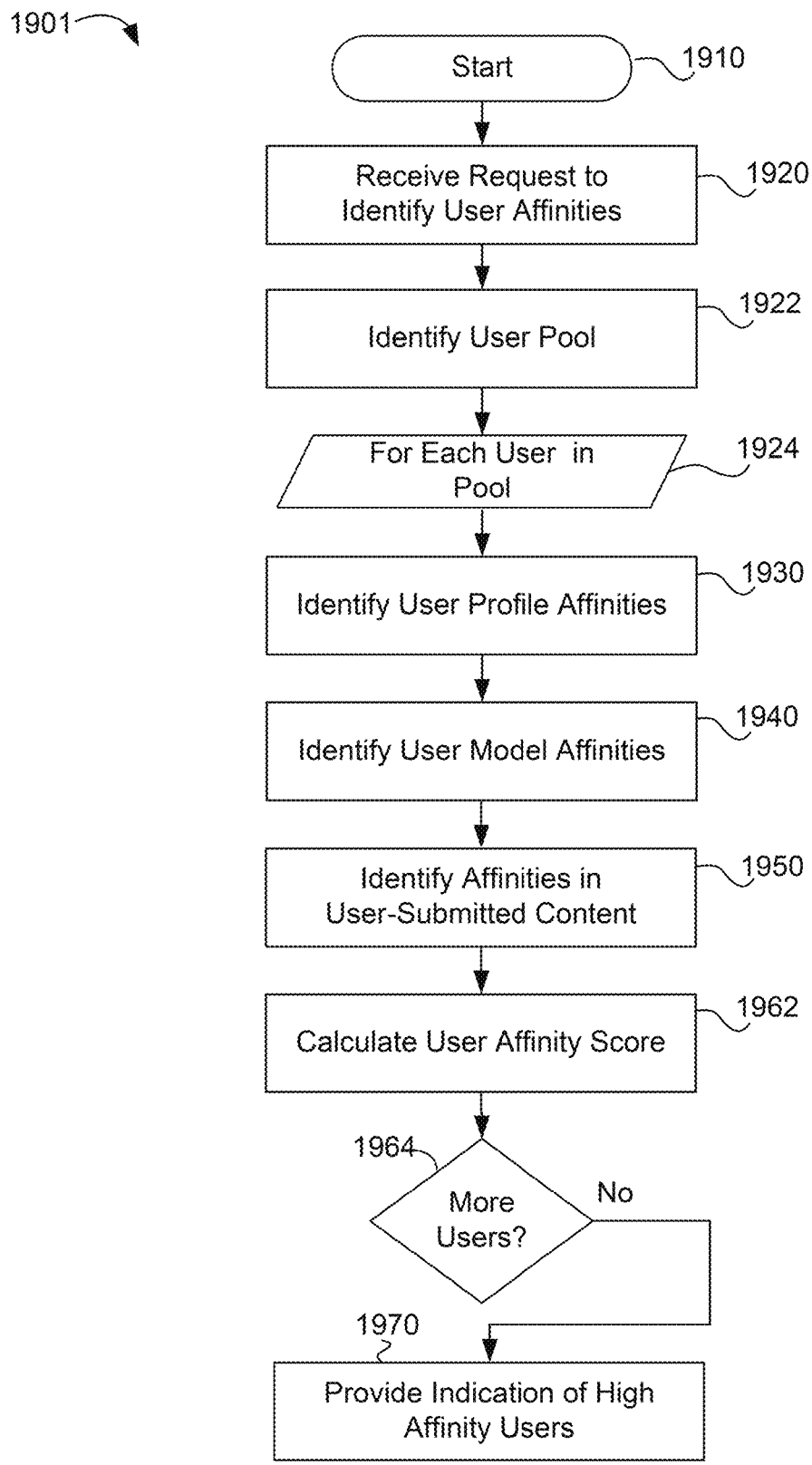
FIG. 19B is a flow diagram of another embodiment of a method for identifying affinities between users.

FIG. 19B is a flow diagram of one embodiment of a method 1901 for identifying user affinities. At step 1910, the method 1901 may start and be initialized as described above.

At step 1920, a request to identify user affinities may be received. The request may be received from a particular user, or may be received as part of an automated affinity identification process. In some embodiments, the request may include affinity criteria, such as location, age, and the like. These criteria may be used to reduce the search space for the affinity matching. For example, a user may want to identify user affinities only with local users (users who reside in the same area as the user).

At step 1922, a pool of affinity candidate users may be identified. The user pool may be identified using the affinity criteria discussed above (if any).

At step 1924, an affinity metric may be calculated for each user in the user pool. Calculating the affinity metric may comprise iterating over steps 1930, 1940, and 1950, and 1962 for each user.

At steps 1930, 1940, and 1950, user profile, user model, and user-submitted content may be used to identify user affinities as described above.

At step 1962, a user affinity metric may be calculated using the affinities identified at steps 1930, 1940, and/or 1950. The metric may quantify the individual affinities into an overall "affinity metric" for the user. Certain affinities may be weighted higher than others (e.g., a life experience affinity may be weighted higher than a high school music preference affinity). The affinity metric may also take into considerations any "affinity conflicts" between the users. An affinity conflict may be conflicting preferences or interests between the users. For example, one user may be identified as a "social conservative," and the other may be a "flaming liberal." While this conflict alone may not definitively preclude identification of a user affinity, it may reduce the overall affinity score. Like the affinities discussed above, "affinity conflicts" may be given different weights (e.g., a political conflict may be weighted higher than a "favorite type of food" conflict).

At step 1964, if there are more users in the pool to process, the flow may return to step 1930 where the affinity score of a next user may be determined; otherwise, the flow may continue to step 1970.

At step 1970, indications of high-affinity users (if any) may be provided to the user. Step 1970 may comprise comparing the user affinity metrics to an affinity threshold; metrics that fall below the threshold may not be provided to the user. Alternatively, or in addition, the user affinity metrics may be ordered, such that only the highest affinity users are returned (e.g., only the top five).

In some embodiments, the user-affinity indications may be provided in an interface to the user. Each affinity may include a link to a profile of the other user and may indicate the affinity score. Alternatively, the affinity indications may be anonymous. For example, the indication may indicate only that "you have a high affinity with user [redacted], click here to connect with them." The message may be sent to both users, and the identity of the users may not be revealed until both users agree to be introduced to one another. In some embodiments, the introduction may comprise identifying the users to one another (e.g., linking to the users' respective user profiles). The introduction may further comprise indications of the areas of affinity between the users (e.g., "you both enjoy riding horses, hiking, lived in Magnolia . . . " and so on).

In some embodiments, a user may be looking for a particular person he/she encountered at particular place and/or within a particular timeframe (e.g., at an intersection). In other embodiments, the user may not remember the location where the specific location took place (e.g., may not remember the name of the bar only that it was in downtown Seattle). Similarly, the user may not remember the exact timeframe, only that the missed connection occurred sometime during a particular day or week. In some embodiments, the user may also have additional information, which may be used to reduce the search space for the missed connection. For example, the user may remember that the person was named "Julie" and was about 25 years old. Similarly, the user may know the identity of other people who were also at the event. These other people may be registered at the network-accessible service (e.g., website) and may be identified in stories describing the event.

In some embodiments, the user may contribute a story about the missed connection (or the event generally) and specify a participant (or interested person) as a "missed connection." As will be described below, the systems and methods disclosed herein may attempt to identify a user corresponding to the missed connection using the story metadata and/or the metadata of other stories. Alternatively, the user may issue a query to the network-accessible service (e.g., website) to attempt to identify the missed connection. The query may include the intersection criteria described above (e.g., the timeframe, the location, participants, interested persons, descriptive tags, and so on).

If one or more potential "missed connections" is identified, the users may be introduced to one another via an anonymous introduction process. In some embodiments, the introduction process may proceed as described above, where the users are presented with a prompt to be introduced to the one another. Neither user profile may be exposed until both agree to the introduction. In some embodiments, an introduction may include a "mutual authentication" step in which the users may verify that the other person is who they remember from the missed connection. The mutual authentication process may be performed without exposing the identity (or other private information) of either user. Several examples of mutual authentication processes are described below, including a "photo line-up" (discussed below), connection-related questions, and so on.

Figure 20:
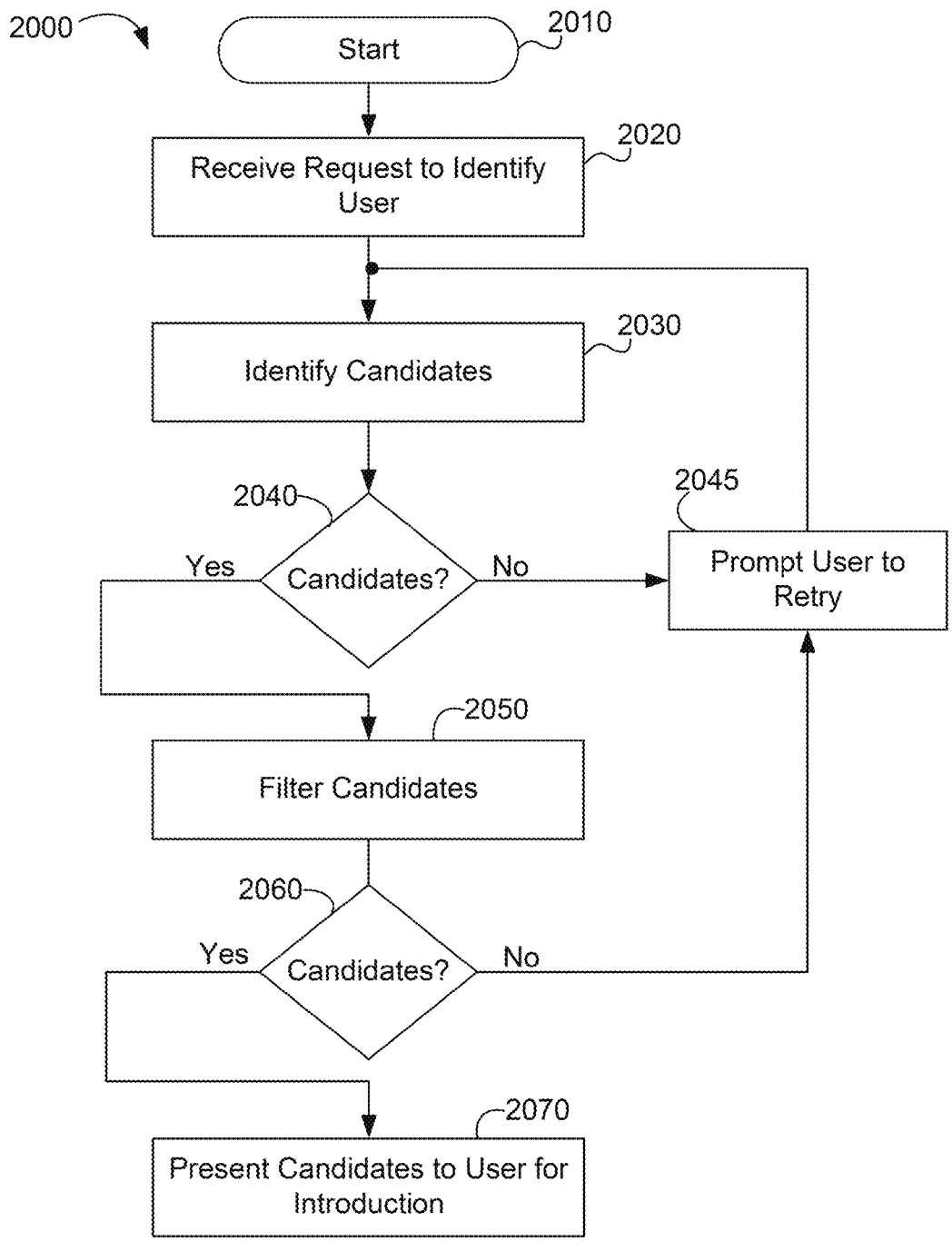
FIG. 20 is a flow diagram of one embodiment of a method for identifying a missed connection.

FIG. 20 is a flow diagram of one embodiment of a method 2000 for identifying a particular user at a particular intersection (identify a user at a "missed connection"). At step 2010, the method may start and be initialized as described above.

At step 2020, a request to identify a user may be received at the network-accessible service (e.g., website) from a user. The request may be received via a search interface and/or responsive to the user specifying a "missed connection" participant or interested person in a story (e.g., specifying a missed connection in the participant input 128 of FIG. 1A). The request may specify the timeframe the missed connection occurred, the location of the missed connection, and the like. The request may include additional criteria, such as the identity of other users at the missed connection, descriptive tags of the missed connection (e.g., "dinner party"), identifying information about the missed connection (e.g., the person is female, named "Julie," and is about 25), and so on. If the request was submitted as a "missed connection," story participant, interested person(s), the timeframe, location, and other metadata may be derived from the story itself.

At step 2030, a set of candidate missed connection users may be identified. In some embodiments, the candidate missed connection users may be identified using the stories that intersect the metadata provided in the request (the information received at step 2020). The contributor(s) and/or participants in the stories may be identified as candidate missed connection users.

In some embodiments, stories that did not occur at the specified timeframe or location may also be inspected for candidate missed connection users. For example, if a particular user regularly submits stories related to the missed connection location (e.g., a bar), the user (and the participant(s) in the user's bar stories) may be included in the set of candidate missed connection users. The users may be included even if the particular user did not contribute a "bar story" during the missed connection timeframe (the timeframe received at step 2020), since it is possible (and even likely) that the user was at the bar at the time, but simply neglected to contribute a story for that particular night.

At step 2040, if no candidate missed connection stories (or users) have been identified, the flow may continue to step 2045, where the user may be notified no one was identified. The notification may comprise a prompt to broaden the request parameters (e.g., increase the timeframe, location, or the like). When a broadened request is received, the flow may return to step 2030.

At step 2050, the candidate missed connection users may be filtered by the user's additional criteria discussed above. In some embodiments, the filtering may be "soft." For example, the user may "think" that the missed connection's name was "Julie" but is not completely sure. Therefore, when filtering on this criterion, nonconforming users may be retained as missed connection candidates. Other criteria, such as the missed connection's gender, may be "hard" filters, such that any missed connection candidates who do not conform to the criteria are automatically removed as candidates. The criteria may relate to story metadata in which the candidate user appears. For example, the request may have indicated that the event was a "dinner party" at a particular restaurant. Another story, also tagged as a dinner party, may conform to the criteria, whereas a story tagged as "laser tag," may fail the criteria. The user may specify which of the criteria are hard and/or soft in the request of step 2020.

In some embodiments, filtering may comprise assigning a candidate likelihood metric to each of the users, which may quantify the likelihood that a particular user is the missed connection. The likelihood metric may be determined using the filtering criteria described above; matches may increase the user's likelihood metric, and misses may decrease the metric. Candidate users who fail "hard" criteria and/or whose likelihood metric falls below a threshold may be removed as candidates.

As discussed above, if the users have opted-in to be identified, private story metadata and/or user profile information may be used in the identification and/or filtering steps 2030 and/or 2050. However, if a user has opted-out from using private data to identify affinities (or missed connections), the private data may not be used. Similarly, if a user has opted-out from missed connection identification, the user may be excluded from the candidate list at steps 2030 and/or 2050.

If at step 2060 and after the filtering of step 2050, no candidate missed connection users remain, the flow may continue to step 2040; otherwise, the flow may continue to step 2070.

At step 2070, indications of the one or more candidate missed connection users may be presented to the requesting user. The candidate missed connection users may be displayed anonymously (e.g., the username, profile, and other information, even if public, may not be exposed). In some embodiments, if there are more than a threshold number of candidates, the method 2000 may request that the user provide additional missed connection criteria to reduce the list to a manageable number. For example, the list may be in a dynamic user interface in which the requesting user can specify additional criteria as it comes to mind, and see the changes to the resulting list (e.g., show only the users who are named "Julie" or whose name starts with "J").

The display of step 2070 may comprise a link to be introduced to the missed connection. In some embodiments, the link may operate as described above; the users may be introduced after both users (anonymously) agree to the introduction. In other embodiments, the introduction may comprise a mutual authentication process.

Figure 21:
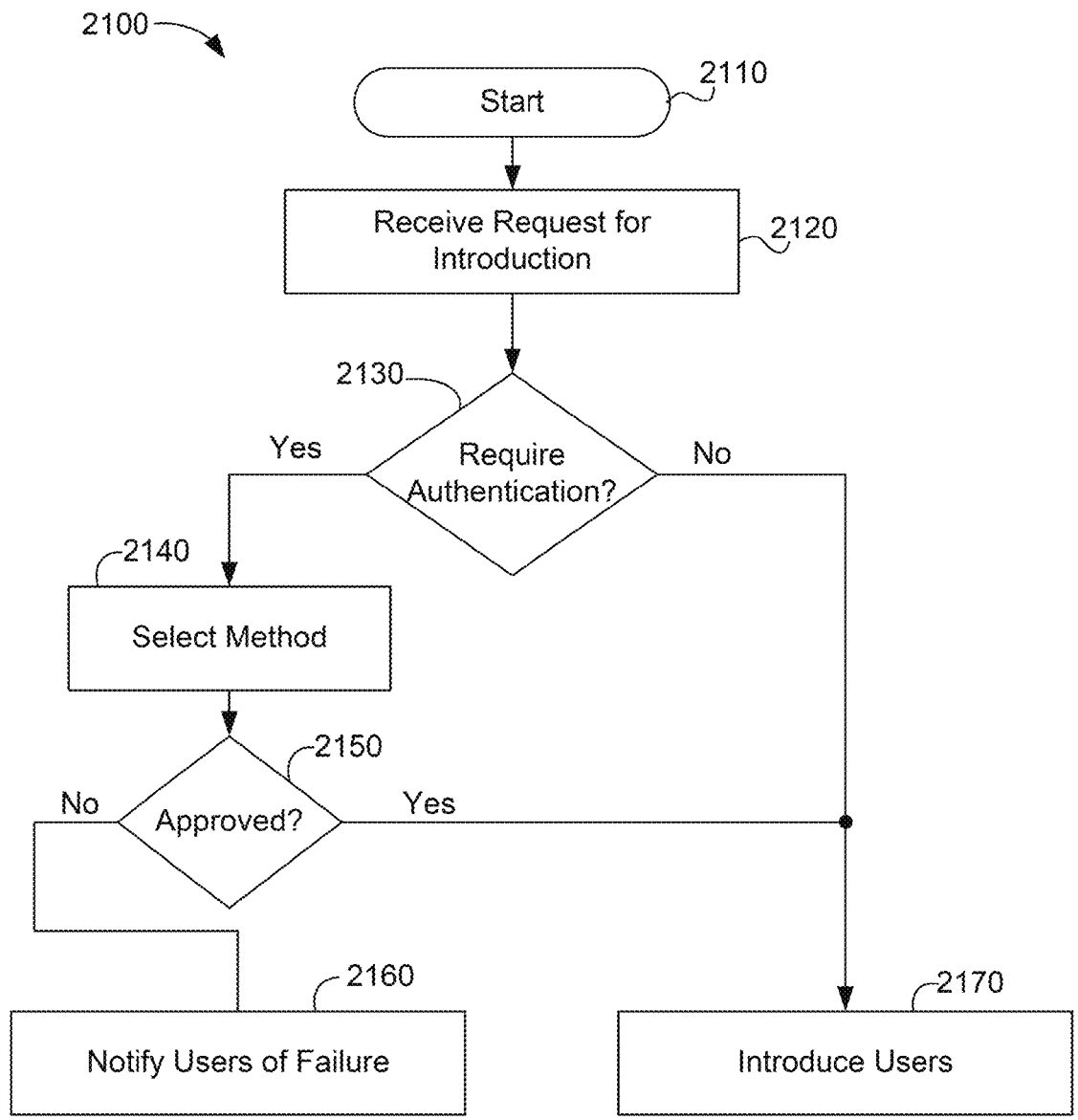
FIG. 21 is a flow diagram of one embodiment of a method for providing user introductions while maintaining user privacy.

FIG. 21 is a flow diagram of one embodiment of method 2100 for providing private user introductions, while maintaining user privacy. At step 2110, the method 2100 may start and be initialized as described above.

At step 2120, a request for mutual authentication may be received. The request may be received from a user selecting a "missed connection" (or affinity) link and may identify two or more users who are to be introduced to one another.

At step 2130, the method 2100 may determine whether the users have specified that mutual authentication is required for introductions. In some embodiments, users may have privacy settings indicating how introductions are to take place. An outgoing user may accept introduction requests without mutual authentication or prior approval. Other, more private users may require explicit approval or mutual authentication. If neither user requires pre-approval or mutual authentication, the flow may continue to step 2160 where an introduction may take place; otherwise, the flow may continue to step 2140.

At step 2140 an approval or authentication method may be selected. As discussed above, many different forms of mutual authentication or approval may be provided including, but not limited to: a photo lineup, anonymous questions, limited approval or the like. The selection of step 2140 may be predicated on user preferences and/or the availability of user profile information. For example, if one of the users to be introduced prefers not use to photo introductions, or does not have a profile picture (or the profile photo is not public), then a photo lineup may not be possible (unless the user agrees to provide a photo for the purposes of the method 2100).

At step 2150, the selected approval or authentication method may be implemented, and the results determined. If the results indicate that an introduction is to take place, the flow may continue to step 2170; otherwise, the flow may continue to step 2160, where the user(s) may be notified that the introduction was rejected.

At step 2170, the users may be introduced to one another. The introduction may comprise the users exchanging user profile information (links). Introduction may further comprise identifying the timeframe, location, interested person(s), and/or participants at the missed connection event (e.g., "We met at Sally's dinner party").

Figure 22:
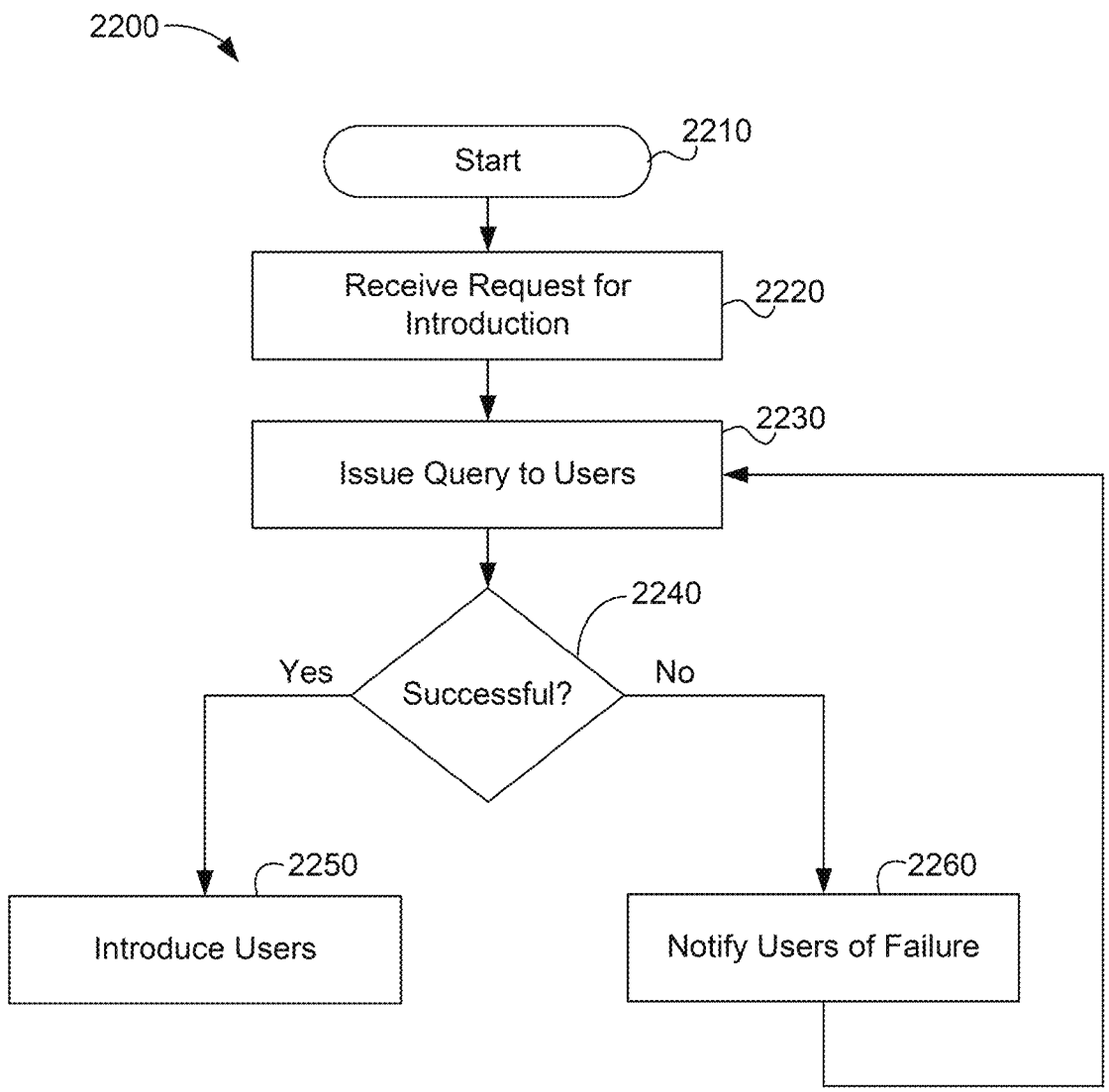
FIG. 22 is a flow diagram of one embodiment of a method for approving an introduction while maintaining user privacy.

FIG. 22 is a flow diagram of one embodiment of a method for approving an introduction while maintaining user privacy. At step 2210, the method may start and be initialized as described above.

At step 2220, a request to approve and/or authenticate a user introduction may be received.

At step 2230, the method 2200 may issue a query to each of the users. The query may be automatically generated or may be authored by another user. The query may ask the users if they would like to be introduced and, if so, provide for mutual user authentication. For example, the query submitted to a candidate missed connection may read: "Another user is looking for someone who might be you, would you like to be introduced? They claim to have met you at [timeframe] [location]. If so, do you recognize them here?"). If the response is positive, the missed connection requester may receive the following query ("[Redacted] would like to be introduced, do you recognize this person here?"). The query may comprise a photo lineup including a set of selected photos along with the photo of the other user. If the users can pick each other out of the lineups, the users may be introduced; otherwise, the introduction may fail.

In another example, the query may comprise one or more questions in place of (or in addition to) a set of photos. The question(s) may be used to authenticate that the other user is the subject of the missed connection. The question(s) may be authored by the users to be introduced. For example, the query to a candidate missed connection may read: "Another user is looking for someone who might be you, you would like to be introduced? If so, please respond to the following [user-provided question]"). The requesting user may receive a similar query.

At step 2240, the method 2200 may determine whether the users accepted the invitations to be introduced and/or the mutual authentication step was successful. If so, the flow may continue to step 2250 where the user may be introduced as described above (e.g., as in step 2150 of FIG. 21); otherwise, the users may be notified of the failure and/or given an opportunity to re-try the introduction at step 2260.

Figure 23:
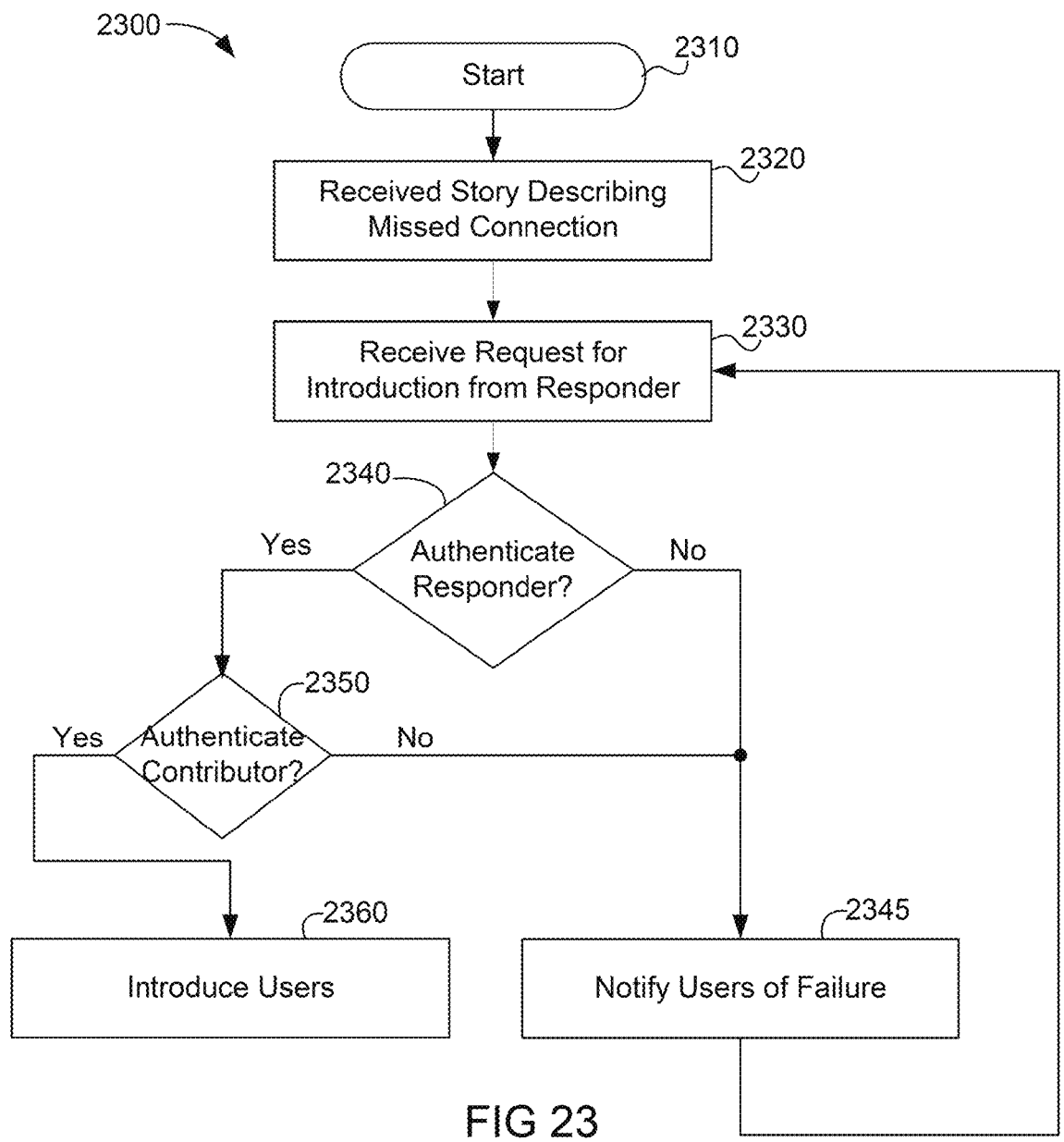
FIG. 23 is a flow diagram of one embodiment of a method for identifying a missed connection.

FIG. 23 is a flow diagram of another embodiment of a method for identifying missed connection users. In the FIG. 23 example, a user may publish a "missed connection" story (e.g., using the story type control 132 of FIG. 1A). The story may simply indicate that a missed connection occurred at a particular timeframe and/or place. In some embodiments, the missed connection may be submitted anonymously or using an alias to hide the identity of the contributor.

At step 2310 the method 2300 may start and be initialized as discussed above. At step 2320, a story describing a missed connection may be received and published on the network-accessible service (e.g., website). The story may identify the timeframe and/or location of the missed connection, may include text describing the missed connection, may include descriptive tags, or the like. The story may include a "respond" input to allow a user who thinks that he/she is the missed connection mentioned in the story to be introduced to the story contributor.

At step 2330, a request for introduction from the responder may be received.

At step 2340, upon receiving the request, the responder may be prompted to for "authentication" by identifying the contributor in a photo lineup or by some other mechanism (series of questions authored by the contributor).

If the authentication of step 2340 is successful, the flow may continue to step 2350; otherwise, the flow may continue to step 2345 where the parties may be notified of the failure, and the flow may continue at step 2330 when a next request for introduction is received. In some embodiments, once a responder has failed the authentication step of 2340, the user may be prevented from retrying (or may be prevented from retrying more than a threshold number of times). This may prevent a user from guessing the identity of the contributor by elimination.

At step 2350, the story contributor may be prompted to pick the responder's photo from a lineup or otherwise authenticate that the responder's identity. If the contributor successfully identifies the responder, the flow may continue to step 2360 where the contributor and the responder may be introduced as described above; otherwise, the flow may continue to step 2360 where the users may be notified of the failure and/or allowed to re-try the introduction.

As discussed above, a user-submitted content, such as stories and the like, may be associated with a contributor and, optionally, one or more participant and/or interested persons. Some story participants and/or interested persons may be members of the network-accessible service (e.g., may have registered an account with the service). Registered users may appear in connection with a story (as shown in FIG. 5C) and/or may have the right to comment on the story.

In some cases, however, a user tagged as a story participant or interested persons may not have account (e.g., may be an unregistered user). As discussed above, in some embodiments, these users may be represented using a "semblance." As used herein, a semblance may refer to a representation of another person created by someone other than the person himself/herself. Semblances may be used for various purposes. For example, a semblance may be created by a story contributor to represent a story participant who is not yet a member of the service. In another example, a semblance may be used to represent a person who is a member of the service (has a user account), but the contributor may not want to directly reference the person's account. In another case, a semblance may be used to represent a person who cannot register an account with the network-accessible service (e.g., website), such as a minor, a person with a disability, a deceased person, a "virtual person," such as a video game character, an entity in a virtual world, a business entity, a corporation, or the like.

In some embodiments, a semblance may be used to represent something other than a person. As will be discussed below, stories (or other content) related to a "non-person" may be included in a storyline, which may be searched and/or browsed chronologically (or using other associated metadata) as described above. For example, a semblance could represent: an event; a project (e.g., construction of a building, the Apollo space program, etc.); a physical object, such as a car, airplane, cruise ship, or the like; a piece of property; a region; a piece of software; an industry; a business (e.g., a local business, a large corporation, or the like); legislation; a social or political movement (e.g., the "tea party," "civil rights movement," etc.); a political party; or the like.

In some embodiments, the creator of the semblance may create a semblance user profile that comprises the same data as an "actual" user profile. In some embodiments, the contents of the semblance "user profile" may be adapted according to the entity represented thereby (e.g., a project or corporation profile may include a different set of profile information than a profile representing a person). Accordingly, a semblance may be assigned an avatar, preferences, contact information, etc. The user who created the semblance may be allowed to control the contents of the semblance profile. In some embodiments, the responsibility and/or control over a semblance may be shared among two or more users. For example, the semblance may represent the child of two users, both of which may be able to control the semblance. In another example, a semblance may represent a common ancestor of two or more users, each of which may "have a say" in how the semblance is represented on the network-accessible service (e.g., website). In some embodiments, conflicts may be resolved by a vote among the users having control over the semblance and/or each user may have the power to veto changes to the semblance. In other embodiments, one user may be assigned to be an arbiter of the information about a semblance. The arbiter may be the first user to create the semblance and/or may be selected by other interested users (e.g., by community consensus). In some embodiments, a semblance may represent a prominent person entity, or set of events (e.g. Abraham Lincoln, the "tea party," building the Golden Gate Bridge, or the like). In this case, one or more "experts" (as identified by the network-accessible service) may be assigned to arbitrate semblance information.

The features described above (e.g., intersections, affinities, and so on) may be implemented using semblances. For example, a user may "intersect" with a semblance in the same way (or in a similar way) the user would intersect with another user. A semblance may have a "life" timeline or "storyline" (similar to the life timeline interface of FIG. 5B), and may appear as a participant and/or interested person in stories, and so on.

In some embodiments, a semblance may be associated with access controls. The access controls applied to a semblance may operate similarly to access controls on stories, aliases, and the like described above. For example, a semblance may be accessible only within certain contributor-defined circles. This may prevent a semblance representing a minor from being seen by the public (e.g., only the members of the contributor's "family" circle may have access to the semblance). Accordingly, when the semblance is identified as a story participant, the participant indicator showing the semblance may only be displayed when the story is viewed by a member of the contributor's family circle. Similarly, only family circle members may have access to the "semblance profile" information (if any).

In some embodiments, semblances may be merged with one another. Merging may be used to combine multiple representations of the same person or thing. For example, one or more contributors may create multiple semblances representing the same person or thing (e.g., using different name variation, spellings, or the like). The different semblances may be associated with different sets of stories, making it difficult to find the all of the stories (or other content) associated with the semblance. Merging may occur between the semblances created by the same user and/or between semblances created by different users. After a merger of the semblances of a single user, the resulting merged semblance may comprise the "combination" of the information of the merged semblances. References to the semblance (as a story participant and/or interested person) may point to the merged semblance. Similarly, storylines involving the semblance may be combined (e.g., as discussed below). In some embodiments, profile information (avatar picture, contact information, etc.) of the merged semblances may be combined into the merged semblance. Conflicts may be manually resolved by the user and/or the merged semblance may include two copies of the conflicting information (to be resolved by the user at a later time). If the semblances were created by different users, the user may determine how the merged semblance is to be controlled or "arbitrated" therebetween (e.g., shared control of both users, such as veto power, majority control, control by a single user, or the like).

Figure 24:
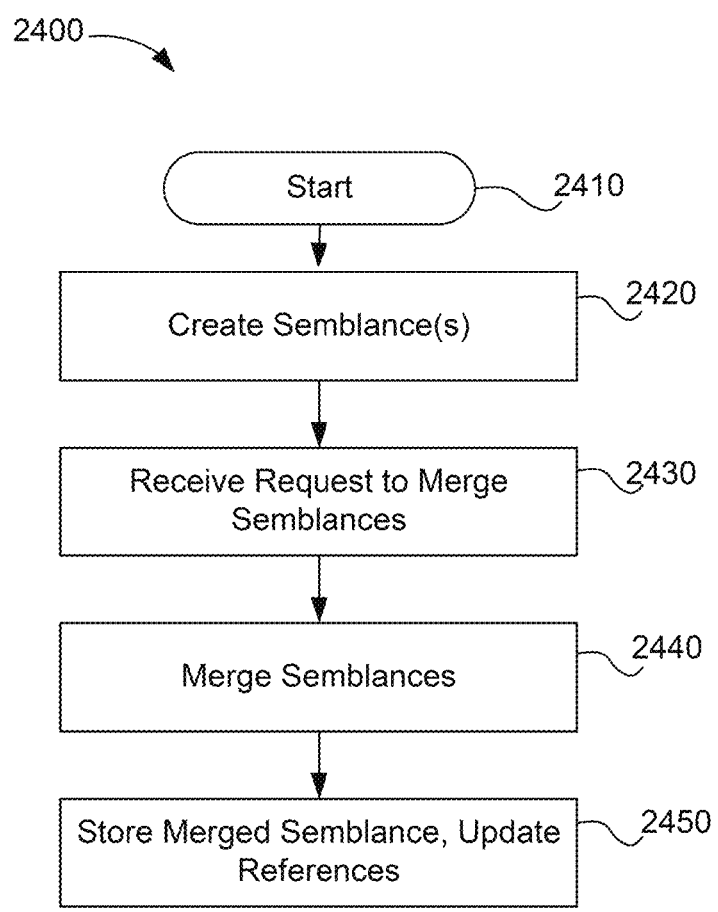
FIG. 24 is a flow diagram of one embodiment of a method for merging two or more semblances.

FIG. 24 is a flow diagram of one embodiment of a method 2400 for merging one or more semblances. At step 2410, the method 2400 may start and be initialized as described above. At step 2420, one or more users may create two or more semblances representing the same person or entity. The semblances may be stored on a datastore of the network-accessible service (e.g., website). Step 2420 may further comprise the user(s) identifying the semblance as a participant and/or interested person in one or more stories, providing "semblance profile" information, and so on.

At step 2430, the method 2400 may receive a request to merge the two or more semblances. The request may identify the semblances to be merged. The request may further comprise an indication of how the merged semblance is to be managed or arbitrated (e.g., controlled by a single user, multiple users, or the like).

At step 2440, the multiple semblances may be combined into a merged semblance. Step 2440 may comprise updating references in stories (or other content) to reference the merged semblance. Step 2440 may further comprise combining "semblance profile" information (if any) into the merged semblance. If conflicts in the profile information exist, they may be manually arbitrated by the user(s) (e.g., using prompts or other means specified in the request of step 2430), and/or the conflicting information may be stored in the merged semblance to be resolved at a later time.

At step 2450, the merged semblance may be stored on a datastore and made available for use by the user(s).

In some embodiments, a semblance may "graduate" to a full user. For example, a child who was represented by a semblance by his/her parents may "inherit" the semblance, and convert it into a full user account. The conversion may take place by the user(s) who created the semblance issuing a request to the network-accessible service. In response, the network-accessible service may update the semblance to represent a user and/or may provide new login credentials (or other registration materials) to the owner of the new user account.

In another example, a person may create his/her own account. The person may be represented as a semblance by one or more other users. When the user creates the new account, he/she may be prompted to associate the account with existing semblances. The association may be automatically identified by comparing properties of the new user to properties of the semblance(s). Alternatively, or in addition, the users who created the semblance(s) may have issued an invitation to the new user, which may allow for an automatically association to be made between the new user account and the semblances (e.g., using an invite code or other identifier). In some embodiments, and if allowed by the new user, profile information from one or more of the semblances may be used to "pre-populate" the new account.

When the new account is created, and one or more corresponding semblances are identified, references to the semblances in certain contributor stories may be updated to reference the newly updated account. In some embodiments, the updating may occur automatically and/or may require approval of the new user and/or approval of the story contributor(s). For example, at registration time (or after registration) the user may be presented with a list of automatically identified stories comprising similar names to the newly registered user's name, and may query the new user to indicate which story/name combinations refer to him/her. The new user may indicate which semblances should be updated and, in some embodiments, the stories may be automatically updated to reference the new account. Alternatively, the story contributors may be given the opportunity to accept or reject the changes.

Figure 25:
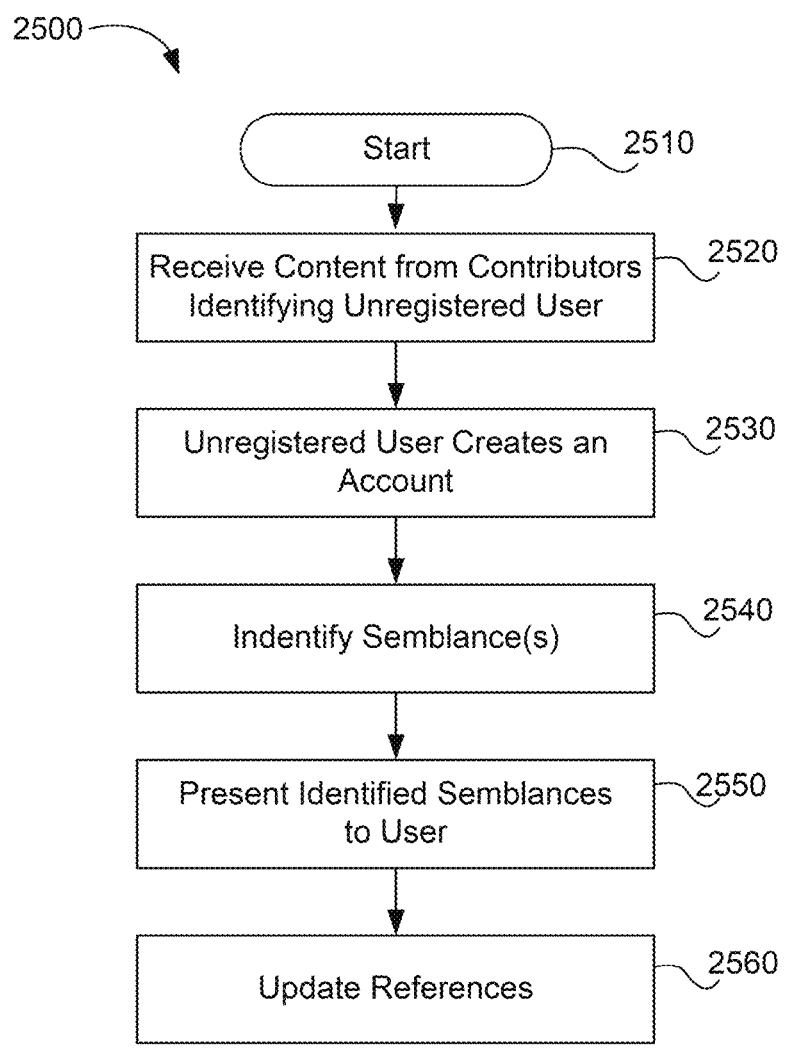
FIG. 25 is a flow diagram of one embodiment of a method for associating a user with a semblance.

FIG. 25 is a flow diagram of one embodiment of a method 2500 for identifying semblances associated with a user profile. At step 2510, the method 2500 may start and be initialized as described above. At step 2520, one or more story contributors may create one or more semblances to represent a person as a story participant, interested person, or the like. The semblance(s) may indicate the name of the person user and/or may specify one or more "semblance" (e.g., user profile) attributes (e.g., this person is about 25, first and last name, contact information, such as email address, and the like.). In some embodiments, when a semblance is created, and contact information is provided, the person may be notified that he/she has been tagged in a story (or other item). The notification may include an invitation to register with the network-accessible service (e.g., using a link comprising a unique invitation code). When the invitation (e.g., link with the code) is followed, the resulting user account may be automatically added as a story participant (as discussed below). A similar interaction may occur when a contributor adds a semblance to a circle (e.g., by email address, or other identifier).

At step 2530, the user associated with the semblance(s) may register an account with the network-accessible service. Account registration may comprise providing user identifying information, such as user name (first and last), age, interests, preferences, and the like, as discussed above.

At step 2540, one or more semblances associated with the user account may be identified. The identification may comprise searching for users having the same or similar name, or the like. In some embodiments, the identification may further comprise filtering the results based on user-identifying information of the semblances, such as age, name, and the like. If the user created the user account in response to an invitation (e.g., in an email) having an invitation code (generated at step 2530), the user may be automatically added as a story participant (without performing steps 2550-2560 below). In some embodiments, semblance profile information may be used to pre-populate portions of the created user profile (upon approval of the new user).

At step 2550, the identified semblances may be presented to the new user. The semblances may be presented with indicators of which contributors created and/or have used the semblance(s), the nature of the stories in which the semblances appear, and so on. The user may indicate which of the semblances represent the user and/or may indicate which semblances and/or stories with which the user does not want to be associated.

Step 2550 may further comprise receiving verification from the story contributor(s). In some embodiments, once the new user identifies which semblances represent him/her, the method 2500 may transmit a verification message to the story contributors requesting to update the contributor's references to the semblance(s) with a reference to the user profile. In some cases, the contributor may refuse (e.g., the contributor may determine that the new user is not the person he intended the semblance to represent, and/or may prefer to continue using the semblance). If the contributor chooses not to use the new account, the contributor may continue to use the semblance(s); otherwise, the contributor's references to the semblance(s) may be updated to reference the identified user profile.

At step 2560, the stories in which the unregistered user appeared, and that were indicated (and verified by the contributor) at step 2550, may be updated to associate the participant with the user profile.

Figure 26:
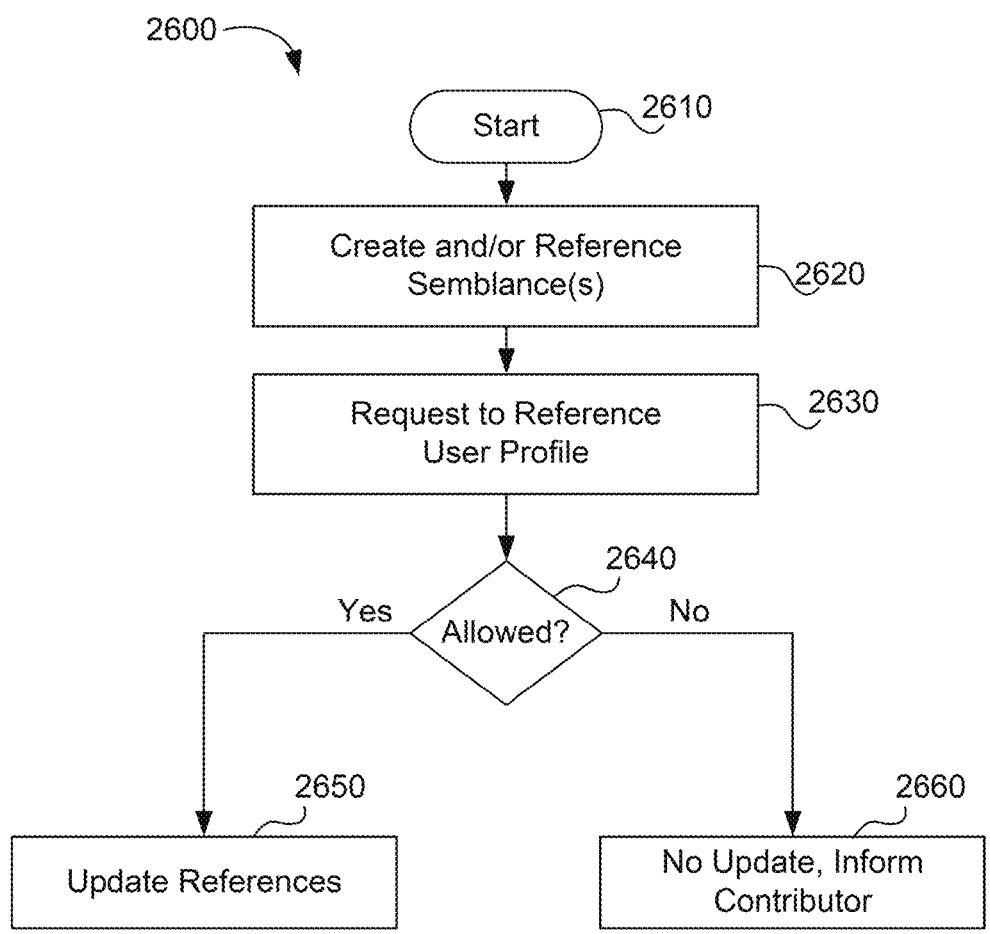
FIG. 26 is a flow diagram of another embodiment of a method for associating a user with a semblance.

FIG. 26 is a flow diagram of another embodiment of a method for updating a semblance to refer to a user profile. In the FIG. 26 example, the association may be driven by a story contributor (e.g., a contributor who created and/or used the semblance to represent the user). At step 2610, the method may start and be initialized as described above.

At step 2620, a contributor may create and/or reference a semblance representing a particular person. The contributor may reference the semblance in user-contributed content, such as a story or the like (e.g., the semblance may be used to represent a story participant and/or interested person). Step 2620 may comprise storing the content (and semblance reference) on a datastore of the network-accessible service (e.g., website).

At step 2630, the contributor may identify a user profile of the person represented by the semblance(s). The contributor may, therefore, issue a request to the network-accessible service, to replace references to one or more identified semblance(s) with references to an identified user profile.

At step 2640, the method 2600 may determine whether the contributor's references to the identified semblance(s) may be updated to reference the identified user profile. As discussed above, users may have the right to be removed as participants and/or interested persons of certain stories. Therefore, in some embodiments, the owner of the user profile (the user represented thereby) may be prompted to confirm that he/she is willing to appear as a participant and/or interested person in the contributor's stories. In some embodiments, the decision may be made on a story-by-story basis. Therefore, the prompt of step 2640 may include indicators (e.g., link badges, links, or the like) identifying the stories with which the user profile would be associated. In some embodiments, approval to add a user as a participant and/or interested person may be controlled by a user policy (e.g., always allow me to be added to stories by user X, always prompt me, always exclude me, etc.). Examples of such policies are described below in conjunction with FIG. 29. If such policies exist, they may be applied at step 2640. If no policy exists, the user may be prompted for configuration before associating the user profile with the storie(s). While awaiting confirmation, the references to the semblance may be retained (or removed). Alternatively, even if a policy exists, the user may be prompted (since the change at step 2640 could include a large number of stories, which may be outside of the scope of the policies).

If at step 2640 the method 2600 determines that the update can take place (within one or more of the contributor's items), the flow may continue to step 2650; otherwise, the flow may continue to step 2660 where the contributor may be informed that the user rejected the change.

At step 2650, one or more references to the identified semblance(s) may be replaced with a reference to the identified user profile. Step 2650 may comprise modifying a datastore on which the contributor's items are stored. Step 2650 may further comprise removing the identified semblance(s) (since the person represented thereby is now associated with an "actual" user profile). Alternatively, the semblance(s) may be retained (but may not be referenced in any user-contributed content).

As discussed above, user-submitted content may be associated with various types of metadata, which may determine how the content is presented and/or browsed on the network-accessible service (e.g., website). For example, the content submitted and/or borrowed by a particular contributor may be displayed in a "life" interface such as the interface 503 of FIG. 5B. Other intersection space interfaces may display stories related to a particular location, set of participants, or the like.

In some embodiments, user-submitted content may be organized by "storyline." As used herein, a storyline refers to a collection of content, such as stories, photos, metadata, or information imported from other social media. The selection of content for a storyline is under the control of the owner or owners of the storyline, and may consist of content created by an owner of a storyline, content borrowed or imported by the owner, linked or referenced content, or the like. Often a storyline will have a name that describes the unifying theme of the content, if there is a unifying theme. For example, the content submitted by particular contributor over his lifetime may be a "My Life" storyline of the contributor, and have as its name the name of the person. Like an intersection space, a storyline is a collection of stories and other content, but in some embodiments a storyline has a fundamental difference from an intersection space. A storyline is curated by a person (or potentially people) who have the right to create stories and also borrow the stories of others. It is under control of the owner of the storyline with respect to which stories are included (although borrowed content may in some embodiments be editable by the original creator of the story, thereby creating the opportunity for a story that has been borrowed to be changed subsequently in some way that is unattractive to the borrower). A storyline, therefore, is under control of a storyteller (storyline owner). In contrast, an intersection space is not under control of a particular user or owner. An intersection space shows whatever content qualifies to appear, although the content may be filtered according to reputation and other criteria, making it in a sense under the control of the consumer rather than the creator of content. For example, all stories from all storytellers about a concert in a park would show up at the intersection space corresponding to the time and place of the concert, except to the extent that stories might be filtered out because they have been flagged as objectionable, come from low-credibility storytellers, come from strangers, or fail some other test (e.g., low rating, etc.). Accordingly, the intersection space may be considered as crowd-sourced content with no "owner," whereas, a storyline comprises curated content and an owner. For example, a user could create a storyline about the concert or the concert series or the musical act that is performing in the park and borrow into that storyline selected stories from the intersection space and elsewhere. Like the intersection space, this storyline would include stories about the concert, but unlike the intersection space it would contain only those stories created or selected by the owner of the storyline. In some embodiments, there is a one-to-one relationship between user accounts and storylines (in other words, each "user" has a storyline), and in other embodiments a user account may have multiple storylines, or no defined storyline.

The interface 503 of FIG. 5B described above is an example of an interface configured to display the "life" storyline of a contributor. A "life" storyline may include other story lines, such as a "travel" storyline, a storyline of the contributor's experiences at the theater, a storyline for a hobby, a storyline for a vacation, a storyline for items of interest, and so on.

In some embodiments storylines may be configured to automatically borrow stories from a specific intersection spaces (e.g., may be presented within an interface such as 500, 503, and/or 504 described above) or that meet some other criteria such as being returned as a search result for a term or terms. A storyline may be a story itself and/or may include a collection of stories. An example of a storyline interface is described below in conjunction with FIG. 27.

In some embodiments, storylines may be "nested" hierarchically and/or may be used to organize a contributor's "life" storyline. For example, all of the stories pertaining to one of the contributor's hobbies (e.g., horseback riding) may be included in a storyline. The "top-level" story (and/or one or more especially notable horseback riding related stories) may appear in the contributor's "life" storyline, whereas the others may not. In some embodiments, a story may appear in more than one storyline because it was assigned to one or more storylines as part of the story creation or editing processes. The relationship between stories and storylines may be defined in story metadata using, inter alia, the storyline input 124 of FIG. 1A. In some embodiments, a story may appear in more than one storyline because it was borrowed into second (and subsequent) storylines. For example, a story created for the "Vacation" storyline might be borrowed into a "My Life" storyline. In some embodiments, a story may be assigned automatically to storylines based on metadata, such as a tag. For example, a story included in the "My Life" storyline may appear in the contributor's life storyline (e.g., in the interface 503 of FIG. 5B), whereas a story that does not include the "My Life" storyline tag may not. Referring to the "horseback" riding example, the top-level horseback riding storyline (which may itself be a story) may be tagged within the "My Life" and "horseback riding" storylines. The constituent stories, however, may be tagged only with the "horseback riding" storyline. Accordingly, only the top-level horseback riding story may appear in the contributor's "My Life" storyline, and the other horseback riding related stories may be "hidden" unless the viewer "drills down" to the horseback storyline.

In some embodiments, storylines with a common owner may have different permissions. For example, one storyline may be devoted to public stories, while other storylines are devoted topics that are restricted to certain circles or users, and still other storylines are not shared at all. In some embodiments, storylines may be devoted to content that has been imported via APIs or other means from other social media services or web sites, and these storylines may be public or private. For example, a storyline might be devoted to tweets posted on TWITTER®, and this storyline might be public so that everybody can see the tweets arranged over time, or it might be restricted or private. The owner of the storyline might choose to borrow certain of the tweets from the TWITTER®-oriented storyline to a more general storyline that has a wider audience or is public. In this way, a user can import various kinds of content into one or more storylines that may not be public, and pick and choose from among the items on the storyline(s) which content they want to display on a different storyline about their life.

In some embodiments, a storyline may be developed collaboratively. For example, the parents of little league baseball players may contribute little league-related stories to a storyline dedicated to their team. A high school may develop a set of stories describing their senior class, and so on.

Other storylines may be used to chronicle someone else's life, such as the life of a semblance. For example, one or more contributors may create a storyline for one or more ancestors. In some embodiments of this, a story may appear in a storyline because the creator of the story is considered to be a member or contributor to the collaborative storyline.

Storylines may be used to express other types of stories that may be of a different scope and/or focus than the life of a single person or contributor. In one example, one or more contributors may develop a storyline chronicling the history of a location, business, entity, or the like. The stories may, or may not, appear in the "My Life" storylines of any of the contributors. However, all the stories may be included in a storyline tailored to the subject matter of the stories. For example, a collection of stories chronicling the history of a restaurant may all be tagged with a "Joe's Diner" storyline tag (e.g., using the input 124 of FIG. 1A). Using the storyline tags, the network-accessible service may identify the "Joe's Diner" stories, and display them within a storyline interface (e.g., like the interface 503). The "Joe's Diner" storyline may include one or more "nested" storylines as described above. For example, a "sub-storyline" may chronicle each different ownership phase of the restaurant; another nested storyline may comprise stories of the restaurant at different locations (e.g., stories occurring when the restaurant was at location A, stories occurring when the restaurant was at location B, and so on). The storylines may overlap one another; for example, a particular story may be in the restaurant storyline, may be included in an "ownership" storyline, and be in one of the "restaurant location" storylines.

In another example, a storyline may chronicle the history of a particular piece of property. Like the restaurant storyline described above, the "property" storyline may be contributed by one or more users, but the stories may not necessarily appear in their "My Life" storylines, but instead may be grouped (by storyline tag) into the "property" storyline. The storyline may include stories describing the original inhabitants of the property (e.g., members of the Navajo tribe), describe the first Western settlers, cover the gold rush years, and so on up to the present day. In another example, a storyline may describe a particular program, such as the history of a large-scale project (e.g., the design and installation of "Cristo's Fence," a large scale art installation that required city approval, private land owner participation, and so on), the Apollo space program, or the like.

In some embodiments, a storyline may be created and/or maintained by a particular user (e.g., the "storyline curator"). Other users may publish stories tagged (or otherwise associated) with the storyline and the curator may determine whether the stories should be included therein, either before or after the stories are initially published to the storyline. The curator may reject stories that do not belong in the story line (are not relevant and/or not of sufficient quality). The curator may import stories by "borrowing" the stories as described above. In some embodiments, a storyline may be "curated" by two or more users (a user community), who may make shared decisions regarding storyline content.

As described above, a storyline may be presented within an interface, such as the interfaces 500 and/or 503 described above. The interface may be adapted to display stories having a particular storyline tag. Therefore, the stories that are available for display in the storyline may be identified by using intersection criteria that includes the storyline tag (e.g., using method 400).

Figure 27:
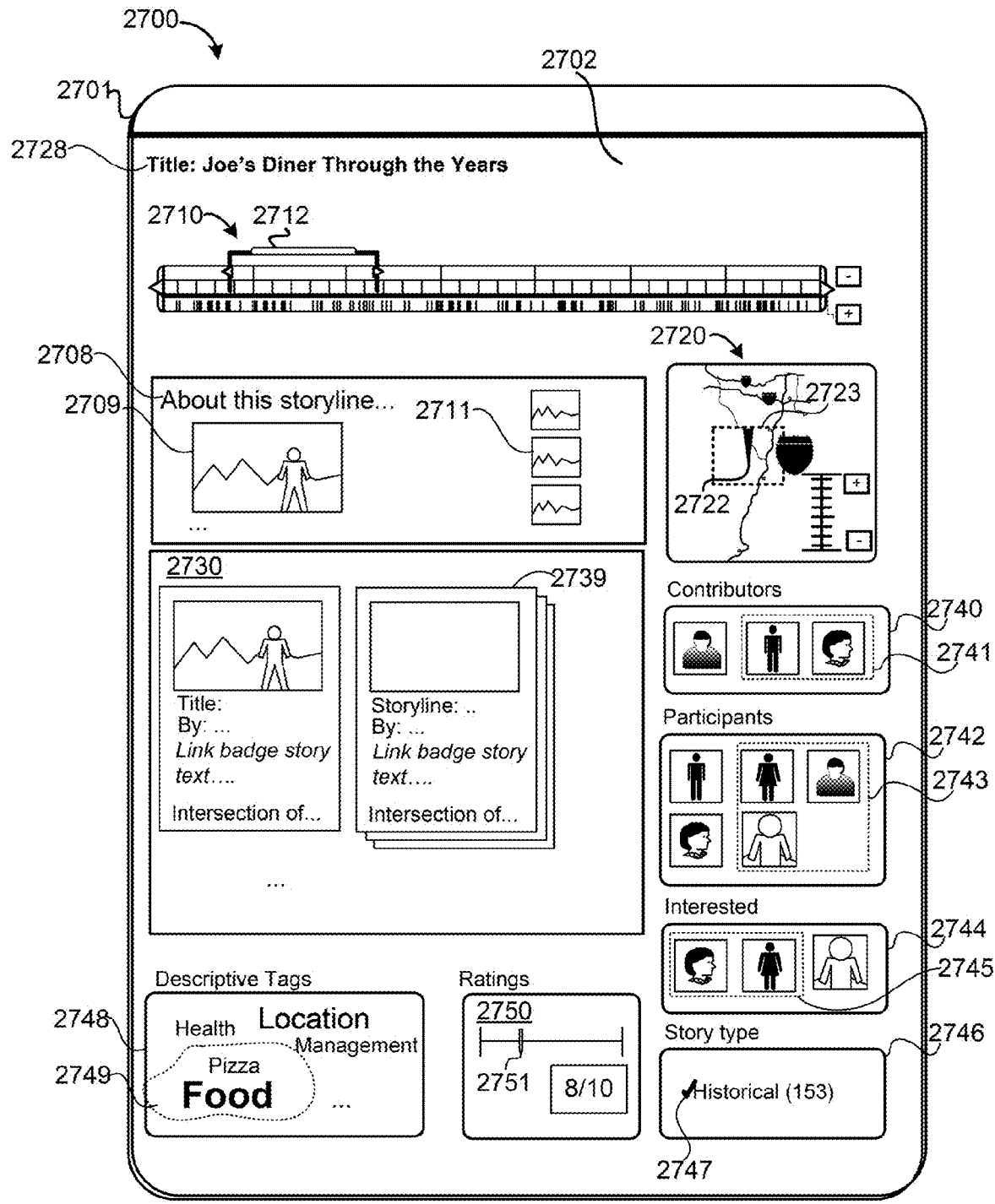
FIG. 27 depicts an embodiment of an interface for presenting a storyline.

FIG. 27 depicts one embodiment of an interface 2700 for displaying a storyline. The interface 2700 may be adapted for display in a window 2702 of a browser application 2701. However, as discussed above, the interface 2700 is not limited in this regard and could be provided using any interface display and/or presentation mechanism known in the art.

In some embodiments, the interface 2700 may include a storyline title 2710, which may be provided via an interface similar to the interface 100 described above in conjunction with FIG. 1A. As discussed above, a storyline may itself be a story, in the sense that it has an overview story associated with it. As such, in some embodiments, the interface 2700 may include story display elements, such as a title 2728, text display 2708, content item display 2709 (e.g., image display) and/or image thumbnails 2711, and so on. The storyline content may be contributed and/or edited using an interface, such as interface 100 of FIG. 1A.

The stories comprising the storyline may be identified by a "storyline" tag as described above. In addition, the stories on the storyline may be browsed and/or search according to other story metadata, including, but not limited to: timeframe (using timeframe selector 2712 of the timeframe control 2710), location (using location identifiers 2722 and/or 2723 of location control 2720), contributors (by selecting contributors 2741 in the contributor element 2740), participants (by selecting participants 2743 in the participant element 2742), interested persons (by selecting interested persons 2745 in the interested persons element 2744), story type (by selecting story types 2747 in the story type element 2746), descriptive tags (by selecting tags 2749 in the tag element 2748), by rating (by specifying a rating threshold 2751 in the rating element 2750), and so on. The controls and/or elements 2710, 2720, 2740, 2742, 2744, 2746, 2748, and/or 2750 may operate as described above in conjunction with FIGS. 5A-5C.

As described above, stories that are to be included in the storyline may be identified by a "storyline" tag, which may be applied by a story contributor, borrower, and/or a storyline "curator," as described above. Indications of the stories that are in the storyline, and the intersection space defined by the other controls/elements of the interface 2700 discussed above, may be displayed in the region 2730. The region may display intersecting stories as link badges (as depicted in FIG. 27), as a list, or by some other method(s).

In some embodiments, storylines may appear to the user to be "nested" within one another. For example, the "Joe's Diner" storyline may include nested storylines chronicling particular aspects of the restaurant (e.g., management changes, location changes, etc.). The nested storylines may be included in the region 2730 (if they are tagged with the top-level storyline tag). In some embodiments, an entry that represents a storyline (e.g., includes one or more constituent stories), may be distinguished from other stories in the region 2730. For example, and as shown in FIG. 27, the storyline 2730 may be displayed as a "stack" of stories. Like the other stories in the region 2730, the storyline indicator 2739 may include a title, byline (or curator identifier), "link badge" text, and so on. A user may select the storyline indication 2739 to browse the stories therein (the stories in the "nested" storyline). Accordingly, in some embodiments, when a user selects the link badge indicator 2730, the user make be linked to another interface (similar to the interface 2700) comprising the stories tagged with the storyline tag of the storyline represented by 2739. Similar storyline indicators may be included in the regions 530 described above in conjunction with FIGS. 5A and/or 5B.

In some embodiments, a story may have an associated storyline comprising one or more constituent stories that are components or details of the story. The story gives the big picture or overview of the content in the storyline. For example, the story might be an overview of a summer vacation and the associated storyline might contain stories and other content from the vacation. The story may, therefore, be thought of as an "Overview" or "Front Page" of the associated storyline. The "Overview" story of the storyline may serve as a "tag" for all of the constituent stories in the storyline. In some embodiments, this association may be maintained in a datastore of the network-accessible service by associating the storyline tag with the "Overview" story (e.g., a storyline data structure may include a reference to the "Overview" story). Referring to the FIG. 27 example, each story in the storyline may be "tagged" with the "about this storyline" story (depicted as elements 2708, 2709, and 2711).

In some embodiments, a storyline may itself include "story" content (e.g., the "Overview" story content may be part of the storyline itself). This may be implemented by linking a storyline datastructure to user-contributed content items (e.g., the storyline may be a story itself). The associated story may be used to represent the "Overview" or "Front Page" of the storyline as described above. Accordingly, the stories that are tagged with the storyline may each have access to the "Overview" story (e.g., through the storyline tag). In some embodiments, the "Overview" story may contain various kinds of data and metadata. For example, the overview of a person's life might include a biography and/or general photographs and/or general video, and it might show the person's most recent stories, favorite stories, and most highly rated stories. It might show a feed of the person's most recent tweets, or comments they have made on the stories or photographs of others. It might contain usage statistics, such as a record of the number of stories told or commented on, or awards (badges of honor) for certain kinds of participation and/or contributions. It might contain profile information as described above, such as musical or literary preferences, or links to the presence of the individual on other media including social media. In short, it would be a place to go to find out the latest and best about the person.

In some embodiments, content from specific storylines and overview pages could be used as feeds that other users could subscribe to. These feeds from specific users and storylines would complement other feeds that might contain popular, recent, topical, geographically focused or otherwise distinctive aggregations of content from multiple storylines. In some embodiments, these feeds could be brought together (potentially a home page) so that a consumer of content could see what was recent or of importance to the owners of specific storylines.

Figure 28A:
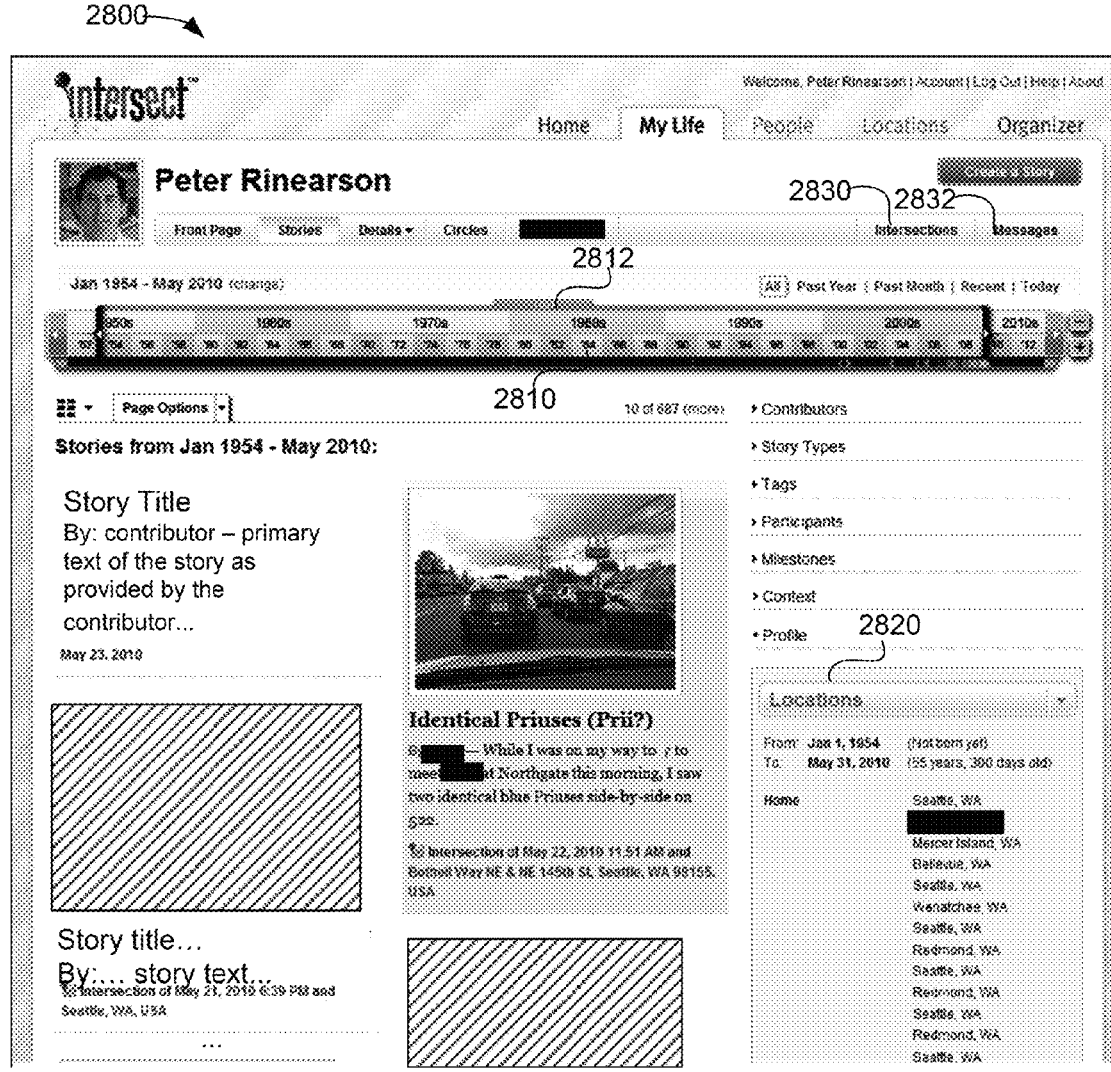
FIGS. 28A-C depict exemplary embodiments of interfaces for presenting a storyline.

As described above, a user may create a storyline related to any topic, including a storyline comprising his/her life events; this story line may comprise the stories contributed and/or borrowed by the user. The "My Life" (or "You") storyline may be displayed in an interface provided by the network-accessible service, such as the interface 503 described above in conjunction with FIG. 5B. FIG. 28A depicts another example of an interface for presenting a "My Life" storyline. The FIG. 28A example comprises the stories contributed and/or borrowed by "Peter Rinearson." The interface 2800 includes a timeframe control 2810, which may operate similarly to the timeframe controls 510 and 1100 described above. The Interface 2800 includes metadata describing stories included in the "Peter Rinearson" intersection space including Contributor(s), Story Types, Tags, Participants, Milestones (which may include stories identified by the contributor as being "life changing" marker events), Context, Profile, and so on. The interface 2800 includes a Locations element 2820 which comprises a list of the locations visited by the contributor over the selected timeframe 2812.

The intersections link 2830 may allow the user to see how his/her life intersects with the life of another user. Examples of such intersections are described above in conjunction with FIGS. 19A and 19B. The "intersections" may include information about common locations (locations both users have visited or are at the moment visiting), people the users know in common, age comparisons, life-event comparisons, stages of life, and so on. A messages link 2832 may display messages and/or notifications for the user, such as requests for introductions discussed above in conjunction with FIGS. 20-24.

Figure 28B:
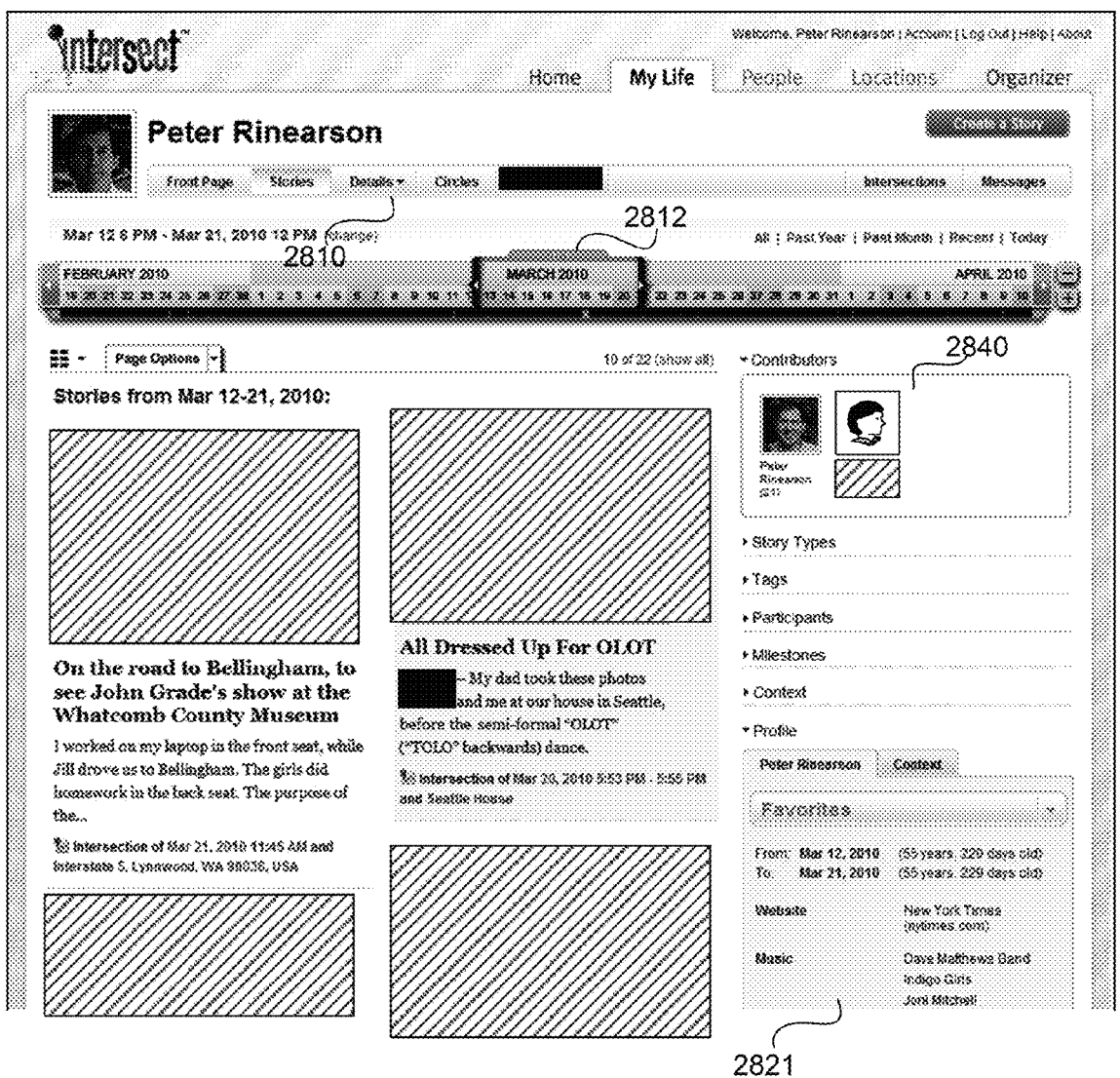

As discussed above, the stories included in an intersection space (the "My Life" storyline) may change as the user changes the "prevailing timeframe" 2812 of the timeframe control 2810. FIG. 28B, shows the result of changing the prevailing timeframe 2812 from a very broad prevailing timeframe 2812 to a narrower prevailing timeframe 2812 comprising a few days in March, 2010. FIG. 28B also shows an example of a chronological user profile display 2821 comprising preferences for the contributor during the prevailing timeframe 2812.

Figure 28C:
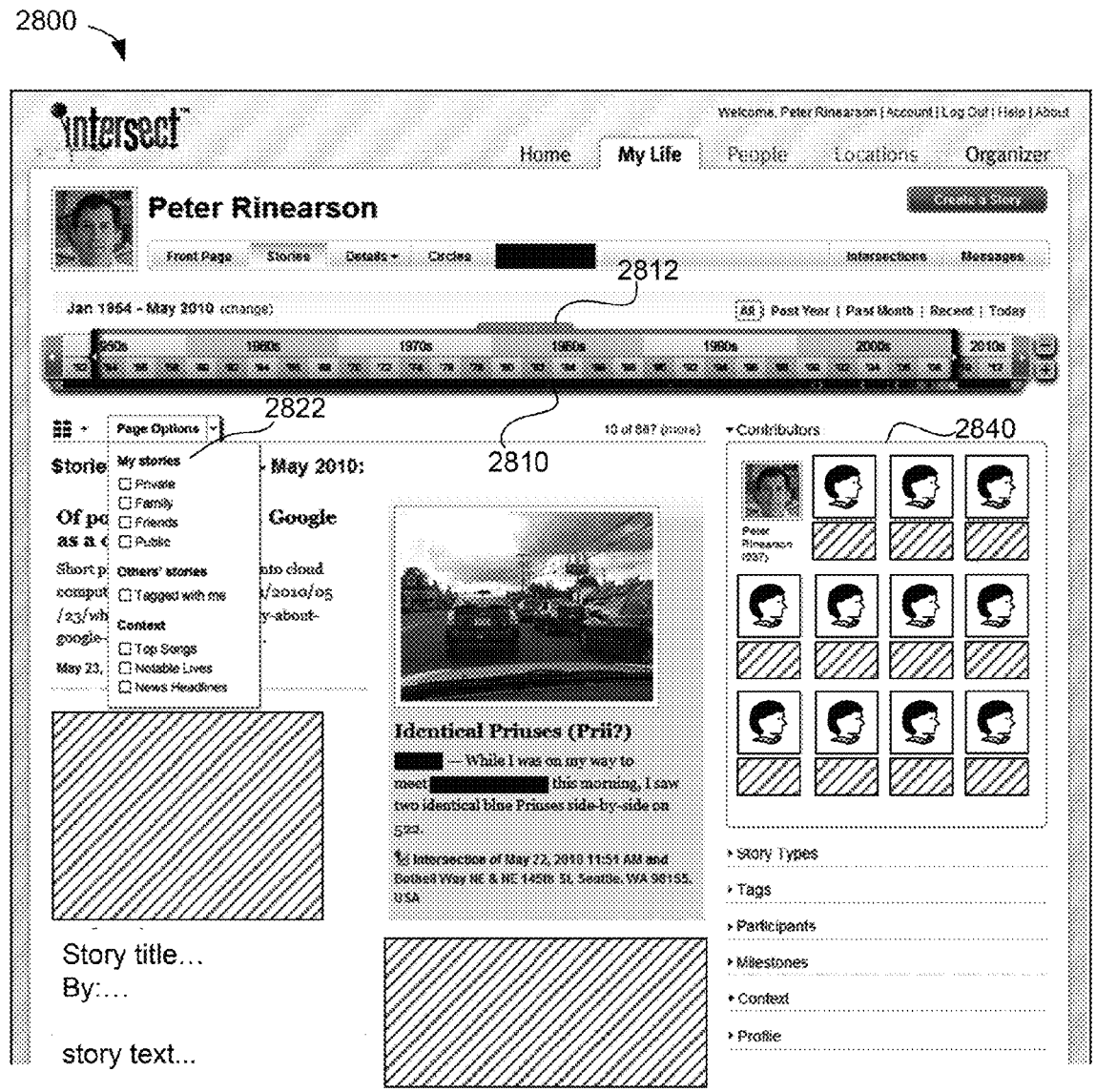

Referring to FIG. 28C, a page options element 2822 may be used to filter the stories displayed in the interface 2800 according to access control settings, story participant tags (e.g., show only stories in which "Peter Rinearson" is a participant" show different types of context information (as discussed above in connection with FIG. 5B), and so on. FIG. 28C also shows the result of expanding the contributor element 2840, which, as discussed above, may show the contributors of the stories in the intersection space (as determined by the prevailing timeframe 2812).

Figure 28D:
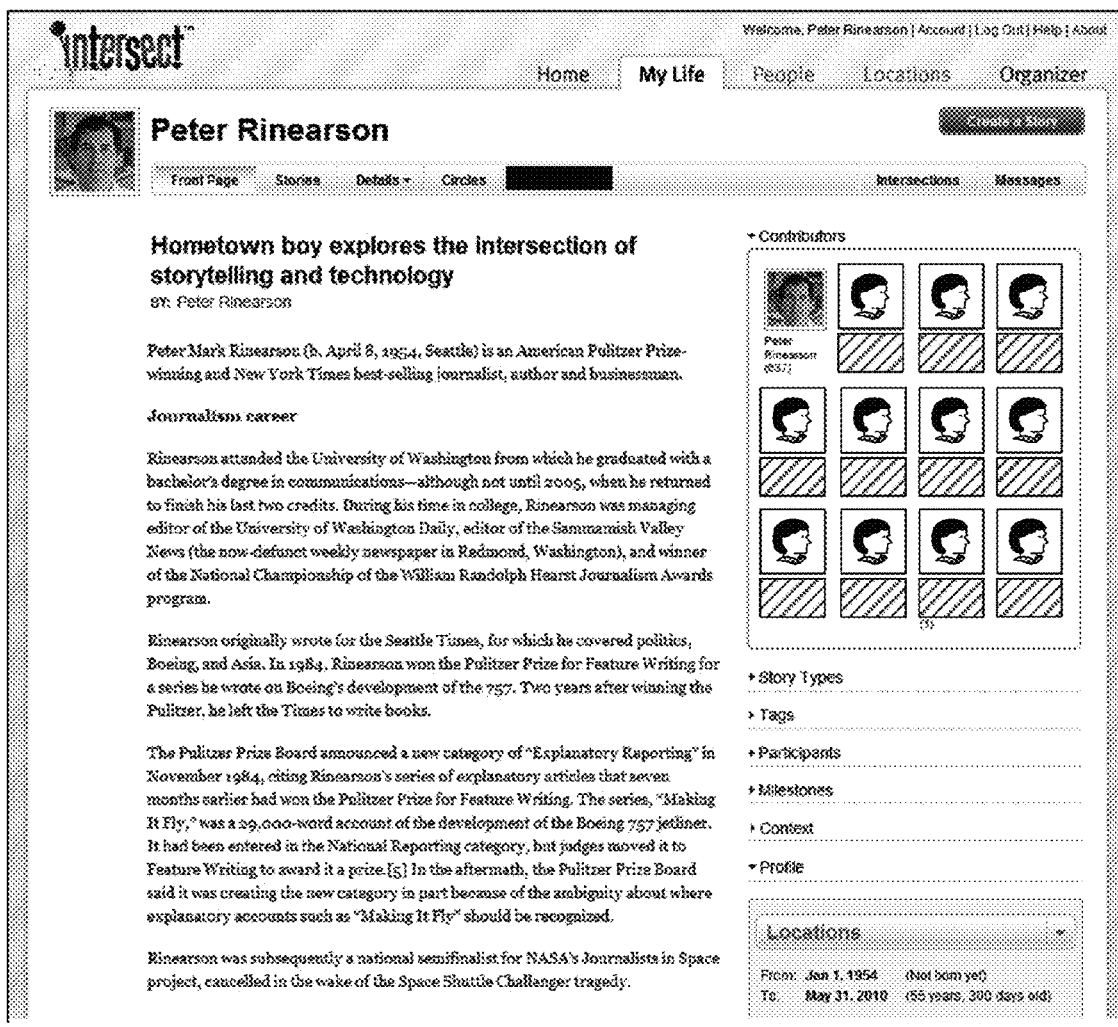
FIG. 28D depicts one embodiment of an "Overview" or "Front Page" story interface.

As discussed above, the "My Life" storyline depicted in FIGS. 28A-28C may be associated with an "Overview" story, which, may provide an overview of the contributor's life. In some embodiments, stories that are "tagged" or otherwise associated with the "Overview" story may be included in the "My Life" storyline. The stories in the contributor's intersection space (e.g., the stories contributed and/or borrowed by the contributor) may be "tagged" with the "Overview" story, which may provide a "Here's who I am" introduction to the contributor. FIG. 28D depicts one example of an interface 2801 for presenting an "Overview" story of a contributor. The overview story interface 2801 may be accessible via the interface 2800, by selecting the "Front Page" link (shown on the interface 2800), selecting an indicator of the contributor and/or by accessing the contributor's profile, or via some other link. As illustrated in FIG. 28D, the overview story may summarize the storyline, which in the FIG. 28D example comprises an overview of Peter Rinearson's life.

As discussed above, a contributor may create storylines other than the "My Life" storyline. The contributor may have one or more parallel storylines for their interests, hobbies, and the like (and/or to represent other events, entities, movements, as discussed above). For example, the contributor may create a storyline about his/her summer vacation. Stories pertaining to the summer vacation may be included in the "Vacation" storyline (and/or the contributor's "My Life" storyline) by tagging the stories with a "Vacation" storyline tag and/or associating the stories with a "Vacation Overview" story. Accordingly, in some embodiments, a storyline may be a story itself. Therefore, tagging a story with the "Vacation" storyline may comprise tagging the story with the "Vacation Overview" story. The vacation story/storyline may comprise and/or be associated with an "Overview" or "Front Page" story as described above, which may provide a summary of the summer vacation events (e.g., included a trip to Disneyland, camping in Yosemite, and so on).

The vacation storyline may include one or more "nested" storylines. For example, the story about the trip to Disneyland may itself be a storyline, comprising stories about the contributor's experiences at the park. These stories may be tagged with the "Disneyland trip" story/storyline, the "Vacation" story/storyline, and/or the "My Life" story/storyline. As described above, the storyline associations may determine which storylines will include the story (e.g., if tagged with the "My Life" story/storyline, the story may be included in the "My Life" storyline, and so on). In some embodiments, nested storylines may be distinguished from a story in the intersection space (e.g., may be displayed as a "stacked" set of stories as in FIG. 27).

Associating a story with more than one storyline may comprise associating the story with more than one "Overview" or "Front Page" story. For example, if a contributor tags another user (e.g., "Joe") as a story participant, Joe's overview story may serve as a tag for the contributor's story. If Joe accepts the tag, then the contributor's story may appear in Joe's "My Life" storyline. Accordingly, the contributor's story becomes a constituent of Joe's life story, even as Joe's overview story is already a constituent of the contributor's "My Life" storyline and potentially of the storylines of other users. Alternatively, or in addition, Joe may borrow the story into a different storyline that is not about Joe's overall life, but rather about a different aspect of Joe's life, about an organization, an event, or so forth.

In another example, a Story "A" may be about the contributor's life (may be the contributor's "Overview" or "Front Page" story), and Stories "B," "C," "D," and "E" may be stories about "parts" of the contributor's life. Stories B, C, D, and E may be tagged with Story A (either implicitly or because the contributor did so explicitly). When the contributor accesses Story A, the network-accessible service may include a link to and/or display component to present the storyline that contains Stories B, C, D, and/or E. When a user accesses Story B (or Story C, D, or E), Story A may be presented as a tag to helps define the individual story.

For instance, Story E may be about taking a family trip to Disneyland. As already noted, Story E may be tagged with Story A, indicating that it is part of the storyline associated with the overview Story A (which is about the contributor's life). The contributor may author a Story X about waiting in line for tickets at Disneyland; Story Y, which is about having lunch; and Story Z about being called up on stage to sing before a crowd Disneyland. The contributor may associate Stories X, Y and Z with the story/storyline of Story E, to indicate that these stories are all part of the "Disneyland" storyline. Accordingly, when Story E is presented by the network-accessible service, the interface may include an indication that there is a storyline available that includes other stories (e.g., Stories X, Y and Z).

Because Story Z is about a big event (e.g., singing on stage), the contributor may decide to make this story appear in his/her main (e.g., "My Life") storyline The contributor may tag Story Z the "My Life" storyline tag, which, as discussed above, may be Story A (the "Overview" story of the contributor's life). Accordingly, the Story Z may be included in the "My Life" storyline of the contributor (Story A) as well as the "Disneyland" storyline (Story E). By contrast, the less prominent stories about waiting in line at Disneyland (e.g., Story X) or about having lunch at Disneyland (Story Y) may not be tagged with Story A, the "My Life" storyline, and, as such, may not appear in the "My Life" storyline. The "My Life" storyline may, however, include the story/storyline about Disneyland (e.g., Story E), through which the Stories X, Y, and Z may be accessed.

Figure 29:
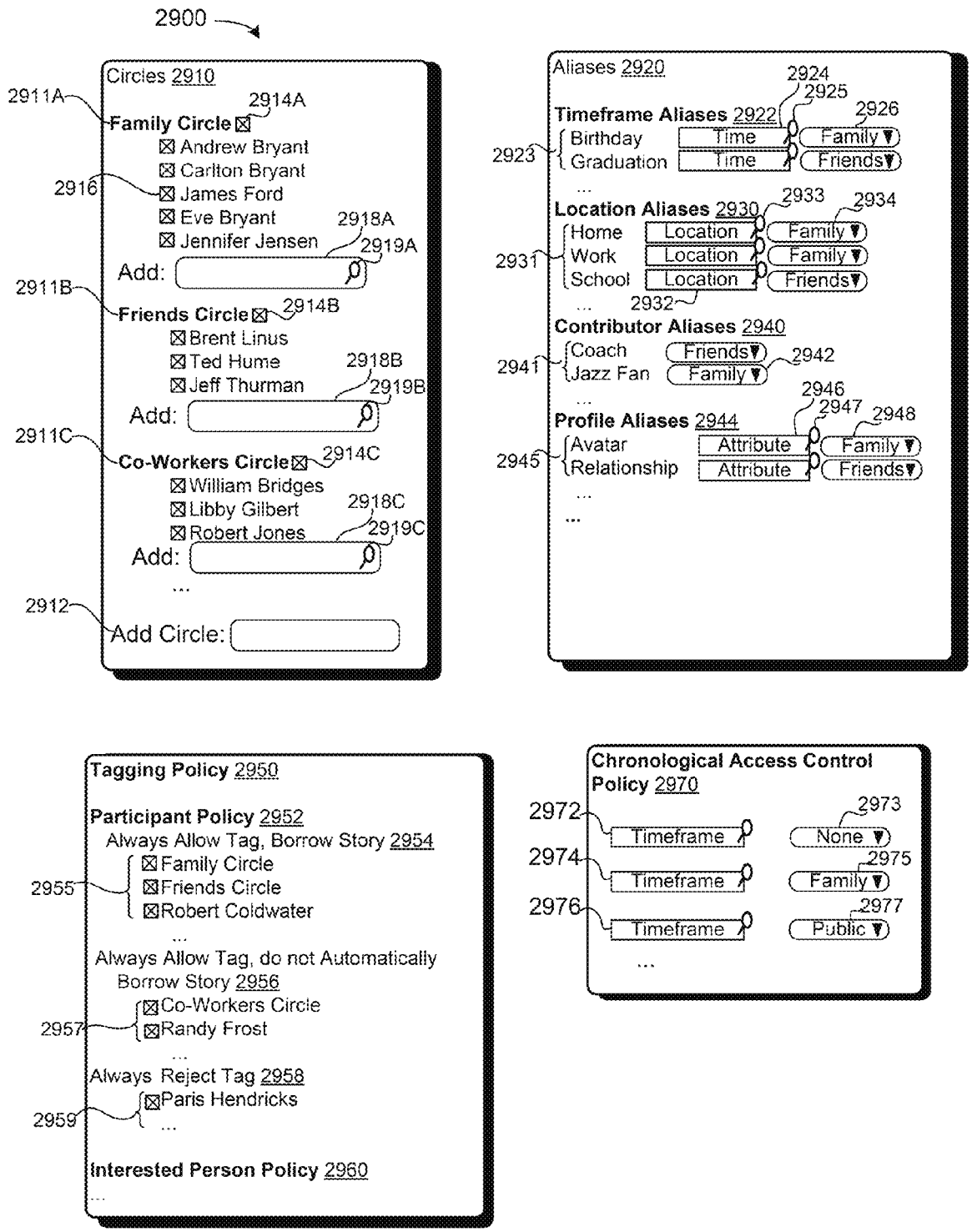
FIG. 29 depicts examples of access control and policy components.

FIG. 29 depicts various examples of one embodiment of interface elements 2900 for specifying and/or displaying access control and/or privacy policy information. In some embodiments, the interface elements depicted in FIG. 29 may be provided as browser-renderable markup for display in a browser application. Alternatively, or in addition, the elements 2900 may be provided as stand-alone applications, application components, plug-ins, or the like.

A circle component 2910 may be configured to provide for the display and/or editing of user circles 2911A-C. A user may add new circles using an add control 2912, may delete circles using respective delete controls 2914A-C, may modify circle membership, and the like. Users and/or semblances may be added or removed from the circles 2911A-C using respective controls 2916 and 2918A-C. The circle add controls 2918A-C may include respective user directory controls 2919A-C to allow the user to add circle members from a user directory and/or from one or more user-defined semblances.

An alias component 2920 may provide for the display and/or editing of user-defined aliases. The component 2920 may comprise timeframe aliases 2922, comprising timeframe aliases identifiers 2923 and associated timeframes 2924 (the timeframes represented by aliases 2923, which may be expressed in absolute time, virtual or relative time, not specified, or the like), and/or access controls 2926. The access control input 2926 is used to specify the circle(s) (if any) that have access to the timeframes 2924 associated with the aliases identifier 2923.

The timeframe aliases 2922 may comprise timeframe browser controls 2925, which, when selected, may cause a time selection component to be displayed for selection of an alias timeframe 2924. The selection component (not shown) may comprise a timeframe control, such as the controls 510, 1100, and/or 2710 described above, a calendar control, text entry field, or the like. The access controls 2926 may determine which circles (if any) are allowed to access the timeframes 2926 of the respective timeframe alias identifiers 2923.

The component 2920 may comprise location aliases 2930, which may provide for the display and/or editing of user-defined location aliases. The location aliases 2930 may comprise location alias identifiers 2931, associated locations 2932 (the locations represented by the location aliases 2931, which may expressed as a real location, an address, a region, a virtual location, not specified, or the like), and/or access controls 2934. The location aliases 2930 may comprise a timeframe browser control 2933, which, when selected, may cause a location selection component to be displayed (e.g., a location control, such as the controls 520 described above, a virtual map, a text entry, or the like). The access controls 2934 may determine which circles (if any) are allowed to access the locations (addresses) 2926 of the respective location alias identifiers 2932.

The component 2920 may comprise contributor aliases 2940, which may provide for the display and/or editing of user-defined contributor aliases. As discussed above, contributor aliases may be used to "hide" the true identity of the contributor of a story (or other content) from other users of the network-accessible service (website). Accordingly, the contributor aliases 2940 may comprise one or more contributor alias identifiers 2941 and corresponding access controls 2942. The access controls 2942 may specify which circle(s) (if any) may access the contributor's true identity when the respective contributor alias identifier 2941 is used.

The component 2920 may comprise profile aliases 2944, which may provide for the display and/or editing of user-define profile alias. The profile aliases may comprise user profile alias identifiers 2945 and corresponding profile attribute values 2946, and/or corresponding access controls 2948. The profile alias identifiers 2945 may be alias values used in connection with a user profile, which may be tied to corresponding "actual" user profile value of the attribute 2946. For example, the user may specify that a "cartoon" image 2945 is to be displayed as his/her profile avatar unless the user accessing the profile is in the specified circle(s) (e.g. in the "family" circle) 2948. The profile aliases may include a browse or search control 2947 through which the user specifies attribute values to display for each alias 2945.

Although not shown in FIG. 29, the alias component 2920 could include "add" and/or "remove" controls (buttons or other interface elements) to add and/or remove entries from each of the timeframe aliases 2922, location aliases 2930, contributor aliases 2940, and/or profile aliases 2944.

A tagging policy component 2950 may provide for the display and/or management of user tagging policies. The tagging policies may control how the user may be identified in stories contributed by other users of the network-accessible service (e.g., whether the user can automatically be tagged as a participant and/or interested user in others' stories).

A participant policy 2952 may define how participant tags are to be handled. In the example depicted in FIG. 29, a "default" participant policy may exist, which may be that the user is prompted before being added as a participant to any story. Therefore, if none of the participant policies 2952 applies to a particular participant tag, the default policy may be implemented, and the user may be prompted before being added as a participant. In other embodiments, the default policy may be policy 2956, where the user is identified as a participant, but does not "borrow" the story unless the user explicitly indicates. Alternatively, the user may specify a default participant policy in the component 2950 (not shown).

The participant policy 2954 may identify one or more users and/or groups 2955 that the user trusts to make accurate (and/or tasteful) participant tags. When the user is tagged as a participant in content submitted by one of these users 2955, the user may automatically accept the participant tag and borrow the story. The policy 2954 may further comprise a directive specifying how the borrowed story is to be shared (not shown) (e.g., share the borrowed story as "public," and/or within one or more user-defined circles). The component 2950 may include controls to add and/or remove users and/or circles from the policy 2954.

The participant policy 2956 may identify one or more users and/or groups 2957 that the user will allow to automatically tag him/her as a participant, but whose content the user will not automatically publish. Accordingly, when the user is tagged as a participant in content submitted by one of these users 2957, the user may automatically accept the participant tag, but not borrow the story. The component 2950 may include controls to add and/or remove users and/or circles from the policy 2956.

The participant policy 2958 may list users and/or groups 2959 whose participant tags are automatically rejected by the user. As above, the component 2950 may include controls to add and/or remove users and/or groups from the policy 2958.

The control 2950 may further comprise an interested person policy 2960. The interested person policy 2960 may comprise similar policies (not shown) to the participant policies 2952, 2954, and/or 2956 described above. For example, an interested person policy 2960 may include policies identifying users and/or groups whose "interested person" tags are automatically accepted (and whose stories are automatically borrowed) may be provided, may include a policy to automatically accept "interested person" tags from certain users and/or circles, but not automatically borrow the stories, and/or policies to automatically reject "interested person" tags from specified users and/or circles.

In some embodiments, each time a user is tagged as a story participant and/or interested person, the user may be prompted whether to accept the tag and borrow the story, accept the tag, but not borrow the story, and/or to reject the tag. Each of these options may include an indicator allowing the user to set a corresponding policy rule. For example, if the user wishes to always reject tags from the identified user, an input on the prompt may be provided to "always reject tags from user X." Similarly, an input to always accept and/or always accept and publish may be provided. These prompts may be used to generate the policy information depicted in component 2950 "on-the-fly."

A component 2970 may provide for the display and/or editing of a "global" chronological access control policy. A "global" access control policy may apply to all stories having a particular set of attributes, such as timeframe. As discussed above, in some embodiments, access to user-content content may be specified within pre-defined time ranges. A specified policy may be applied to all user-contributed (or borrowed) within a particular timeframe. For example, a user may want to hide the content related to his high school years from view (until he eventually moves away from his home town). A chronological access control policy 2972 may be configured to express this policy information; the timeframe 2972 may specify the timeframe comprising the user's high school years, and the corresponding access control policy 2973 may indicate that no one is to have access to the content. In another example, a particular timeframe 2974 may be available to one or more circles (e.g., the user's family circle 2975), and in another example, the content associated with the timeframe 2976 may be available publically (per access control 2977). The timeframe inputs 2972, 2974, and/or 2976 may comprise respective timeframe input selectors which, as described above, may comprise a timeframe control, calendar selector, or the like. The access control inputs 2973, 2975, and/or 2977 may be used to specify one or more user-defined circles, individual users, specify no users and/or circles, or the like.

Although the component 2970 describes a global access control policy based on timeframe, the disclosure is not limited in this regard. Other global access controls could be used under the teachings of this disclosure. For example, a global access control policy may be defined with respect to locations, descriptive tags, participant(s), interested person(s) and so on. For example, a location-related global access control policy could automatically mark all stories occurring in the contributor's home as available only to the "family" circle. Similarly, a "participant" global access control policy could set all stories in which the contributor's children are participants to "family" access only, and so on.

Figure 30:
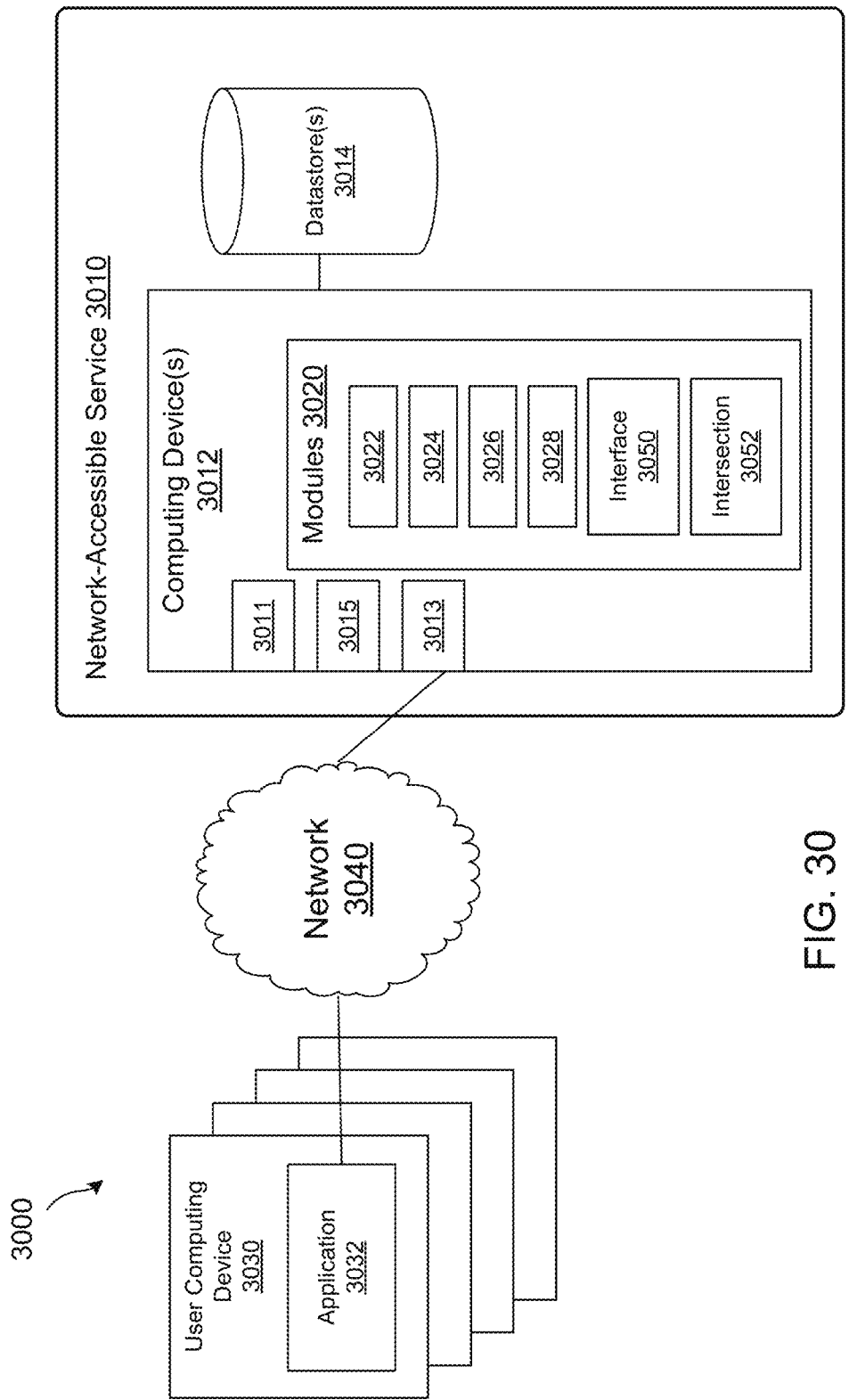
FIG. 30 is a block diagram of a system and apparatus for providing a network-accessible service as disclosed herein.

FIG. 30 is a block diagram of one embodiment of a system 3000 and apparatus 3010 for providing the features taught herein. The apparatus 3010 may provide network-accessible services to one or more users 3030 via a network 3040. The network 3040 may comprise any communication mechanisms known in the art including, but not limited to: a TCP/IP network (e.g., the Internet), a LAN, a WAN, a VPN, a PSTN, a wireless network (e.g., radio, IEEE 802.11), a combination of networks, and so on. The apparatus 3010 may comprise one or more computing devices 3012, each comprising a processor 3011, memory 3015, and one or more network interfaces 3013 to communicatively couple the apparatus 3010 to the network 3040.

The apparatus 3010 may be configured to communicate with the user computing devices 3030 via the network 3040 to receive information therefrom, such as user registration information, user profile information, user-submitted content, metadata, intersection criteria, and so on, as disclosed above. The user computing devices 3030 may be operated by respective users (not shown) and may each comprise an application 3032 configured to interface with the network-accessible service 3010 via the network 3030. The user computing devices 3030 may comprise personal computer, laptops, cellular phones (e.g., smart phones), handheld computing devices, tablet computers or the like. The applications 3032 may be configured to communicate with the network-accessible service 3010. In some embodiments, the application(s) 3032 may comprise general purpose web-browser applications, standalone applications, special purpose applications, application plug-ins, or the like.

The apparatus 3010 may store user-submitted content, user-provided information (e.g., profile information, circle membership, etc), and/or records of user interactions with the apparatus 3010 in one or more datastores 3014. The datastores 3014 may comprise computer-readable storage media, such as hard disks, non-volatile solid-state storage devices, and the like. The datastores 3014 may provide data storage services, such as database storage services, directory services, and the like.

The apparatus 3010 may provide various user interfaces, through which the users 3030 may: author, contribute, upload, and/or publish user-submitted content; manage content collections (e.g., storylines); present user-submitted content; search or browse user-submitted content; manage user profile or account information; maintain user privacy settings; manage access control preferences; and so on, as disclosed herein. The interfaces provided by the apparatus 3010 may be configured to be presented on various different human-machine interfaces provided by various different types of user computing devices 3030, as disclosed above.

The apparatus 3010 (via the computing devices 3012) may implement one or more modules 3020, which may be embodied as computer-readable instructions stored on the datastores 3014. The instructions may be executable by processing resources 3011 of the computing devices 3012. Accordingly, the modules 3020 may operate on the processor 3011 of the computing device 3012. The modules 3020 may include an interface module 3020 configured to provide the interfaces described herein. In some embodiments, some of the interfaces may be provided as browser-renderable markup. Accordingly, the interface module 3020 may comprise a web server.

The apparatus 3010 may comprise a storage module 3022 configured to store and/or index user-submitted content received via the interfaces provided by the interface module 3020. The user-submitted content may include, but is not limited to: photographs, text, video, audio, content collections (e.g., stories, storylines), metadata, user profile information, user preferences, security settings, and so on. The interface module 3020 may be configured to present content stored on the storage module 3022 as described above.

The apparatus 3010 may comprise an analysis module 3024, which may be configured to analyze user-submitted content, metadata, and/or user interactions with the apparatus 3010 to determine user stage of life, disposition, identify user affinities, identify intersections, and so on, as described above. The analysis module 3024 may make the results of the analysis available to the other modules (e.g., interface module 3020) for display.

In some embodiments, the apparatus 3010 may include an access control module 3026, which may control access to user-submitted content, user profile information, and the like, as described above. Accordingly, the access control module 3026 may store records (on the datastores 3014) of user-defined circles, aliases, and the like. User registration, user profile, user modeling, and other information may be maintained by a user module 3028. The user module 3028 may store the user information described above on the datastores 3014. The apparatus 3010 may use the computing devices 3012, datastores 3014 and/or modules 3020, 3022, 3024, 3026, and/or 3028 to implement the features described above.

In some embodiments, the modules 3020 further include a user interface module 3050 and an intersection module 3052.

The user interface module 3050 may be configured to provide user interfaces and/or user interface components to users via the network 3040. The user interface module 3050 may provide for displaying the interfaces described herein (e.g., authoring interfaces, intersection interfaces, story interfaces, and so on).

The intersection module 3052 is configured to receive a request or query for an intersection space from a user or other entity via the network 3040. The query may include intersection criteria comprising a timeframe and/or location of interest. The intersection criteria may further comprise descriptive tags, participant tags, rating criteria, and so on.

The intersection module 3052 may be configured to select stories for inclusion in an intersection space corresponding to the query. As discussed above, a story may be included in the intersection space when the intersection metadata of the story matches the intersection criteria. The intersection module 3052 may leverage the storage module 3022, analysis module 3024, access module 3026, and/or user module 3028 to generate the intersection space.

In some embodiments, the intersection module 3052 modifies the intersection criteria when the intersection space includes less than a threshold number of stories (e.g., less than a sufficiency threshold). The modifications may comprise expanding the intersection criteria, such that more stories will be included in the intersection space. The modifications may include scaling timeframe and/or location criteria by a proportional scaling factor.

In some embodiments, the intersection module 3052 filters the intersection space when the intersection space includes more than a threshold number of stories and/or to filter the stories included in the intersection space as a result of modifications to the intersection criteria. The filtering may comprise comparing minimum and/or maximum area values, spectral partitioning, or the like.

In some embodiments, the intersection module 3052 applies access controls to determine whether a user requesting the intersection space has access to certain intersecting stories. The access control decisions may be implemented by the access control module 3026 and may comprise determining user circle membership using the user module 3028. The intersection space 3052 may filter story content, such as location identifiers, participant identifiers, and the like, according to access control policies, as described above.

The intersection module 3052 may be further configured to assign a relative importance to the stories in the intersection space. The relative importance may be based upon how closely the intersection metadata of the story corresponds to the intersection criteria (e.g., the relevance of the intersection metadata to the intersection criteria). The importance may also be based upon user-defined indicators of story importance.

The intersection space generated by the intersection module 3052 may be presented to a user in an interface generated by the interface module 3050 and/or displayed in an application 3032 operating on a user computing device. The intersection space may comprise story indicators (e.g., in link badge, list, or another format). The story indicators may be displayed according to their relative importance.

Users may collaborate on story content through the network-accessible service 3010. In some embodiments, an author presents story content to users in a "virtual space," such as a chatroom, Skype® call, forum, online presentation, instant messaging service, or other suitable interface provided by the network-accessible service 3010 or third-party service. Users may contribute commentary and/or annotations ("collaborative content") as the story content is presented. The collaborative content is synchronized with the presentation of the story content in the virtual space. The author of the story may selective incorporate the collaborative content into the story. Collaborative content may be submitted by different people at different times (e.g., in different virtual spaces to different audiences). The collaborative content may include, but is not limited to: text, video, images, audio, or the like.

In some embodiments, the network-accessible service 3010 (or other third-party service) records the collaborative content as the story content is presented in a virtual space. The recording may comprise associating the collaborative content with story content (e.g., synchronizing audio commentary to a video). The collaborative content may, therefore, be synchronized to the story content as the story is told in the virtual space. Alternatively, or in addition, the collaborative content may be associated with particular story content items. For example, collaborative content pertaining to a particular photo may be synchronized with display of the photo in the virtual space (or otherwise associated with the story photo). In another example, collaborative content pertaining to a particular scene in a video is synchronized with display of the scene. Accordingly, recording the collaborative content may comprise recording metadata identifying the portion(s) of the story to which the collaborative content pertains.

Collaborative content may comprise metadata that identifies a timeframe and/or a time "offset" with respect the presentation of the story in the virtual space and/or within particular story content items (e.g., five minutes into a video). In another example, collaborative content may reference a time before or after a timeframe of the story. For example, collaborative content may describe the results of story events or may "setup" events in a story.

Collaborative content may be submitted by respective contributors. When story content is presented in a virtual space, each contributor may submit a "stream" of collaborative content (e.g., a running commentary). The network-accessible service 3010 associates each of the multiple streams with the story content and a respective contributor (or device). The commentary streams may be selectively played back with the story content. For example, a user may review the story content with the synchronized, collaborative content of one or more selected contributors. Alternatively, a user may play back the entire presentation along with the synchronized collaborative content of each contributor.

The author of the story content may selectively incorporate portions of the collaborative content into the story (or leverage the collaborative content to author a story). As such, portions of the collaborative content may become part of the story. Incorporating collaborative content may comprise converting the content into another form (e.g., converting voice into text, etc.). Alternatively, or in addition, collaborative content may be included in a separate story or storyline that is associated with the story content. Accordingly, when the story content is shown again, it may include selected portions of the collaborative content.

In some embodiments, collaborative content is received via a story presentation interface of the network-accessible service 3010. Referring back to FIG. 5C, a user accessing a story may collaborate on the story via the comment input 579. In another example, the comment input 579 is adapted to include inputs to specify a timeframe of the collaborative content and/or to specify a story content item to which the collaborative content pertains (e.g., to indicate that the collaborative content pertains to a particular photograph 509). The story author may selectively incorporate the commentary into the story, as described above.

In some embodiments, story content is presented in a virtual space, such as an interface of the network-accessible service 3010 and/or through another service, such as a chatroom, Skype® call, forum, online presentation, instant messaging service, or the like. Users collaborate on the story through commentary and/or annotations submitted as the story is presented in the virtual space (e.g., as the story is being told). The collaborative content is recorded and synchronized with the presentation of the story content in the virtual space. Accordingly, when story content is presented in a virtual space, the network-accessible service 3010 (or other, third-party service) records multiple "streams" of collaborative content that may be synchronized with the story (e.g., synchronized to the story as it was "told" in the virtual space). For example, a user may present a story of a dance recital in a virtual space (e.g., a Skype® call). The story may include one or more photos of the recital, a text (or audio) description of the recital, a video of selected numbers, and the like. As the story is presented, users of the virtual space submit collaborative content, such as audio commentary on the recital, text commentary, photos of their own, etc. The presentation of the story in the virtual space is recorded along with the multiple streams of collaborative (each from a different respective contributor). The collaborative content may be synchronized to the presentation of the story within the virtual space; for example, a comment on a particular story photo is synchronized with the time the photo was shown.

The author may selectively incorporate the collaborative content, such that the next time the story content is presented, the selected collaborative content is included (at the appropriate time according to the synchronization described above). In some embodiments, an author accesses the recording of the presentation of the story content, along with the synchronized collaborative content, to author the story. In this example, the author acts as a "curator" to distill the original story content and collaborative content into a story. Alternatively, the story content and selected portions of the collaborative content may be maintained in a "collaborative content" storyline, or the like.

Figure 31:
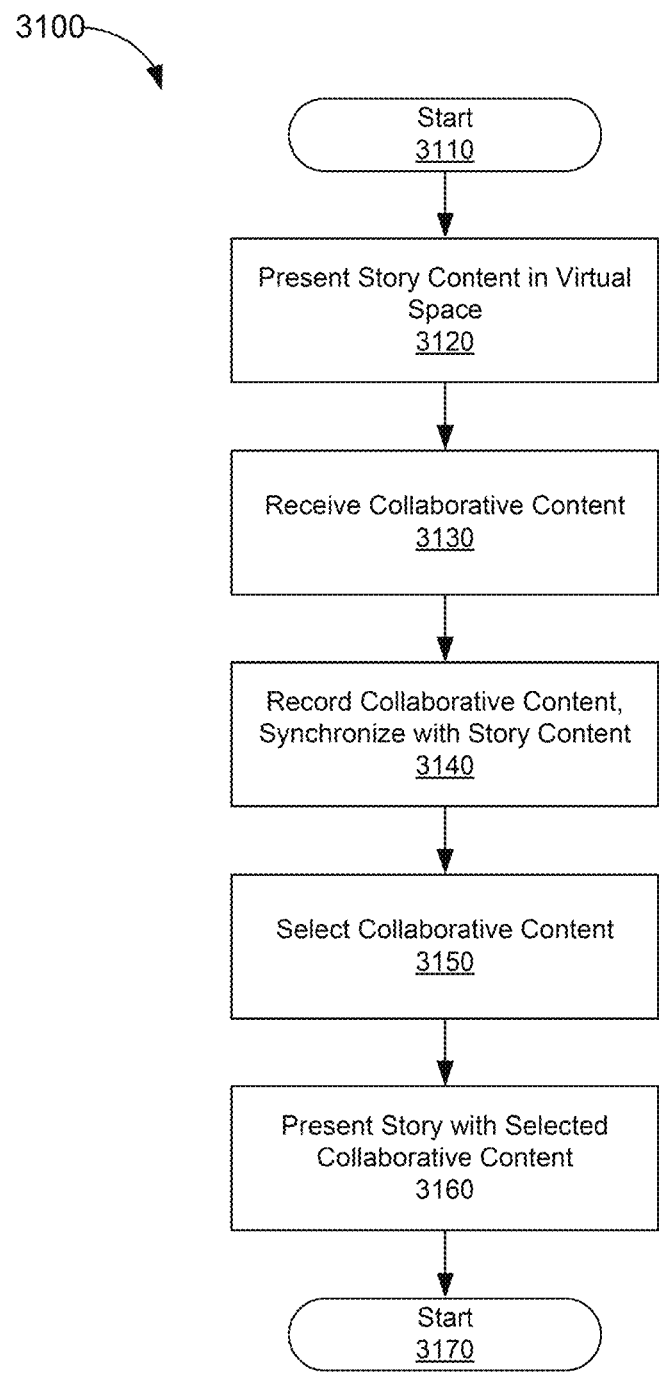
FIG. 31 is a flow diagram of one embodiment of a method for collaborative storytelling in a virtual space.

FIG. 31 is a flow diagram of one embodiment of a method 3100 for collaborative storytelling in a virtual space. At step 3110, the method 3100 starts and is initialized as described above. Step 3120 comprises presenting story content in a virtual space, such as a forum, instant messaging service, chatroom, communication medium (e.g., Skype® call), or the like.

At step 3130, and as the story content is presented in the virtual space, the method 3100 receives collaborative content pertaining to the story content from one or more contributors. The contributors may include the "audience" of the virtual space and/or the author of the story content. The collaborative content may comprise content of any type, including text, video, audio (e.g., voice), video, etc. The collaborative content may be received through the virtual space or via another "sideband" communication interface (e.g., email, separate audio channel, etc.).

At step 3140, the method 3100 records the collaborative content received at step 3130 and associates the collaborate content with the story content presented at step 3120. The collaborative content may be associated with respective contributors. Accordingly, step 3140 may comprise storing a plurality of "streams" of collaborative content and associating each stream with a respective contributor. Step 3140 further comprises synchronizing the collaborative content streams with presentation the of the story content in the virtual space, as described above.

At step 3150, the author of the story content selects collaborative content to include in the story. Step 3150 may comprise the author selecting portions of each of one or more "streams" of collaborative content. The selected collaborative content may be incorporated as story content, such that the collaborative content is included the next time the story content is presented in a virtual space. In some embodiments, step 3150 comprises converting collaborative content into another format. For example, audio or video commentary may be converted into text, an image may be incorporated into a video slideshow, or the like. The incorporation may comprise identifying the contributor of the collaborative content as an author or "contributor" to the story and/or giving the contributor the right to edit and/or comment on the collaborative content.

At step 3160, the story content, including the selected collaborative content, is presented to a user in an interface or virtual space (e.g., the interface 504 of FIG. 5C). The collaborative content may be synchronized with the story content and/or associated with particular story content items, as described above. In some embodiments, the collaborative content may be distinguished from content of the story author (e.g., using highlighting, or other interface elements). At step 3170, the flow ends.

The above description provides numerous specific details for a thorough understanding of the embodiments described herein. However, those of skill in the art will recognize that one or more of the specific details may be omitted, or other methods, components, or materials may be used. In some cases, operations are not shown or described in detail.

Furthermore, the described features, operations, or characteristics may be combined in any suitable manner in one or more embodiments. It will also be readily understood that the order of the steps or actions of the methods described in connection with the embodiments disclosed may be changed as would be apparent to those skilled in the art. Thus, any order in the drawings or Detailed Description is for illustrative purposes only and is not meant to imply a required order, unless specified to require an order.

Embodiments may include various steps, which may be embodied in machine-executable instructions to be executed by a general-purpose or special-purpose computer (or other electronic device). Alternatively, the steps may be performed by hardware components that include specific logic for performing the steps, or by a combination of hardware, software, and/or firmware.

Embodiments may also be provided as a computer program product including a computer-readable storage medium having stored instructions thereon that may be used to program a computer (or other electronic device) to perform processes described herein. The computer-readable storage medium may include, but is not limited to: hard drives, floppy diskettes, optical disks, CD-ROMs, DVD-ROMs, ROMs, RAMs, EPROMs, EEPROMs, magnetic or optical cards, solid-state memory devices, or other types of medium/machine-readable medium suitable for storing electronic instructions.

As used herein, a software module or component may include any type of computer instruction or computer executable code located within a memory device and/or computer-readable storage medium. A software module may, for instance, comprise one or more physical or logical blocks of computer instructions, which may be organized as a routine, program, object, component, data structure, etc., that perform one or more tasks or implements particular abstract data types.

In certain embodiments, a particular software module may comprise disparate instructions stored in different locations of a memory device, which together implement the described functionality of the module. Indeed, a module may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

It will be understood by those having skill in the art that many changes may be made to the details of the above-described embodiments without departing from the underlying principles of the invention.

What is claimed is:

1. A non-transitory computer-readable storage medium comprising instructions configured for execution by a computing device, to cause the computing device to perform operations, comprising:

receiving a query associated with a user, the query comprising an intersection criteria, the intersection criteria comprising a specified location and a specified timeframe;

generating an intersection space responsive to the query by:

accessing a plurality of stories, each story submitted by a submitter and comprising one or more content items and having respective intersection metadata, the intersection metadata of each story comprising a location and a timeframe pertaining to the story, selecting stories for inclusion in the intersection space that each have intersection metadata corresponding to the location and the timeframe of the intersection criteria, accessing timeframe-dependent access controls provided by respective submitters that submitted the selected stories;

filtering the selected stories based on the timeframe-dependent access controls, such that each remaining selected story in the intersection space is associated with one or more timeframes the user is authorized to access based on the corresponding timeframe-dependent access controls; and displaying the intersection space to the user on a display device, the display comprising indicators of one or more of the filtered stories selected for inclusion in the intersection space.

2. The non-transitory computer-readable storage medium of claim 1, the operations further comprising extracting at least a portion of the intersection criteria from a content item associated with the user.

3. The non-transitory computer-readable storage medium of claim 2, wherein the content item comprises an image.

4. The non-transitory computer-readable storage medium of claim 1, wherein the location of the intersection criteria corresponds to a physical location.

5. The non-transitory computer-readable storage medium of claim 1, wherein the location of the intersection criteria corresponds to a virtual location.

6. The non-transitory computer-readable storage medium of claim 1, wherein the location of the intersection criteria corresponds to a mobile location.

7. The non-transitory computer-readable storage medium of claim 1, wherein the specified timeframe corresponds to a virtual timeframe.

8. The non-transitory computer-readable storage medium of claim 1, wherein a timeframe-dependent access control of a submitter permits user access to stories that correspond to a first timeframe and denies user access to stories that correspond to a second, different timeframe.

9. The non-transitory computer-readable storage medium of claim 1, wherein a timeframe-dependent access control of a submitter permits access to stories associated with a particular timeframe to a first set of users and denies access to the stories associated with the particular timeframe to a second, different set of users.

10. A system, comprising:
a network-accessible computing device comprising a processor and a datastore, the datastore comprising a plurality of story records, each story record submitted by a submitter and comprising one or more content items, and each story record assigned a respective timeframe access control and having respective intersection metadata, the intersection metadata of each story record comprising a location and a timeframe pertaining to the story record;

an intersection module operating on the processor, wherein the intersection module is configured to:
generate an intersection space in response to a query from a user, the query comprising intersection criteria comprising a specified location and a specified timeframe, by selecting story records from the datastore for inclusion in the intersection space each having a location that matches the location of the intersection criteria and a timeframe that matches the timeframe of the intersection criteria, and filtering the story records selected for inclusion in the intersection space based on the timeframe access controls associated with the respective story records, each timeframe access control specified by a submitter that submitted one or more of the selected story records such that each remaining selected story record is associated with one or more timeframes indicated, by a submitter that submitted the remaining selected story record, as being accessible to the user; and an interface module to present the intersection space to the user on a display, the intersection space comprising indicators of one or more of the filtered story records selected for inclusion in the intersection space.

11. The system of claim 10, wherein the intersection module is further configured to extract at least a portion of the intersection criteria from an image associated with the user.

12. The system of claim 10, wherein the location of the intersection criteria corresponds to one of a physical location, a virtual location, or a mobile location.

13. The system of claim 10, wherein the timeframe of the intersection criteria corresponds to a virtual timeframe.

14. The system of claim 10, wherein a timeframe access control of a submitter permits user access to story records that correspond to a first timeframe and denies user access to story records that correspond to a second, different timeframe.

15. The system of claim 10, wherein a timeframe access control of a submitter permits access to story records associated with a particular timeframe to a first set of users and denies access to the story records associated with the particular timeframe to a second, different set of users.

16. A method performed by one or more processors configured to perform operations comprising:
receiving a query associated with a user, the query comprising an intersection criteria, the intersection criteria comprising a specified location and a specified timeframe;

generating an intersection space responsive to the query by:
accessing a plurality of stories stored on a computer-readable storage medium, each story submitted by a submitter and comprising one or more content items and having respective intersection metadata, the intersection metadata of each story comprising a location and a timeframe pertaining to the story, selecting stories for inclusion in the intersection space that each have intersection metadata corresponding to the location and the timeframe of the intersection criteria, filtering the selected stories based on timeframe-dependent access controls associated with the respective selected stories, each timeframe-dependent access control specified by a submitter that submitted one or more of the selected stories such that each remaining selected story is associated with one or more timeframes indicated, by a submitter that submitted the remaining selected story, as being accessible to the user; and displaying the intersection space to the user on a display device, the display comprising indicators of one or more of the filtered stories selected for inclusion in the intersection space.

17. The method of claim 16, the operations further comprising extracting at least a portion of the intersection criteria from an image associated with the user.

18. The method of claim 16, wherein the location of the intersection criteria corresponds to one of a physical location, a virtual location, or a mobile location.

19. The method of claim 16, wherein a timeframe access control of a submitter permits user access to stories that correspond to a first timeframe and denies user access to stories that correspond to a second, different timeframe.

20. The method of claim 16, wherein a timeframe-dependent access control of a submitter permits access to stories associated with a particular timeframe to a first set of users and denies access to the stories associated with the particular timeframe to a second, different set of users.

21. The method of claim 1, wherein the submitters are associated with a social media site and respective stories are submitted to the social media site.

\* \* \* \* \*